US012771605B2

(12) United States Patent
Agarwal et al.

(10) Patent No.: US 12,771,605 B2
(45) Date of Patent: Oct. 20, 2026

(54) DEPLOYING AN EDGE CLUSTER USING PODS

(71) Applicant: VMware LLC, Palo Alto, CA (US)

(72) Inventors: Minjal Agarwal, San Jose, CA (US); Abhishek Goliya, Pune (IN); Yong Wang, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 43 days.

(21) Appl. No.: 18/827,558

(22) Filed: Sep. 6, 2024

(65) Prior Publication Data

US 2025/0106108 A1 Mar. 27, 2025

(30) Foreign Application Priority Data

Sep. 21, 2023 (IN) ............................. 202341063422
Sep. 21, 2023 (IN) ............................. 202341063429

(51) Int. Cl.
*H04L 41/0893* (2022.01)

(52) U.S. Cl.
CPC ................................ *H04L 41/0893* (2013.01)

(58) Field of Classification Search
CPC .................................................. H04L 41/0893
See application file for complete search history.

(56) References Cited

U.S. PATENT DOCUMENTS

2021/0311803 A1 10/2021 Zhou et al.
2023/0353997 A1* 11/2023 Featherstone ....... H04L 41/5096

OTHER PUBLICATIONS

Mahler, C., Kubernetes on the Edge: Getting Started with KubeEdge and Kubernetes for Edge Computing, https://www.cncf.io/blog/2022/08/18/kubernetes-on-the-edge-getting-started-with-kubeedge-and-kubernetes-for-edge-computing/, Aug. 18, 2022, 14 pages.
European Patent Office, Extended Search Report, Application No. 24201581.6, Mar. 5, 2025, 11 pages.

* cited by examiner

*Primary Examiner* — Esther B. Henderson
(74) *Attorney, Agent, or Firm* — Quarles & Brady LLP

(57) ABSTRACT

Some embodiments provide a novel method for deploying an edge device as a cluster of pods. The method receives a set of criteria for deploying the edge device. The method uses the set of criteria to deploy the edge device as a set of one or more pods executing on a set of one or more nodes. The method implements, on the set of pods, a set of one or more services to perform on data message flows. At least two pods deployed for the edge cluster perform different service operations of different service types such that the different service types are able to be scaled independently.

15 Claims, 27 Drawing Sheets

DEPLOYING AN EDGE CLUSTER USING PODS

RELATED APPLICATIONS

This application claims priority to Indian Application No. 202341063422 filed Sep. 21, 2023, by VMware LLC, entitled "DEPLOYING AN EDGE CLUSTER USING PODS," and Indian Application No. 202341063429 filed Sep. 21, 2023, by VMware LLC, entitled "AUTOMATICALLY SCALING PODS DEPLOYED FOR AN EDGE CLUSTER," which are hereby incorporated by reference in their entirety for all purposes.

BACKGROUND

Kubernetes is a de-facto orchestration platform that automates deployment and management of microservice based cloud-native applications. However, network function virtualization (NFV) data plane functions differ greatly from web applications or database applications, where Kubernetes has been proven to be successful. Because of this, challenges arise when considering how networking functions can leverage the benefits of Kubernetes, such as better scalability, resiliency, and elasticity.

Edge appliances are critical components of software defined network (SDN) architecture, and provide centralized networking services (e.g., routing, firewall services, network address translation (NAT) services, virtual private network (VPN), Layer 7 (L7) services) and connectivity to a physical fabric. The current edge node architecture is based on a single appliance model, and the datapath is built upon Data Plane Development Kit (DPDK). DPDK is a widely used kernel-bypassing networking technology that maximizes networking performance, and moves the control of the networking hardware out of the kernel and into the application. This removes the overhead of context switches and kernel-userspace crossing, among other optimizations.

Current multi-tenancy high performance edge appliances work well for Layer 4 (L4) services that are tightly integrated with the DPDK Poll Mode Driver (PMD) threads. However, with more networking and security functions moving to the application layer (L5-L7), methods and system are needed for deploying an edge cluster as a container cluster that can scale L5-L7 services implemented by the edge cluster independently from L4 services implemented by the edge cluster.

BRIEF SUMMARY

Some embodiments provide a novel method for deploying an edge device as a cluster of pods. The method receives a set of criteria for deploying the edge device. The method uses the set of criteria to deploy the edge device as a set of one or more pods executing on a set of one or more nodes. The method implements, on the set of pods, a set of one or more services to perform on data message flows. At least two pods deployed for the edge cluster perform different service operations of different service types such that the different service types are able to be scaled independently.

The edge device is deployed as the set of pods to perform edge services at a boundary between a logical network and one or more external networks. The set of pods executes within the logical network, and handles north-south traffic entering and exiting the logical network. In some embodiments, the edge device also handles east-west traffic within the logical network.

In some embodiments, the method is performed by a set of software defined network (SDN) managers and controllers. In such embodiments, the SDN manager and controller set orchestrates the configuration and management of the edge device (also referred to as an edge cluster, in some embodiments). The particular node in some embodiments implements a particular Layer 4 (L4) pod that performs L4 service operations for the data message flows. The particular L4 pod performs all L4 services for the edge device such that no other pods of the edge device perform any L4 services. The L4 pod in some embodiments also performs Layer 2 (L2) and/or Layer 3 (L3) service operations for the data message flows.

Conjunctively or alternatively, the particular L4 pod is a first L4 pod of a pair of L4 pods deployed as a high availability (HA) pair for the edge cluster. In such embodiments, the first L4 pod is designated as the active L4 pod, and the second L4 pod is designated as the standby L4 pod. An HA configuration is used for L4 services in some embodiments such that, in the event of a failure of the active L4 pod, the standby L4 pod will become the new active L4 pod and perform the L4 services for the edge device.

The particular node in some embodiments also implements a first set of one or more Layer 7 (L7) pods that performs L7 service operations for a first set of the data message flows. In such embodiments, the set of L7 pods performs L7 services for at least a subset of flows traversing the edge device. In some of these embodiments, the particular node is a first node, and a second node implements a second set of one or more L7 pods that performs the L7 service operations for a second set of the data message flows. In such embodiments, the SDN manager and controller set deploys different L7 pods on different worker nodes for the edge cluster. L7 pods in some embodiments also perform Layer 5 (L5) and/or Layer 6 (L6) service operations.

In some embodiments, each L7 pod of the edge device is associated with a different logical router. In such embodiments, each Tier-0 (T0) and Tier-1 (T1) router represented by the edge device is associated with its own L7 pod. In other embodiments, each L7 pod of the edge cluster performs a different L7 service. In such embodiments, each different service is performed by a different L7 pod. This is beneficial for deploying one router that performs multiple services as the edge device.

The set of criteria is received in some embodiments in an Application Programming Interface (API) request specifying the set of criteria. In such embodiments, the SDN manager and controller set parses the API request to extract the set of criteria from the API request. Examples of criteria included in the set of criteria includes (1) a minimum or maximum number of pods to deploy for the edge device, (2) a desired size of each pod, (3) a desired amount of central processing unit (CPU) and/or memory of each pod, and (4) a specification of the services the user wishes the edge device to implement. Conjunctively or alternatively, the SDN manager and controller set receives the set of criteria from a master node's API server instead of receiving the API request. In such embodiments, the SDN manager and controller set does not have to parse the API request to extract the set of criteria. The master node is the master node of the set of nodes, which are worker nodes, and schedules the pods on the set of worker nodes.

In some embodiments, each pod (i.e., each L4 pod and each L7 pod) is associated with a set of one or more networking interfaces. In some of these embodiments, the set of nodes is connected to a Single Route Input/Output Virtualization (SR-IOV) physical network interface card (PNIC). The SR-IOV NIC includes (1) an embedded switch that executes a physical function (PF) that represents a port of the PNIC, and 2i) a set of one or more virtual functions (VFs) that represents a set of one or more virtual interfaces of the PNIC that connects to each pod. In such embodiments, at least one networking interface of each pod connects to a VF of the PNIC. In some embodiments, each pod is connected to its own VF of the PNIC such that no two pods connect to a same VF. In other embodiments, at least two pods connect to a same VF of the PNIC.

The set of nodes is connected in other embodiments to an open virtual switch (OVS). In such embodiments, at least one networking interface of each pod connects to shared memory packet interfaces (memifs) of the OVS to connect to the OVS. In some embodiments, each pod connects to a different memif. In other embodiments, at least two pods connect to a same memif.

In some embodiments, the edge device is deployed in a particular public cloud. The particular public cloud is managed by a particular public cloud provider (e.g., Amazon Web Services (AWS), Google Cloud Platform (GCP), Microsoft Azure, etc.). The edge cluster operates in a particular availability zone of the particular public cloud provider. Conjunctively or alternatively, the edge cluster operates in a particular datacenter of the particular public cloud provider. In other embodiments, the edge cluster is deployed in a particular private cloud (e.g., vSphere offered by VMware inc.).

Some embodiments provide a novel method for monitoring an edge device deployed as a cluster of pods. The method deploys, on a set of nodes, the edge device as a set of one or more L4 pods and a set of one or more L7 pods. The set of L4 pods performs L4 service operations for data message flows traversing the edge device and the set of L7 pods performs L7 service operations for the data message flows. The method monitors (1) one or more resources of each L7 pod to determine whether to add additional L7 pods to the set of L7 pods or to remove one or more L7 pods from the set of L7 pods, (2) the one or more resources of each L7 pod to determine whether to increase or decrease the one or more resources allotted to the L7 pod, and (3) load on each node to determine whether to add additional nodes to the set of nodes that deploy the edge device or to remove one or more nodes from the set of nodes.

The edge device is deployed as the set of pods to perform edge services at a boundary between a logical network and one or more external networks. The set of pods executes within the logical network, and handles north-south traffic entering and exiting the logical network. In some embodiments, the edge device also handles east-west traffic within the logical network. By deploying L4 and L7 pods separately, the different service types are able to be monitored and scaled independently of each other.

In some embodiments, the method is performed by a master node of the set of nodes (as the set of nodes is a set of worker nodes) that executes a horizontal pod autoscaler (HPA), a vertical pod autoscaler (VPA), and a cluster autoscaler. In such embodiments, the HPA monitors the resources of the L7 pods to determine when to add and remove L7 pods from the edge cluster, the VPA monitors the resources of the L7 pods to determine when to increase or decrease the resources, and the cluster autoscaler monitors the load on the nodes to determine whether to add or remove nodes from the node set executing the edge cluster.

The HPA in some embodiments monitors CPU usage of each L7 pod to determine whether the CPU usage of each L7 pod exceeds a particular threshold. In such embodiments, when the HPA determines that a particular CPU usage of a first L7 pod exceeds the particular threshold (e.g., 80%), the HPA deploys a second L7 pod for the edge cluster to alleviate load on the first L7 pod. After deploying the second L7 pod, the HPA has the second L7 pod perform services on flows previously performed by the first L7 pod. The HPA may add or remove L7 pods based on any metrics and parameters of L7 pods, such as memory, system load, network interface card (NIC) throughput, latency, etc.

The first L7 pod performs a particular set of L7 services. In some embodiments, the second L7 pod also performs the particular set of L7 services such that can perform all the same services as the first L7 pod. In such embodiments, the second L7 pod performs the L7 services for a particular subset of the flows previously all performed by the first L7 pod. In other embodiments, the second L7 pod performs a subset of the particular set of L7 services performed by the first L7 pod. In such embodiments, the second L7 pod alleviates the load on the first L7 pod by performing some of the services the first L7 pod previously performed.

In some embodiments, the first L7 pod and the second L7 pod execute on a same node of the set of nodes. In other embodiments, the first L7 pod executes on a first node of the set of nodes and the second L7 pod executes on a second node of the set of nodes.

The HPA in some embodiments also removes L7 pods from the edge cluster after determining that they do not reach a minimum capacity requirement. In such embodiments, when deleting an L7 pod from the edge cluster, the HPA reconfigures at least other L7 pod to perform the L7 services on the flows previously processed by the deleted L7 pod.

The VPA in some embodiments monitors CPU usage of each L7 pod to determine whether the CPU usage of each L7 pod exceeds a particular threshold. In such embodiments, after determining that a particular CPU usage of a particular L7 pod exceeds the particular threshold (e.g., 80%), the VPA increases a total amount of CPU allotted to the particular L7 pod to alleviate load on the particular L7 pod. By increasing the amount of CPU provisioned for the particular L7 pod, the particular L7 pod no longer exceeds the particular threshold amount of CPU usage.

The cluster autoscaler in some embodiments monitors CPU usage of each node in the node set to determine whether the CPU usage of each node exceeds a particular threshold (e.g., 80%). After determining that a particular CPU usage of a first node executing first and second L7 pods exceeds the particular threshold, the cluster autoscaler migrates the second L7 pod from the first node to a second node to alleviate the load on the first node. Now, the first node does not have the CPU used by the second L7 pod, so it does not risk dropping data message flows (which occurs in some embodiments when a node is overloaded).

In some embodiments, the second node now executing the second L7 pod also executes a third L7 pod for the edge cluster. In such embodiments, the second node was already part of the node set executing the edge cluster. In other embodiments, the second node does not execute any other pods for the edge cluster (L7 pods or L4 pods) such that the second node was added to the set of nodes after migrating the second L7 pod to the second node.

The HPA and VPA in some embodiments also monitor (1) one or more resources of each L4 pod to determine whether to add additional L4 pods to the set of L4 pods or to remove one or more L4 pods from the set of L4 pods, and (2) the one or more resources of each L4 pod to determine whether to increase or decrease the one or more resources allotted to the L4 pod. By monitoring each L4 pod independently of each L7 pod, the master node independently monitors and scales the different service types performed by the edge device. Such monitoring and scaling is performed similarly to the embodiments described above for L7 pods.

Some embodiments provide a novel method for deploying edge clusters for different tenants. The method deploys, on a set of nodes, (1) a first set of L7 pods in a first namespace of a first subset of nodes, and (2) a second set of L7 pods in a second namespace of a second subset of nodes. The first set of L7 pods performs L7 services for a first edge cluster of a first tenant. The second set of L7 pods performs L7 services for a second edge cluster of a second tenant. Each set of L7 pods is deployed in a different namespace to logically isolate the first and second sets of L7 pods.

The method is performed in some embodiments by an SDN manager and controller set. In such embodiments, the SDN manager and controller set orchestrates the configuration and management of the first and second edge clusters for the first and second tenants.

The edge clusters are deployed as the first and second sets of L7 pods to perform edge services at a boundary between at least one logical network and at least one external network. Each set of pods executes within a logical network, and handles north-south traffic entering and exiting the logical network. In some embodiments, each set of pods also handles east-west traffic within the associated logical network.

In some embodiments, the SDN manager and controller set also deploys an L4 pod on a particular node in the set of nodes to perform L4 service operations for each of the first and second tenants. In such embodiments, the L4 pod is the only L4 pod deployed for the first and second edge clusters. The SDN manager and controller set deploys one L4 pod for multiple tenants in some embodiments to save compute cost and power.

Alternatively, the L4 pod is a first L4 pod of a pair of L4 pods deployed as a high availability (HA) pair for the first and second edge clusters. In such embodiments, the first L4 pod is designated as the active L4 pod, and the second L4 pod is designated as the standby L4 pod. An HA configuration is used for L4 services in some embodiments such that, in the event of a failure of the active L4 pod, the standby L4 pod will become the new active L4 pod and perform the L4 services for the first and second edge clusters. In such embodiments, only one L4 pod is active at a time.

In some embodiments, the SDN manager and controller set deploys a first L4 pod for performing a first set of L4 service operations for the first tenant, and deploys a second L4 pod for performing a second set of L4 service operations for the second tenant. In such embodiments, each tenant has their own L4 pod (or pair of HA L4 pods, in some embodiments) deployed in their respective namespaces to completely logically isolate the first and second edge clusters. The first L4 pod is deployed in some embodiments on a first node and the second L4 pod is deployed on a second node. In some of these embodiments, the first and subsets of nodes are mutually exclusive, meaning that no node is part of both subsets of nodes. Alternatively, the first and second subsets of nodes include at least one same node, meaning that at least one pod (i.e., an L4 pod or an L7 pod) for each edge cluster executes on a same node. In both embodiments, the first L7 pod is deployed in the first namespace and the second L7 pod is deployed in the second namespace.

In other embodiments, the first and second L4 pods are deployed on a same node. The first and second subsets of nodes can both include just this same node, or they can also both include at least one other node (i.e., the node subsets include at least two same nodes). In both embodiments, the first L7 pod is deployed in the first namespace and the second L7 pod is deployed in the second namespace.

In some embodiments, the first subset of nodes includes only one node. For example, the L4 pod used by the first edge cluster and all L7 pods deployed for the first edge cluster are deployed on only one node. In some of these embodiments, the second subset of nodes includes at least two nodes. Any edge cluster can include any total number of pods (i.e., of L4 pods and L7 pods) and can span any number of nodes.

In some embodiments, each L7 pod of each edge cluster is associated with a different logical router. In such embodiments, each T0 and T1 router represented by the first edge cluster is associated with its own L7 pod, and each T0 and T1 router represented by the second edge cluster is associated with its own L7 pod. In other embodiments, each L7 pod of the first edge cluster performs a different L7 service, and each L7 pod of the second edge cluster performs a different L7 service. In such embodiments, each different service for each edge cluster is performed by a different L7 pod. This is beneficial for deploying one router that performs multiple services as an edge cluster.

The first and second sets of L7 pods are deployed in some embodiments respectively according to the first and second sets of criteria received from the first and second tenants. In such embodiments, the SDN manager and controller set receives the first set of criteria from the first tenant (e.g., in an API request), and receives the second set of criteria from the second tenant (e.g., in an API request).

Some embodiments provide a novel method for providing Quality of Service (QoS) to first and second tenants sharing a particular pod deployed for first and edge devices of the first and second tenants. The particular pod performs one or more middlebox services for data message flows associated with the first and second tenants. The method collects metrics related to a first set of data message flows associated with the first tenant and a second set of data message flows associated with the second tenant. The first and second sets of data message flows are processed by the particular pod. The method uses the collected metrics to determine that the first set of data message flows is consuming more resources of the particular pod than assigned to the first tenant. Based on the determination, the method provides the first set of data message flows to a queue before the particular pod performs the one or more middlebox services on the first set of data message flows to limit a rate of processing of the first set of data message flows.

The method is performed in some embodiments by a QoS provider module of the particular pod that monitors flow processing of one or more middlebox service modules of the particular pod. In other embodiments, the method is performed by a master node that schedules the particular pod. Still, in other embodiments, a set of one or more SDN managers and controllers perform the method.

In some embodiments, the particular pod is a particular L4 pod that performs a set of one or more L4 services for the first and second edge devices. In some of these embodiments, the particular L4 pod performs all L4 services for the first and second edge devices. Alternatively, the particular L4 pod is a first L4 pod, the set of L4 services is a first set of L4 services, a second L4 pod performs a second set of one or more L4 services for the first edge device, and a third L4 pod performs the second set of one or more L4 services for the second edge device. More specifically, the first L4 pod performs some L4 service operations for the first and second edge device, while other L4 service operations are performed by other L4 pods dedicated to each edge device.

In other embodiments, the particular pod is a particular L7 pod that performs a set of one or more L7 services for the first and second edge devices. In some of these embodiments, the particular L7 pod is a first L7 pod, the set of L7 services is a first set of L7 services, a second L7 pod performs a second set of one or more L7 services for the first edge device, and a third L7 pod performs the second set of one or more L7 services for the second edge device. More specifically, the first L7 pod performs some L7 service operations for the first and second edge device, while other L7 service operations are performed by other L7 pods dedicated to each edge device. The second L7 pod is exclusive to the first edge device, meaning that no other edge devices, including the second edge device, include the second L7 pod. The third L7 pod is exclusive to the second edge device, meaning that no other edge devices, including the first edge device, include the third L7 pod.

In some embodiments, the first, second, and third L7 pods are deployed on a particular node managed by a master node that schedules the first, second, and third L7 pods of the first and second edge devices. In other embodiments, the first L7 pod is deployed on a first node, the second L7 pod is deployed on a second node, and the third L7 pod is deployed on a third node. Still, in other embodiments, the first L7 pod is deployed on a first node and the second and third L7 pods are deployed on a second node. Regardless of where each L7 pod is deployed, they are all managed by a master node that schedules the first, second, and third L7 pods for the first and second edge devices.

The metrics are collected in some embodiments by monitoring a volume of each data message flow in the first and second sets of data message flows to determine a number of data messages of the flow being processed at the particular pod. In such embodiments, the method determines that the first set of flows is consuming more resources of the particular pod than assigned to the first tenant by determining that a particular number of data messages of the first set of data message flows exceeds a particular threshold number of data messages allotted to be processed at the particular pod. By determining that more data messages of the first tenant's flows are being processed than is allowed by the first tenant's rate limit, the method determines that the first tenant's flows should be queued in order to limit their rate.

In some embodiments, the particular pod includes the queue, and the method provides the first set of data message flows to the queue before the particular pod performs the one or more middlebox services by providing the first set of data message flows to the queue of the particular pod before a set of one or more middlebox service modules of the particular pod performs the one or more middlebox services on the first set of data message flows. By having the first set of flows be held in the queue before being processed by the middlebox service modules, the method ensures that the first tenant's flows are not consuming resources (e.g., CPU usage, memory usage, etc.) that should be used by the second tenant's flows.

In some embodiments, the first and second edge devices are deployed in a particular public cloud. The particular public cloud is managed by a particular public cloud provider. The edge devices operate in a one or more availability zones of the particular public cloud provider. Conjunctively or alternatively, the edge devices operate in one or more datacenters of the particular public cloud provider. In other embodiments, the edge cluster is deployed in a particular private cloud (e.g., vSphere offered by VMware inc.).

The first edge device in some embodiments includes a first set of other pods (e.g., L7 pods or L4 pods) operating in a first virtual private cloud (VPC) of the particular public cloud, the second edge device includes a second set of other pods operating in a second VPC of the particular public cloud. In such embodiments, the first and second sets of pods are not shared by other tenants (i.e., they are dedicated to their respective tenant), so they are able to be deployed in VPCs, unlike the particular pod which is shared by both tenants.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
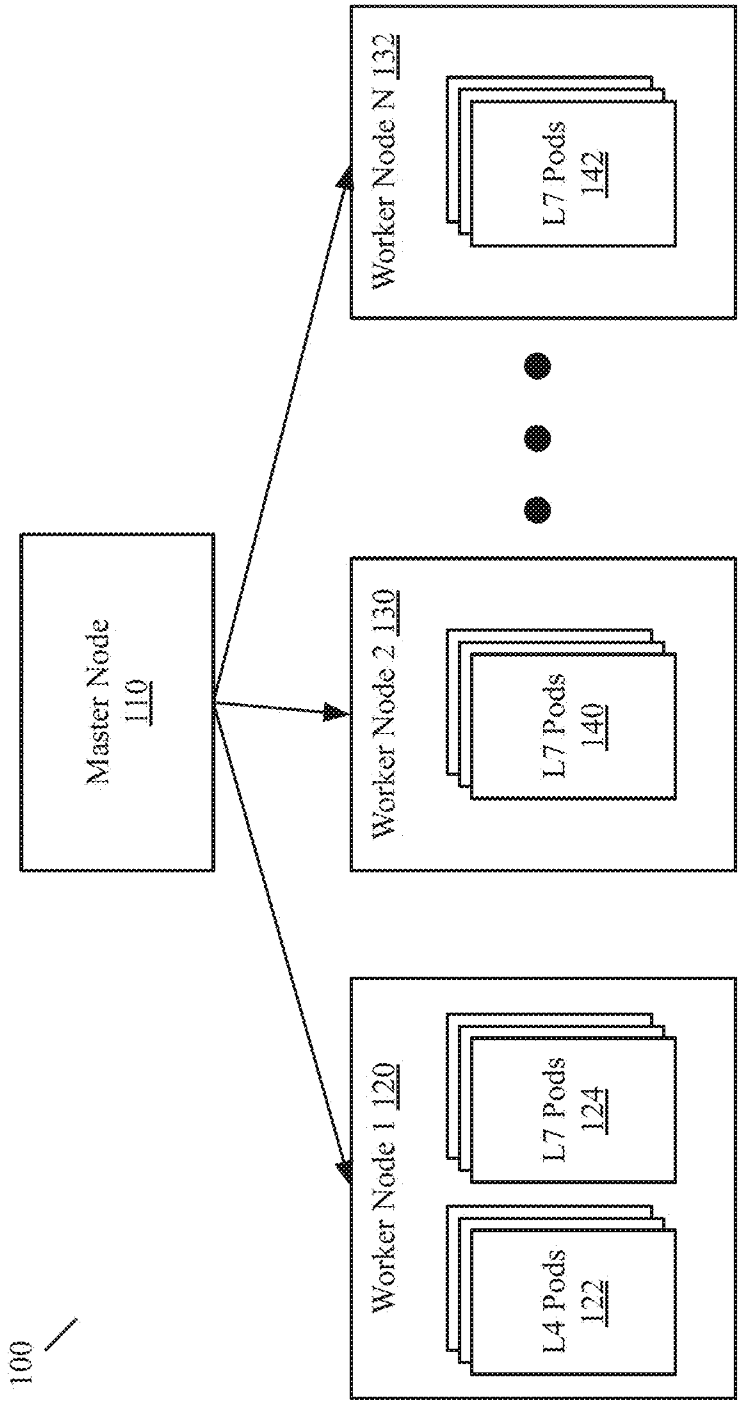
FIG. 1 illustrates an edge architecture to deploy an edge device as a set of pods.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for deploying an edge device as a cluster of pods. The method receives a set of criteria for deploying the edge device. The method uses the set of criteria to deploy the edge device as a set of one or more pods executing on a set of one or more nodes. The method implements, on the set of pods, a set of one or more services to perform on data message flows. At least two pods deployed for the edge cluster perform different service operations of different service types such that the different service types are able to be scaled independently.

The edge device is deployed as the set of pods to perform edge services at a boundary between a logical network and one or more external networks. The set of pods executes within the logical network, and handles north-south traffic entering and exiting the logical network. In some embodiments, the edge device also handles east-west traffic within the logical network.

In some embodiments, the method is performed by a set of software defined network (SDN) managers and controllers. In such embodiments, the SDN manager and controller set orchestrates the configuration and management of the edge device (also referred to as an edge cluster, in some embodiments). The particular node in some embodiments implements a particular Layer 4 (L4) pod that performs L4 service operations for the data message flows. The particular L4 pod performs all L4 services for the edge device such that no other pods of the edge device perform any L4 services. The L4 pod in some embodiments also performs Layer 2 (L2) and/or Layer 3 (L3) service operations for the data message flows.

Conjunctively or alternatively, the particular L4 pod is a first L4 pod of a pair of L4 pods deployed as a high availability (HA) pair for the edge cluster. In such embodiments, the first L4 pod is designated as the active L4 pod, and the second L4 pod is designated as the standby L4 pod. An HA configuration is used for L4 services in some embodiments such that, in the event of a failure of the active L4 pod, the standby L4 pod will become the new active L4 pod and perform the L4 services for the edge device.

The particular node in some embodiments also implements a first set of one or more Layer 7 (L7) pods that performs L7 service operations for a first set of the data message flows. In such embodiments, the set of L7 pods performs L7 services for at least a subset of flows traversing the edge device. In some of these embodiments, the particular node is a first node, and a second node implements a second set of one or more L7 pods that performs the L7 service operations for a second set of the data message flows. In such embodiments, the SDN manager and controller set deploys different L7 pods on different worker nodes for the edge cluster. L7 pods in some embodiments also perform Layer 5 (L5) and/or Layer 6 (L6) service operations.

In some embodiments, each L7 pod of the edge device is associated with a different logical router. In such embodiments, each Tier-0 (T0) and Tier-1 (T1) router represented by the edge device is associated with its own L7 pod. In other embodiments, each L7 pod of the edge cluster performs a different L7 service. In such embodiments, each different service is performed by a different L7 pod. This is beneficial for deploying one router that performs multiple services as the edge device.

The set of criteria is received in some embodiments in an Application Programming Interface (API) request specifying the set of criteria. In such embodiments, the SDN manager and controller set parses the API request to extract the set of criteria from the API request. Examples of criteria included in the set of criteria includes (1) a minimum or maximum number of pods to deploy for the edge device, (2) a desired size of each pod, (3) a desired amount of central processing unit (CPU) and/or memory of each pod, and (4) a specification of the services the user wishes the edge device to implement. Conjunctively or alternatively, the SDN manager and controller set receives the set of criteria from a master node's API server instead of receiving the API request. In such embodiments, the SDN manager and controller set does not have to parse the API request to extract the set of criteria. The master node is the master of the set of nodes (which are worker nodes) and schedules the pods on the set of worker nodes. A master node is a Kubernetes master node that manages worker nodes and schedules pods on the worker nodes. Worker nodes are Kubernetes nodes that implement pods (e.g., for edge clusters).

In some embodiments, each pod (i.e., each L4 pod and each L7 pod) is associated with a set of one or more networking interfaces. In some of these embodiments, the set of nodes is connected to a Single Route Input/Output Virtualization (SR-IOV) physical network interface card (PNIC). The SR-IOV NIC includes (1) an embedded switch that executes a physical function (PF) that represents a port of the PNIC, and 2i) a set of one or more virtual functions (VFs) that represents a set of one or more virtual interfaces of the PNIC that connects to each pod. In such embodiments, at least one networking interface of each pod connects to a VF of the PNIC. In some embodiments, each pod is connected to its own VF of the PNIC such that no two pods connect to a same VF. In other embodiments, at least two pods connect to a same VF of the PNIC.

The set of nodes is connected in other embodiments to an open virtual switch (OVS). In such embodiments, at least one networking interface of each pod connects to shared memory packet interfaces (memifs) of the OVS to connect to the OVS. In some embodiments, each pod connects to a different memif. In other embodiments, at least two pods connect to a same memif.

In some embodiments, the edge device is deployed in a particular public cloud. The particular public cloud is managed by a particular public cloud provider (e.g., Amazon Web Services (AWS), Google Cloud Platform (GCP), Microsoft Azure, etc.). The edge cluster operates in a particular availability zone of the particular public cloud provider. Conjunctively or alternatively, the edge cluster operates in a particular datacenter of the particular public cloud provider. In other embodiments, the edge cluster is deployed in a particular private cloud (e.g., vSphere offered by VMware inc.).

Some embodiments provide a novel method for monitoring an edge device deployed as a cluster of pods. The method deploys, on a set of nodes, the edge device as a set of one or more L4 pods and a set of one or more L7 pods. The set of L4 pods performs L4 service operations for data message flows traversing the edge device and the set of L7 pods performs L7 service operations for the data message flows. The method monitors (1) one or more resources of each L7 pod to determine whether to add additional L7 pods to the set of L7 pods or to remove one or more L7 pods from the set of L7 pods, (2) the one or more resources of each L7 pod to determine whether to increase or decrease the one or more resources allotted to the L7 pod, and (3) load on each node to determine whether to add additional nodes to the set of nodes that deploy the edge device or to remove one or more nodes from the set of nodes.

The edge device is deployed as the set of pods to perform edge services at a boundary between a logical network and one or more external networks. The set of pods executes within the logical network, and handles north-south traffic entering and exiting the logical network. In some embodiments, the edge device also handles cast-west traffic within the logical network. By deploying L4 and L7 pods separately, the different service types are able to be monitored and scaled independently of each other.

In some embodiments, the method is performed by a master node of the set of nodes (as the set of nodes is a set of worker nodes) that executes a horizontal pod autoscaler (HPA), a vertical pod autoscaler (VPA), and a cluster autoscaler. In such embodiments, the HPA monitors the resources of the L7 pods to determine when to add and remove L7 pods from the edge cluster, the VPA monitors the resources of the L7 pods to determine when to increase or decrease the resources, and the cluster autoscaler monitors the load on the nodes to determine whether to add or remove nodes from the node set executing the edge cluster.

The HPA in some embodiments monitors CPU usage of each L7 pod to determine whether the CPU usage of each L7 pod exceeds a particular threshold. In such embodiments, when the HPA determines that a particular CPU usage of a first L7 pod exceeds the particular threshold (e.g., 80%), the HPA deploys a second L7 pod for the edge cluster to alleviate load on the first L7 pod. After deploying the second L7 pod, the HPA has the second L7 pod perform services on flows previously performed by the first L7 pod. The HPA may add or remove L7 pods based on any metrics and parameters of L7 pods, such as memory, system load, network interface card (NIC) throughput, latency, etc.

The first L7 pod performs a particular set of L7 services. In some embodiments, the second L7 pod also performs the particular set of L7 services such that can perform all the same services as the first L7 pod. In such embodiments, the second L7 pod performs the L7 services for a particular subset of the flows previously all performed by the first L7 pod. In other embodiments, the second L7 pod performs a subset of the particular set of L7 services performed by the first L7 pod. In such embodiments, the second L7 pod alleviates the load on the first L7 pod by performing some of the services the first L7 pod previously performed.

In some embodiments, the first L7 pod and the second L7 pod execute on a same node of the set of nodes. In other embodiments, the first L7 pod executes on a first node of the set of nodes and the second L7 pod executes on a second node of the set of nodes.

The HPA in some embodiments also removes L7 pods from the edge cluster after determining that they do not reach a minimum capacity requirement. In such embodiments, when deleting an L7 pod from the edge cluster, the HPA reconfigures at least other L7 pod to perform the L7 services on the flows previously processed by the deleted L7 pod.

The VPA in some embodiments monitors CPU usage of each L7 pod to determine whether the CPU usage of each L7 pod exceeds a particular threshold. In such embodiments, after determining that a particular CPU usage of a particular L7 pod exceeds the particular threshold (e.g., 80%), the VPA increases a total amount of CPU allotted to the particular L7 pod to alleviate load on the particular L7 pod. By increasing the amount of CPU provisioned for the particular L7 pod, the particular L7 pod no longer exceeds the particular threshold amount of CPU usage.

The cluster autoscaler in some embodiments monitors CPU usage of each node in the node set to determine whether the CPU usage of each node exceeds a particular threshold (e.g., 80%). After determining that a particular CPU usage of a first node executing first and second L7 pods exceeds the particular threshold, the cluster autoscaler migrates the second L7 pod from the first node to a second node to alleviate the load on the first node. Now, the first node does not have the CPU used by the second L7 pod, so it does not risk dropping data message flows (which occurs in some embodiments when a node is overloaded).

The HPA and VPA in some embodiments also monitor (1) one or more resources of each L4 pod to determine whether to add additional L4 pods to the set of L4 pods or to remove one or more L4 pods from the set of L4 pods, and (2) the one or more resources of each L4 pod to determine whether to increase or decrease the one or more resources allotted to the L4 pod. By monitoring each L4 pod independently of each L7 pod, the master node independently monitors and scales the different service types performed by the edge device. Such monitoring and scaling is performed similarly to the embodiments described above for L7 pods.

Some embodiments provide a novel method for deploying edge clusters for different tenants. The method deploys, on a set of nodes, (1) a first set of L7 pods in a first namespace of a first subset of nodes, and (2) a second set of L7 pods in a second namespace of a second subset of nodes. The first set of L7 pods performs L7 services for a first edge cluster of a first tenant. The second set of L7 pods performs L7 services for a second edge cluster of a second tenant. Each set of L7 pods is deployed in a different namespace to logically isolate the first and second sets of L7 pods.

The method is performed in some embodiments by an SDN manager and controller set. In such embodiments, the SDN manager and controller set orchestrates the configuration and management of the first and second edge clusters for the first and second tenants.

The edge clusters are deployed as the first and second sets of L7 pods to perform edge services at a boundary between at least one logical network and at least one external network. Each set of pods executes within a logical network, and handles north-south traffic entering and exiting the logical network. In some embodiments, each set of pods also handles east-west traffic within the associated logical network.

In some embodiments, the SDN manager and controller set also deploys an L4 pod on a particular node in the set of nodes to perform L4 service operations for each of the first and second tenants. In such embodiments, the L4 pod is the only L4 pod deployed for the first and second edge clusters. The SDN manager and controller set deploys one L4 pod for multiple tenants in some embodiments to save compute cost and power.

Alternatively, the L4 pod is a first L4 pod of a pair of L4 pods deployed as a high availability (HA) pair for the first and second edge clusters. In such embodiments, the first L4 pod is designated as the active L4 pod, and the second L4 pod is designated as the standby L4 pod. An HA configuration is used for L4 services in some embodiments such that, in the event of a failure of the active L4 pod, the standby L4 pod will become the new active L4 pod and perform the L4 services for the first and second edge clusters. In such embodiments, only one L4 pod is active at a time.

In some embodiments, the SDN manager and controller set deploys a first L4 pod for performing a first set of L4 service operations for the first tenant, and deploys a second L4 pod for performing a second set of L4 service operations for the second tenant. In such embodiments, each tenant has their own L4 pod (or pair of HA L4 pods, in some embodiments) deployed in their respective namespaces to completely logically isolate the first and second edge clusters. The first L4 pod is deployed in some embodiments on a first node and the second L4 pod is deployed on a second node. In some of these embodiments, the first and subsets of nodes are mutually exclusive, meaning that no node is part of both subsets of nodes. Alternatively, the first and second subsets of nodes include at least one same node, meaning that at least one pod (i.e., an L4 pod or an L7 pod) for each edge cluster executes on a same node. In both embodiments, the first L7 pod is deployed in the first namespace and the second L7 pod is deployed in the second namespace.

In other embodiments, the first and second L4 pods are deployed on a same node. The first and second subsets of nodes can both include just this same node, or they can also both include at least one other node (i.e., the node subsets include at least two same nodes). In both embodiments, the first L7 pod is deployed in the first namespace and the second L7 pod is deployed in the second namespace.

Some embodiments provide a novel method for providing Quality of Service (QoS) to first and second tenants sharing a particular pod deployed for first and edge devices of the first and second tenants. The particular pod performs one or more middlebox services for data message flows associated with the first and second tenants. The method collects metrics related to a first set of data message flows associated with the first tenant and a second set of data message flows associated with the second tenant. The first and second sets of data message flows are processed by the particular pod. The method uses the collected metrics to determine that the first set of data message flows is consuming more resources of the particular pod than assigned to the first tenant. Based on the determination, the method provides the first set of data message flows to a queue before the particular pod performs the one or more middlebox services on the first set of data message flows to limit a rate of processing of the first set of data message flows.

The method is performed in some embodiments by a QoS provider module of the particular pod that monitors flow processing of one or more middlebox service modules of the particular pod. In other embodiments, the method is performed by a master node that schedules the particular pod. Still, in other embodiments, a set of one or more SDN managers and controllers perform the method.

In some embodiments, the particular pod is a particular L4 pod that performs a set of one or more L4 services for the first and second edge devices. In some of these embodiments, the particular L4 pod performs all L4 services for the first and second edge devices. Alternatively, the particular L4 pod is a first L4 pod, the set of L4 services is a first set of L4 services, a second L4 pod performs a second set of one or more L4 services for the first edge device, and a third L4 pod performs the second set of one or more L4 services for the second edge device. More specifically, the first L4 pod performs some L4 service operations for the first and second edge device, while other L4 service operations are performed by other L4 pods dedicated to each edge device.

In other embodiments, the particular pod is a particular L7 pod that performs a set of one or more L7 services for the first and second edge devices. In some of these embodiments, the particular L7 pod is a first L7 pod, the set of L7 services is a first set of L7 services, a second L7 pod performs a second set of one or more L7 services for the first edge device, and a third L7 pod performs the second set of one or more L7 services for the second edge device. More specifically, the first L7 pod performs some L7 service operations for the first and second edge device, while other L7 service operations are performed by other L7 pods dedicated to each edge device. The second L7 pod is exclusive to the first edge device, meaning that no other edge devices, including the second edge device, include the second L7 pod. The third L7 pod is exclusive to the second edge device, meaning that no other edge devices, including the first edge device, include the third L7 pod.

In some embodiments, the first, second, and third L7 pods are deployed on a particular node managed by a master node that schedules the first, second, and third L7 pods of the first and second edge devices. In other embodiments, the first L7 pod is deployed on a first node, the second L7 pod is deployed on a second node, and the third L7 pod is deployed on a third node. Still, in other embodiments, the first L7 pod is deployed on a first node and the second and third L7 pods are deployed on a second node. Regardless of where each L7 pod is deployed, they are all managed by a master node that schedules the first, second, and third L7 pods for the first and second edge devices.

The metrics are collected in some embodiments by monitoring a volume of each data message flow in the first and second sets of data message flows to determine a number of data messages of the flow being processed at the particular pod. In such embodiments, the method determines that the first set of flows is consuming more resources of the particular pod than assigned to the first tenant by determining that a particular number of data messages of the first set of data message flows exceeds a particular threshold number of data messages allotted to be processed at the particular pod.

By determining that more data messages of the first tenant's flows are being processed than is allowed by the first tenant's rate limit, the method determines that the first tenant's flows should be queued in order to limit their rate.

In some embodiments, the particular pod includes the queue, and the method provides the first set of data message flows to the queue before the particular pod performs the one or more middlebox services by providing the first set of data message flows to the queue of the particular pod before a set of one or more middlebox service modules of the particular pod performs the one or more middlebox services on the first set of data message flows. By having the first set of flows be held in the queue before being processed by the middlebox service modules, the method ensures that the first tenant's flows are not consuming resources (e.g., CPU usage, memory usage, etc.) that should be used by the second tenant's flows.

In some embodiments, the first and second edge devices are deployed in a particular public cloud. The particular public cloud is managed by a particular public cloud provider. The edge devices operate in a one or more availability zones of the particular public cloud provider. Conjunctively or alternatively, the edge devices operate in one or more datacenters of the particular public cloud provider. In other embodiments, the edge cluster is deployed in a particular private cloud (e.g., vSphere offered by VMware inc.).

The first edge device in some embodiments includes a first set of other pods (e.g., L7 pods or L4 pods) operating in a first virtual private cloud (VPC) of the particular public cloud, the second edge device includes a second set of other pods operating in a second VPC of the particular public cloud. In such embodiments, the first and second sets of pods are not shared by other tenants (i.e., they are dedicated to their respective tenant), so they are able to be deployed in VPCs, unlike the particular pod which is shared by both tenants.

Some embodiments deploy an edge cluster as multiple containers, which is easier to manage and scale than a single edge appliance and which opens more opportunities for optimization. In previous architectures that deploy an edge as a single appliance, many limitations arise. For example, some applications require a high performance Transmission Control Protocol (TCP) stack on top of Data Plane Development Kit (DPDK). There are such userspace TPC stacks. However, some do not fully support TCP RFCs, and many require application changes as they do not support Portable Operating System Interface (POSIX) socket APIs.

As another example, many applications are very CPU intensive (e.g., TLS proxy requires a large amount of CPU for cryptography operations). Still, as another example, scalability is limited to one node. When an edge appliance is deployed, a user can choose a fixed size of the appliance, which is mapped to a particular amount of CPU and memory resources. This results in a trade-off between CPU cost and performance.

Because of these limitations of edge appliances, the described embodiments describe deploying an edge as a multi-container cluster which (1) presents a split datapath design to more easily scale and maintain the edge without compromising performance, (2) provides multiple architecture embodiments for inter-pod networking, (3) implements a new memif device in OVS that allows leveraging a high performance virtual interface, and (4) presents embodiments for using smart NICs to offload services to save CPU cost. Deploying different service types (e.g., L4 vs. L7) as separate microservices provides for independently scale of services, limitless scape of capacity, better support of Quality of Service (QoS), and higher performance of inter-pod networking.

Many of the embodiments described herein are described in relation to a Kubernetes system, sometimes abbreviated "Kubes" or "K8s". However, one of ordinary skill in the art will understand that this is merely one example of a network system that embodies the inventions described herein and that other embodiments of the invention may apply to other network systems and container network systems. In the Kubernetes system, a container is an immutable (i.e., cannot be changed once it starts running), lightweight executable image that contains software (also referred to as the container runtime) and all of its dependencies (e.g., libraries, etc.) required for running an application. The containers decouple the applications from the underlying host infrastructure, thereby simplifying deployment. Examples of container runtimes that are supported by Kubernetes include Docker, containerd, CRI-O, and the Kubernetes Container Runtime Interface (CRI).

In some embodiments, a pod is executed as a set of one or more containers. In some such embodiments, each set of containers may execute within a respective pod. In a Kubernetes system, a pod is the smallest deployable unit that can be created (e.g., by a user), and acts as a logical host by containing the set of one or more tightly-coupled containers. Each pod includes storage and network resources (e.g., ports for communications external to the pod) to be shared by the containers executing in the pod, as well as a specification for how to run those containers. In some embodiments, the contents of a pod are always stored together and executed together. In addition to the templates and code that are supplied by the original programmers of the Kubernetes system, the system allows a user to create customized resources. The network control system of some embodiments processes one or more CRDs that define attributes of custom-specified network resources. The CRDs define extensions to the Kubernetes networking requirements.

Each pod, in some embodiments, is assigned a static Internet Protocol (IP) address that is then stored in a configuration file of the pod. In some embodiments, a pod is migrated from one pod to another pod. In some such embodiments, the static IP address assigned to the pod is maintained during the migration. Each namespace, in some embodiments, is assigned a set of IP addresses, and the static IP addresses assigned to the pods are provided from the set of IP addresses assigned to the pod's respective namespace. In some embodiments, the set of IP addresses includes a different number of IP addresses. For instance, the first namespace is assigned a different number of IP addresses than the second namespace, in some embodiments.

In some embodiments, the worker node is a machine (e.g., a virtual machine (VM)) executes on a host computer that includes a NIC for exchanging data with elements (e.g., other host computers, compute nodes, forwarding elements, etc.) external to the host computer. In some such embodiments, data sent from any of the sets of containers executing on the worker node to an element external to the host computer would be sent through the virtual Ethernet interface associated with the source set of containers, through the gateway interface, and through the NIC of the host computers. The worker node, in some embodiments, is one of multiple worker nodes executing on the host computer, along with a software switch that includes ports for forwarding data between interfaces of the worker nodes, as well as between these worker node interfaces and the NIC of the host computer (i.e., for sending data to a destination external to the host computer, such as a node executing on a different host computer). In other embodiments, each worker node executing one or more pods is a host computer.

An edge cluster is in some embodiments a set of one or more edge forwarding elements (also referred to as edge instances in some embodiments) deployed to implement a logical forwarding element (e.g., a logical router, a logical switch, etc.) at the boundary between a logical network and one or more external networks. The edge cluster is deployed to provide edge services (e.g., forwarding) to data message flows entering and exiting the logical network (i.e., north-south traffic) and to data message flows exchanged within the logical network (i.e., east-west traffic).

Each edge forwarding element of an edge cluster (i.e., each pod deployed for the edge cluster) typically handles north-south traffic, as the logical router the edge forwarding element represents for the logical network would handle north-south traffic between the network administrator's logical network and one or more external networks. In addition, each edge forwarding element in some embodiments handles east-west traffic within the logical network. For example, when a logical network has multiple network segments (e.g., separate logical L2 segments), the edge forwarding element of that logical network handles the east-west traffic between these network segments. This edge forwarding element can be used to send a data message from a first machine connected to a first L2 segment (e.g., a first logical switch) to a second machine connected to a second L2 segment (e.g., a second logical switch) by receiving the data message from the first machine and forwarding it to the second machine.

As used in this document, references to L2, L3, LA, L5, L6, and L7 layers (or Layer 2, Layer 3, Layer 4, Layer 5, Layer 6, or Layer 7) are references respectively to the second data link layer, the third network layer, the fourth transport layer, the fifth session layer, the sixth presentation layer, and the seventh application layer of the OSI (Open System Interconnection) layer model.

Some embodiments deploy an edge device as a Kubernetes cluster such that different service types (e.g., L4 vs. L7 services) are able to be scaled dynamically and independently of each other. FIG. 1 illustrates an edge architecture 100 in which a Kubernetes cluster implements an edge device, in some embodiments. As shown, the edge architecture 100 includes a master node 110 and a set of worker nodes 120, 130, and 132. The master node 110 is part of the control plane (not shown) in some embodiments.

In this example, the first worker node 120 executes a set of one or more L4 pods 122 for the edge cluster, which performs all L4 service operations for the edge cluster. In some embodiments, the L4 pod set 122 also performs L2-L3 services for the edge cluster. The L4 pod set 122 includes in some embodiments a pair of L4 pods. In such embodiments, the pair of L4 pods is configured in an HA configuration (e.g., all of the L4 pods can be active with ECMP routing supported or one of the L4 pods is designated as active and the other L4 pods are designated as standby). In such embodiments, in the event of a failure of the active L4 pod, the standby pod can become the active pod and perform the L4 services for the edge cluster. In some of these embodiments, when scaling out the L4 pod set 122 (i.e., when adding additional L4 pods to the edge cluster), L4 pods are added in HA pairs. Conjunctively or alternatively, L4 pods are added to the edge cluster individually when scaling out the edge cluster.

The first worker node 120 also executes a set of one or more L7 pods 124 that performs at least one of L7 service operations (e.g., TLS proxy, malware sandboxing, etc.) for the edge cluster. The L7 pods 124 in some embodiments also perform L5 and L6 service operations for the edge cluster. As such, the collection of worker nodes 120, 130, and 132 collectively implements an edge device that implements multiple logical routers to handle data traffic between a logical network and an external network.

The edge cluster can be deployed on any number of other worker nodes 130-132, and each of these worker nodes 130-132 can execute any number of L7 pods 140-142. In some embodiments, the worker nodes 120 and 130-132 and the pods 122-124 and 140-142 the worker nodes execute are managed by the master node 110. In some embodiments, the master node schedules the pods 122-124 and 140-142 on the worker nodes 120 and 130-132.

The master node 110, in some embodiments, controls and manages the worker nodes 120 and 130-132 of the cluster. In different embodiments, a cluster can include one master node or multiple master nodes, depending on the size of the cluster deployment. When multiple master nodes are included for a large cluster, these master nodes provide high-availability solutions for the cluster.

Each master node 110, in some embodiments, includes various components, such as an API server used for communications to elements external to the cluster, a set of controllers to run the cluster, a state database for the cluster (e.g., Etcd), and a scheduler for scheduling pods across the worker nodes and for scheduling functionalities for worker nodes in the cluster. In some embodiments, the master node 110 executes on a first server, while the worker nodes managed by the master node 110 execute on one or more other servers.

In some embodiments, the L4 pod set 122 executes a set of run-to-completion threads for processing data messages sent between the logical network and the external network and a set of control threads for handling control plane operations. Each respective run-to-completion thread executed by the L4 pod set 122, in some embodiments, is assigned to a respective core of a first set of cores of a computing device on which the L4 pod set 122 executes, while the set of control threads is scheduled between a second set of cores of the computing device.

Half of the available cores, in some embodiments, are allocated to these run-to-completion data message processing threads by default, with each such thread pinned to one core. All other processes and threads, in some such embodiments, are scheduled between the remaining available cores. In some embodiments, the edge appliance supports a dynamic split of CPUs between the two categories of threads, based on the actual CPU usage of both categories, and makes adjustments if needed.

In some embodiments, due to the threads executed by the L4 pod set 122 being assigned to the cores of the computing device, the L4 pod set 122 is "affinitized" to the worker node 120. Pods that are affinitized to a particular node, in some embodiments, cannot be rescheduled (i.e., moved) to a different node in the cluster. L4 pods are affinitized to one or more worker nodes in some embodiments to ensure that gateway pods are hosted in different failure domains or availability zones, as they are required for external access.

In some embodiments, other pods, such as pods that have local storage on the node and pods that are not managed by the controller, also cannot be rescheduled to other nodes. Unlike the L4 pod set 122, the L7 pods 124 and 140-142 (i.e., where L5-L7 services are implemented) can be scheduled on any available nodes in the node pool, in some embodiments.

Apart from the L4 pod set 122, each pod executing on the worker nodes 120 and 130-132 performs a set of data message processing operations for its respective logical router. These data message processing operations, in some embodiments, include L5-L7 service operations such as L7 firewall services, TLS services, L7 load balancing services, URL filtering, and DNS forwarding. In some embodiments, each service operation configured for at least one logical router is assigned to a separate pod (i.e., rather than the logical router being a single pod that collectively performs each of the service operations).

Some embodiments use exactly one pod per logical router, e.g., each logical router has a dedicated pod, which may require multiple service daemons running in each pod (i.e., each service daemon performing a service configured for the logical router). Different daemons can be put into separate containers or the same one, according to some embodiments. Alternatively, some embodiments use one pod per network function or service of a logical router (e.g., each service daemon running in the same pod). This arrangement works well for, e.g., an Autonomous Edge that includes a single logical router with many services. A logical router may be defined to include a distributed router and one or more centralized routers. In some embodiments, the separate pods for such a logical router includes a pod for the distributed router and additional pods for each of the centralized routers.

The L4 pod set 122, in some embodiments, performs its own respective set of data message processing operations for all of the logical routers. The set of data processing operations performed by the L4 pod set 122 for multiple logical routers, in some embodiments, includes L2-L4 operations, such as L2/L3 lookups, tunnel termination/encapsulation, firewall processing, packet updating, and byte counters. This can include logical network processing, such as logical switching and logical routing operations. While this figure shows only the first worker node executing L4 pods 122, in other embodiments, at least one other worker node of the edge architecture 100 executes one or more L4 pods. For example, some embodiments deploy one L4 pod per worker node executing the edge cluster.

Figure 2:
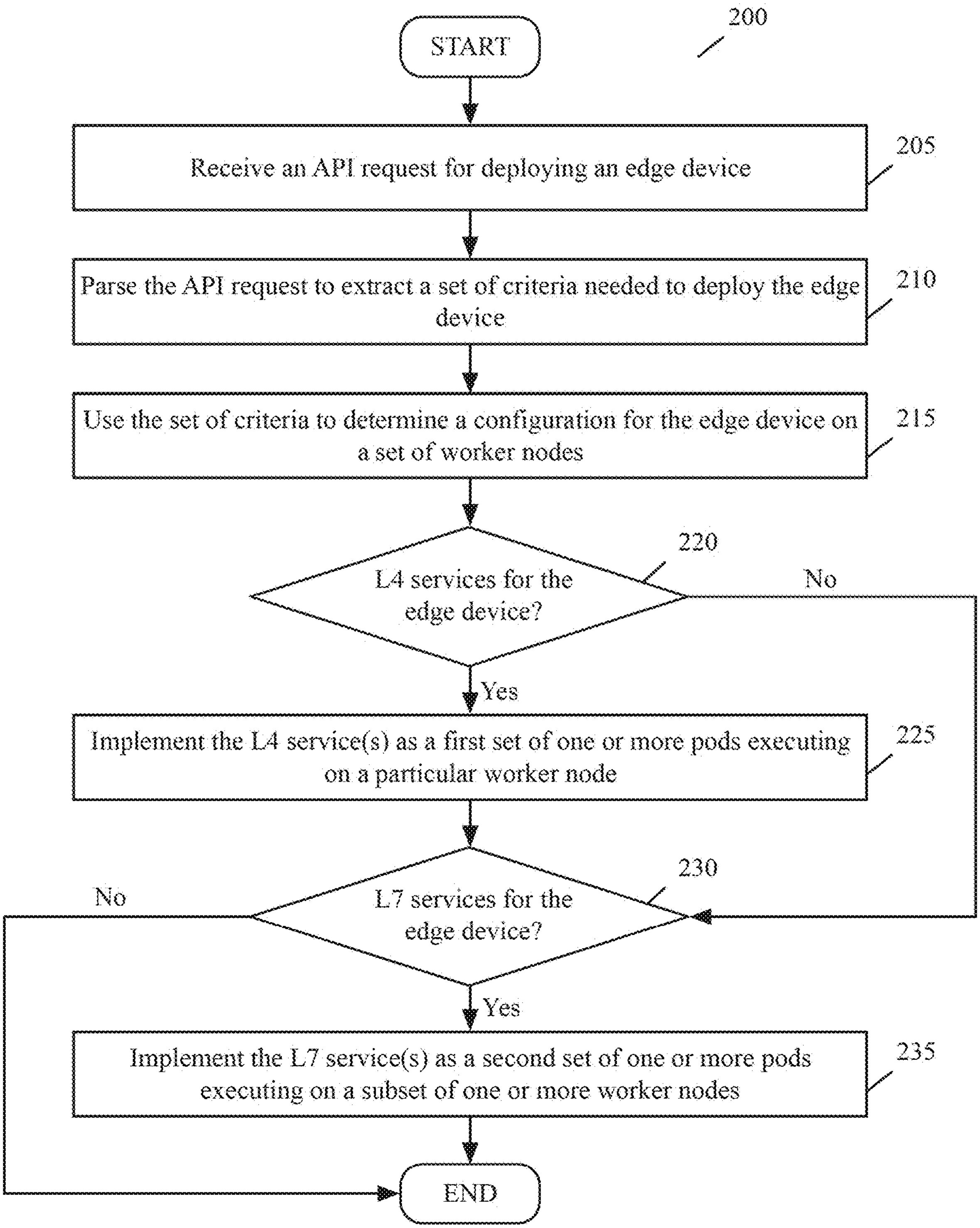
FIG. 2 conceptually illustrates a process of some embodiments for deploying an edge device as a Kubernetes cluster to dynamically and independently scale services implemented by the edge device.

FIG. 2 conceptually illustrates a process 200 of some embodiments for deploying an edge device as a Kubernetes cluster to dynamically and independently scale services implemented by the edge device. In some embodiments, the process 200 is performed by a set of SDN managers and controllers that directs a master node of the Kubernetes cluster. In some embodiments, the edge device is deployed for a particular user or tenant and the data message flows associated with the particular user.

The process 200 begins by receiving (at 205) an API request for deploying an edge device. In some embodiments, the SDN manager and controller set receives the API request from a master node (more specifically, from an NCP of the master node) which received it (e.g., at an API server) from the user requesting to deploy the edge cluster. In such embodiments, the API server and the NCP of the master node do not parse the API request before providing it to the SDN manager and controller set. In other embodiments, however, the API server parses the API request to extract a set of criteria needed to deploy the edge cluster, and provides the set of criteria to the SDN manager and controller.

Next, the process 200 parses (at 210) the API request to extract the set of criteria needed to deploy the edge cluster. The SDN manager and controller set in some embodiments extracts the set of criteria in order to know what requirements the user has for the edge device. For example, the set of criteria in some embodiments specifies (1) a minimum or maximum number of pods to deploy for the edge device, (2) a desired size of each pod, (3) a desired amount of CPU and/or memory of each pod, and/or (4) a specification of the services the user wishes the edge device to implement.

At 215, the process 200 uses the set of criteria to determine a configuration for the edge device on a set of one or more worker nodes. The SDN manager and controller set in some embodiments examines the set of criteria to determine the requirements needed for the edge device. After determining these requirements, the SDN manager and controller set determines the configuration of the edge device. In some embodiments, the configuration specifies (1) the number of pods to deploy for the edge device, (2) the size needed for each pod of the edge device, and/or (3) the amount of CPU and memory that needs to be allocated for each pod of the edge device.

Next, the process 200 determines (at 220) whether any L4 services need to be implemented by the edge device. In some embodiments, the set of criteria specifies which L4 services are to be performed by the edge cluster. In such embodiments, the SDN manager and controller set examines the set of criteria to determine whether it specifies any L4 services the edge device needs to implement. The SDN manager and controller set in some embodiments also determines whether any L2 or L3 services need to be implemented by the edge device. If the process 200 determines that no L4 services need to be implemented on the edge cluster, the process 200 proceeds to step 230, which will be described below.

If the process 200 determines that one or more L4 services need to be implemented by the edge device, the process 200 implements (at 225) the one or more L4 services as a first set of one or more pods executing on a particular worker node. When the SDN manager and controller set determines that a set of one or more L4 services are to be implemented by the edge device (as per the user's API request), the SDN manager and controller set directs the master node to schedule a set of pods on one worker node to implement all of the L4 services for the edge device. This first set of pods is referred to in some embodiments as the set of L4 pods of the edge device.

At 230, the process 200 determines whether any L7 services need to be implemented by the edge device. Similarly to step 220, the set of criteria in some embodiments specifies which L7 services (and, in some embodiments, which L5 and L6 services) are to be performed by the edge device. In such embodiments, the SDN manager and controller set examines the set of criteria to determine whether it specifies any L7 services the edge device needs to implement. If the process 200 determines that no L7 services need to be implemented by the edge device, the process 200 ends.

If the process 200 determines that one or more L7 services need to be implemented by the edge device, the process 200 implements (at 235) the one or more L7 services as a second set of one or more pods executing on a subset of one or more worker nodes. When the SDN manager and controller set determines that a set of one or more L7 services are to be implemented by the edge cluster (as per the user's API request), the SDN manager and controller set directs the master node to implement one or more pods on one or more worker nodes to implement these L7 services. These pods are referred to in some embodiments as L7 (i.e., logical router) pods.

In some embodiments, the SDN manager and controller set determines how many L7 pods to deploy for the edge device based on the set of criteria. In such embodiments, the set of criteria specifies a total number of pods the edge device is to be deployed as, and the SDN manager and controller set implements a portion of this particular number of pods as L7 pods, as the L4 pod set is also included in the particular number of pods. After implementing the L7 services as the second set of pods, the process 200 ends.

In some embodiments, L4 pods are deployed separately from L7 pods because L4 services are more compute intensive than L7 services. By implementing L4 and L7 services independently from each other for an edge cluster, the edge cluster and these services are able to scaled independently. For example, the SDN manager and controller set in some embodiments deploys additional L7 pods after initially deploying the edge cluster. The SDN manager and controller set does this in some embodiments after determining that the initially deployed L7 pods do not have enough capacity to handle the load of L7 services needed to be performed. As such, the SDN manager and controller set deploys more L7 pods, and does not have to deploy additional pods that perform L4 services, saving CPU and memory. Such additional deployment can be performed for L4 pods as well, which would not affect the deployment of the L7 pods.

Figure 3:
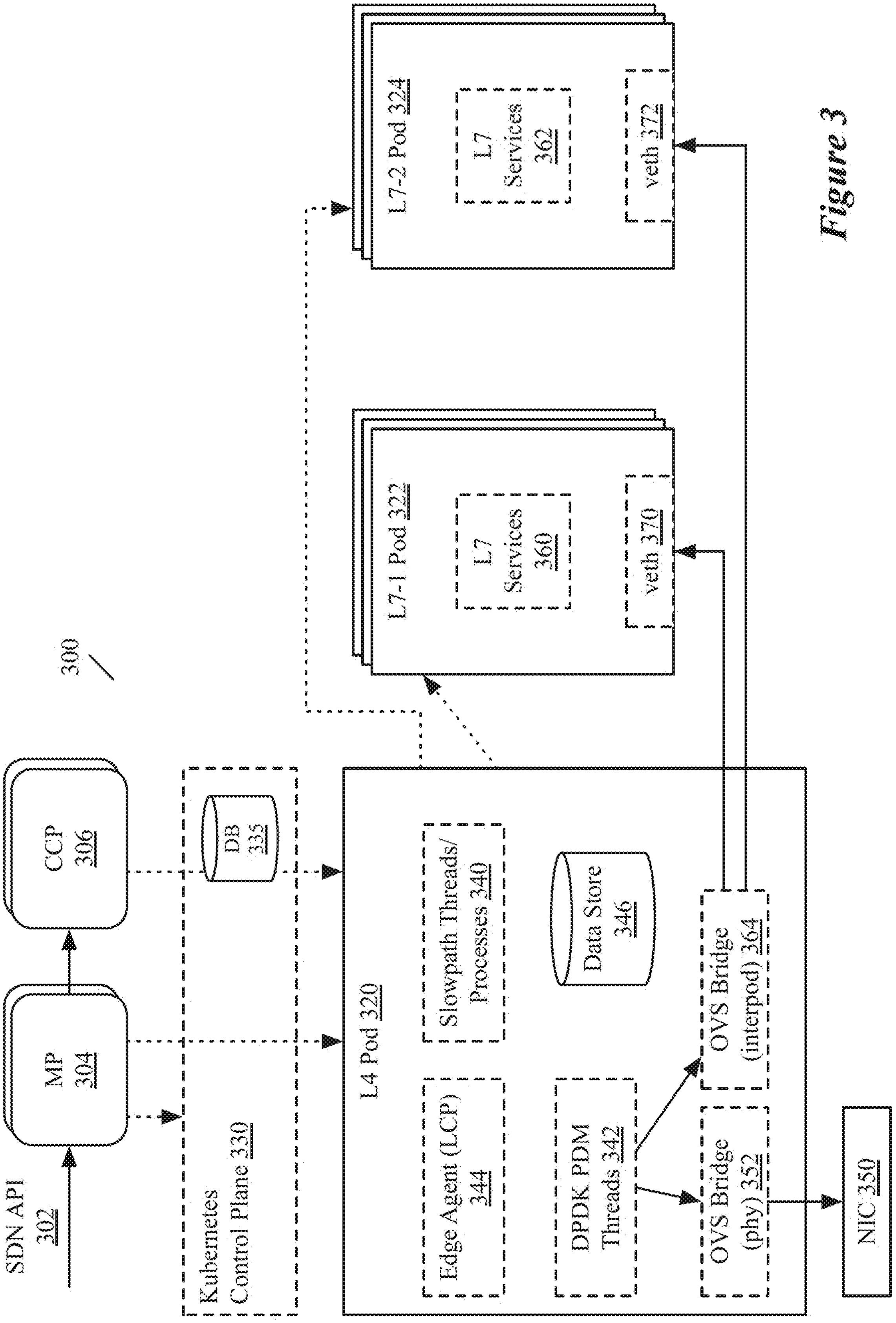
FIG. 3 illustrates an architectural overview of a control plane of some embodiments.

FIG. 3 illustrates an architectural overview of a control plane 300 of some embodiments. The control plane 300 includes API(s) 302, management plane 304, central control plane 306, Kubernetes control plane 330, and a local control plane edge agent 344 executing on an L4 pod 320. The API(s) 302, in some embodiments, enable an administrator to communicate with the management plane 304 to configure the edge (as well as other logical network aspects). As shown, the L4 pod 320 includes DPDK PMD threads 342 (i.e., fastpath data message processing threads), slowpath threads and processes 340, and a database (e.g., nestDB) 346. The DPDK PMD threads 342 are connected to a physical OVS bridge 352 that connects to a NIC 350, as well as to an inter-pod OVS bridge 364. This prevents the NIC 350 raising an interrupt to the pod's CPU when data messages are received. In other embodiments, the DPDK PMD threads 342 connect directly to the NIC 350 (i.e., without an OVS bridge or any other virtual switch in between).

The management plane 304, in some embodiments, receives and accepts requests (e.g., resource and object requests from an administrator) via the API(s) 302. As shown, the management plane 304 connects to both the Kubernetes control plane 330 and the L4 pod 320. The management plane 304 is responsible for managing pod lifecycles directly over the Kubernetes control plane 330.

The central control plane 306 also connects to the L4 pod 320 over the Kubernetes control plane 330. In some embodiments, the central control plane 306 is responsible for configuring logical networks and forwarding rules over the local control plane edge agent 344. In some embodiments, the central control plane 306 is configured to perform other configurations over the local control plane in addition to logical network and forwarding rule configurations. For example, in some embodiments, configurations for the L4 pod 320 are pushed down from the central control plane 306 to the nestDB 346 for use by the local control plane agent 344.

The Kubernetes control plane 330 includes a cluster state database 335 (e.g., etcd). While not shown, the Kubernetes control plane 330 in some embodiments includes an API server. This API server, in some embodiments, is a frontend to a Kubernetes cluster for all communications external to the cluster. In some embodiments, when a logical router is added to or deleted from the cluster, a corresponding logical router pod is also created or deleted. Additionally, when such logical routers are added or deleted, inter-pod bridges, such as the OVS bridge 364 of the L4 pod 320, are created or removed.

In some embodiments, a pod identical to the L4 pod 320 is deployed for the edge cluster, and these two L4 pods operate as an HA pair. In such embodiments, the L4 pod 320 is designated as the active L4 pod, and the other L4 pod is designated as the standby L4 pod. In the event of a failure of the L4 pod 320, the other L4 pod will become the active L4 pod.

A first subset of pods 322 (L7-1 pod) represents a first logical router, and a second subset of pods 324 (L7-2 pod) represents a second logical router. Both subsets of pods 322-324 perform L7 services 360-362 for the edge cluster. L7-1 pod 322 includes a veth pair 370 to connect to an inter-pod OVS bridge 364 of the L4 pod 320. L7-2 pod 324 also includes a veth pair 372 to connect to the inter-pod OVS bridge 364 of the L4 pod 320. While two different OVS bridges 352 and 364 are illustrated for the L4 pod 320, in some embodiments, only one OVS bridge is used to connect the L4 pod 320 to the NIC 350 and the L7 pods 322-324.

Each L7 pod 322-324 in some embodiments represents a different logical router. In such embodiments, each Tier-0 (T0) and Tier-1 (T1) router is associated with their own L7 pod. This requires in some embodiments all service daemons to run in each pod. Different daemons are in some embodiments put into separate containers, and in other embodiments a same container. In other embodiments, each L7 pod 322-324 represents a different network function or service. This benefits autonomous edges in some embodiments, where a single router provides multiple services.

In some embodiments, L7-1 pod 322 and L7-2 pod 324 are each sets of StatefulSet pods. StatefulSet is a Kubernetes controller to run stateful applications as containers (pods) in a Kubernetes cluster, such as for a web server application, application server application, or a database server application. In some embodiments, StatefulSet pods are used to deploy edge clusters in a Kubernetes cluster. StatefulSet pods in some embodiments are assigned a unique "sticky" identity, such that each pod's identity remains unchanged regardless of whether it crashes and restarts, gets migrated to another node, etc. A pod identity (ID) includes an ordinal index, a stable network identity, and a stable storage. An ordinal index is an integer assigned to the pod indicating the order in which it is deployed in relation to the other pods in the StatefulSet. The range of the ordinal indexes for a StatefulSet is between 0 and N−1, N being the number of pods in the StatefulSet. For example, for a StatefulSet that includes three pods, the first instantiated pod is assigned an ordinal index of 0, the second instantiated pod is assigned an ordinal index of 1, and the third instantiated pod is assigned an ordinal index of 2. In some embodiments, each pod in a StatefulSet is assigned an IP address based on the pod's identity, such that the IP address does not change whether the pod crashes and restarts, whether it migrates to another node, etc.

A stable network identity for a given pod specifies the name of the StatefulSet and the ordinal index of the pod. Using the example above, if the StatefulSet is named "db" for a database server application, the first pod's stable network identity is "db-0." The stable storage specifies a persistent volume claim of provisioned storage allocated to the endpoint. In some embodiments, an administrator instantiating the StatefulSet gives each pod a single persistent volume with a storage class and 1 GiB of provisioned storage. Assigning a unique ID to each stateful pod in a StatefulSet provides guarantees about the ordering and uniqueness of the stateful pods. This is beneficial for applications and edge clusters that require one or more of (1) stable, unique network identifiers, (2) stable, persistent storage, (3) ordered, graceful deployment and scaling, and (4) ordered, automated rolling updates. Methods and systems regarding StatefulSet pods are further described in U.S. patent application Ser. No. 18/098,081, which is incorporated by reference in this application.

In some embodiments, when data messages traverse the edge cluster, they are received at the edge agent 344 of the L4 pod 320. Upon receiving a data message, the edge agent 344 determines whether any L7 services are to be performed on the data message. If one or more L7 services are to be performed on the data message, the edge agent 344 forwards the data message to one of the L7 pods 322-324 through the inter-pod OVS bridge 364. In some embodiments, after the L7 service or services are provided to the data message, the L4 pod 320 receives the data message back and forwards it to its destination through the physical OVS bridge 352 and the NIC 350. In other embodiments, the receiving L7 pod performing the L7 service or services forwards the data message to its destination.

Kubernetes networking functions in some embodiments are delegated to network plugins (e.g., CNIs). In some embodiments, a CNI implements a standard CNI API to provide basic networking to containers. Multiple networking interfaces are needed in some embodiments for a NFV or an SDN virtual appliance, such as an edge cluster, for separation of control (e.g., management and data planes), a multi-homed pod, etc. In some embodiments, a pod by default has one network interface (apart from a loopback interface, which is a virtual interface that is always up and reachable as long as at least one network interface of the pod is operational). Multiple network interfaces of a pod or different types of interfaces of a pod can be achieved in some embodiments using a CNI called multus-CNI, which allows multiple interfaces on a single pod.

Figure 4:
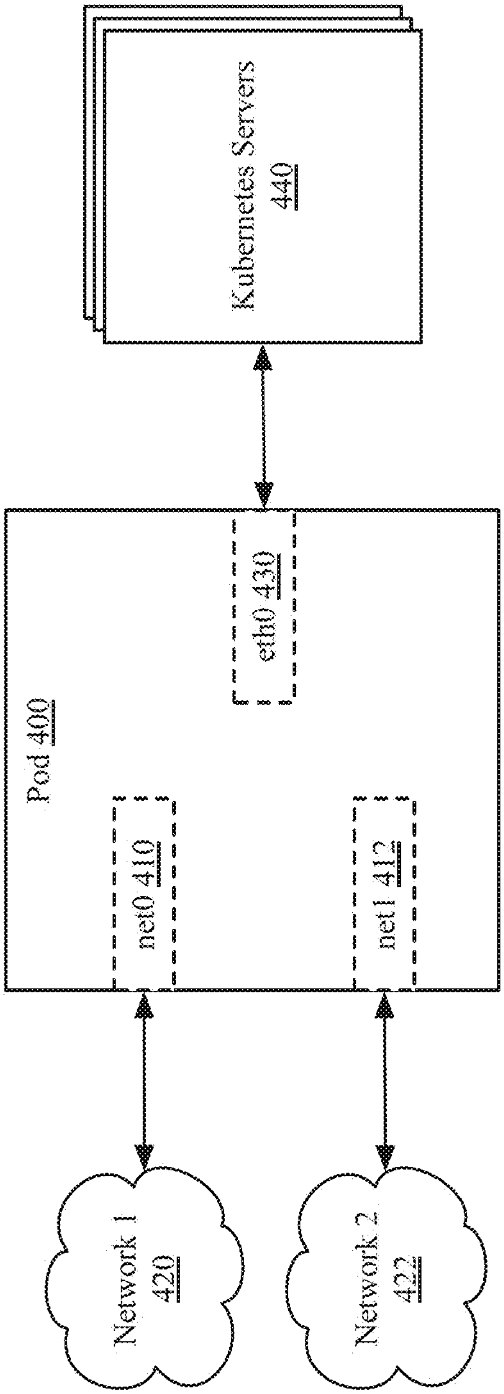
FIG. 4 illustrates an example multi-homed pod that uses multus-CNI to define network attachments that create multiple networking interfaces.

Multus-CNI is a meta CNI plugin that uses other CNI plugins for network attachment definitions. In some embodiments, other than a management NIC (i.e., eth0) of a pod, this CNI plugin is used to create high performance interfaces for networking functions pods to support more complex networking usages. FIG. 4 illustrates an example multi-homed pod 400 that uses multus-CNI to define network attachments that create multiple network interfaces 410-412. The network interfaces 410-412 respectively connect the pod 400 to first and second networks 420-422. The traffic exchanged with the networks 420-422 is in some embodiments user-specific traffic.

The pod 400 also includes a management NIC 430 that connects the pod 400 to one or more Kubernetes servers 440. In some embodiments, the Kubernetes servers 440 include a Kube-API server, a kubelet, etc. The management NIC 430 allows the pod 400 to communicate with the Kubernetes servers 440. Conjunctively or alternatively, the management NIC 430 connects the pod 400 to a control plane.

Figure 5:
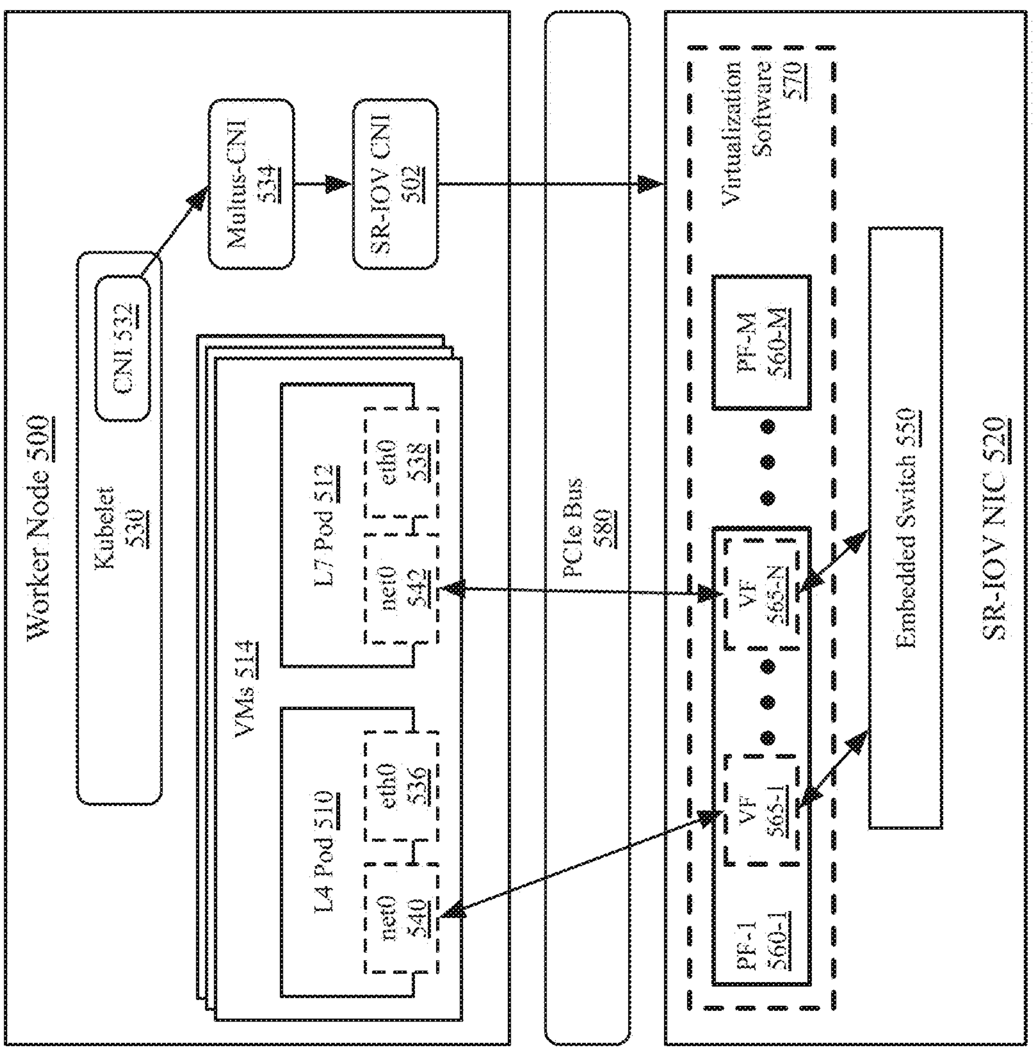
FIG. 5 illustrates an example worker node that deploys a Kubernetes SR-IOV CNI to connect pods to an SR-IOV NIC.

In some embodiments, a Kubernetes single route input-output virtualization (SR-IOV) network device plugin is used for a pod. Kubernetes SR-IOV extends the capabilities of Kubernetes to address high performance network Input/Output (I/O) by first discovering and then advertising SR-IOV network virtual functions (VFs) on a Kubernetes host. FIG. 5 illustrates an example worker node 500 that deploys a Kubernetes SR-IOV CNI 502 to connect pods 510-512 to an SR-IOV NIC 520.

The worker node 500 executes a kubelet 530 that, e.g., registers the node 500 with an API server, receives pod specifications and containerspecs, and uses this information to create the pods 510-512 on the node 500. The kubelet 530 includes a CNI 532, which connects to the multus-CNI 534. The multus-CNI 534 enables multiple network interfaces to be deployed on the pods 510-512. The multus-CNI 534 connects to the SR-IOV CNI 502, which connects to the SR-IOV NIC 520.

An L4 pod 510 includes a management NIC 536 (eth0) and a network interface 540 (net0). An L7 pod 512 also includes a management NIC 538 (eth0) and a network interface 542 (net0). The pods 510-512 in this example execute on a set of one or more VMs 514 of the worker node 500.

The SR-IOV NIC 520 includes an embedded switch 550 that connects to a virtualization software 570. The virtualization software 570 includes a set of one or more physical functions (PFs) 560 1-M on which a set of VFs 565 run. A VF is in some embodiments a virtualized PCIe function exposed as an interface of the NIC 520. In some embodiments, the VFs 565 are associated with the PFs 560, which are referred to as one or more a physical interfaces of the PNIC in some embodiments.

The SR-IOV CNI 502 allows a single physical PCI resource to be partitioned into virtual PCI functions for allocation to application and network function pods, in some embodiments. Through a PCIe bus 580, the network interfaces 540-542 of the pods 510-512 each connects to a VF 565 of the virtualization software 570, which connects to the embedded switch 550. These connections enable the pods 510-512 to be directly attached to VFs by using a standard driver in the kernel of a container's host.

The SR-IOV CNI 502, in some embodiments, works with all VFs 565 in kernel drivers as well as in DPDK drivers. In some embodiments, the SR-IOV CNI 502 can be used to configure VFs in the pods 510-512 when the VFs 565 are attached to kernel drivers, whereas a virtual network function (VNF) application is responsible for configuring the VFs of the pods 510-512 when the VFs 565 are attached using DPDK drivers, according to some embodiments.

Each of the network interfaces 540-542 connects to its own VF 565 of an embedded switch 550 of the NIC 520. As illustrated, in some embodiments, each pod is associated with its own VF 565. In other embodiments, however, at least two pods (on the same worker node or on different worker nodes) are associated with a same VF 565. The embedded switch 550 on the NIC 520 accelerates inter-pod networking. Through the VFs 565, the L4 pod 510 and the L7 pod 512 communicate with each other and exchange data message flows.

In some embodiments, a memif PMD allows for DPDK and any clients using memif to communicate using a shared memory. Memif in some embodiments allows two containers executing on a same worker node or host to be connected together at the speed of a memory bus. It uses "libmemif" from vector packet processing (VPP) and enables (e.g., with Litago) rapid development of high-performance cloud-native VNFs. A memif device allows for leveraging of a high-performance virtual interface (VIF) for inter-pod networking, while replacing the kernel network interface (KNI).

Figure 6:
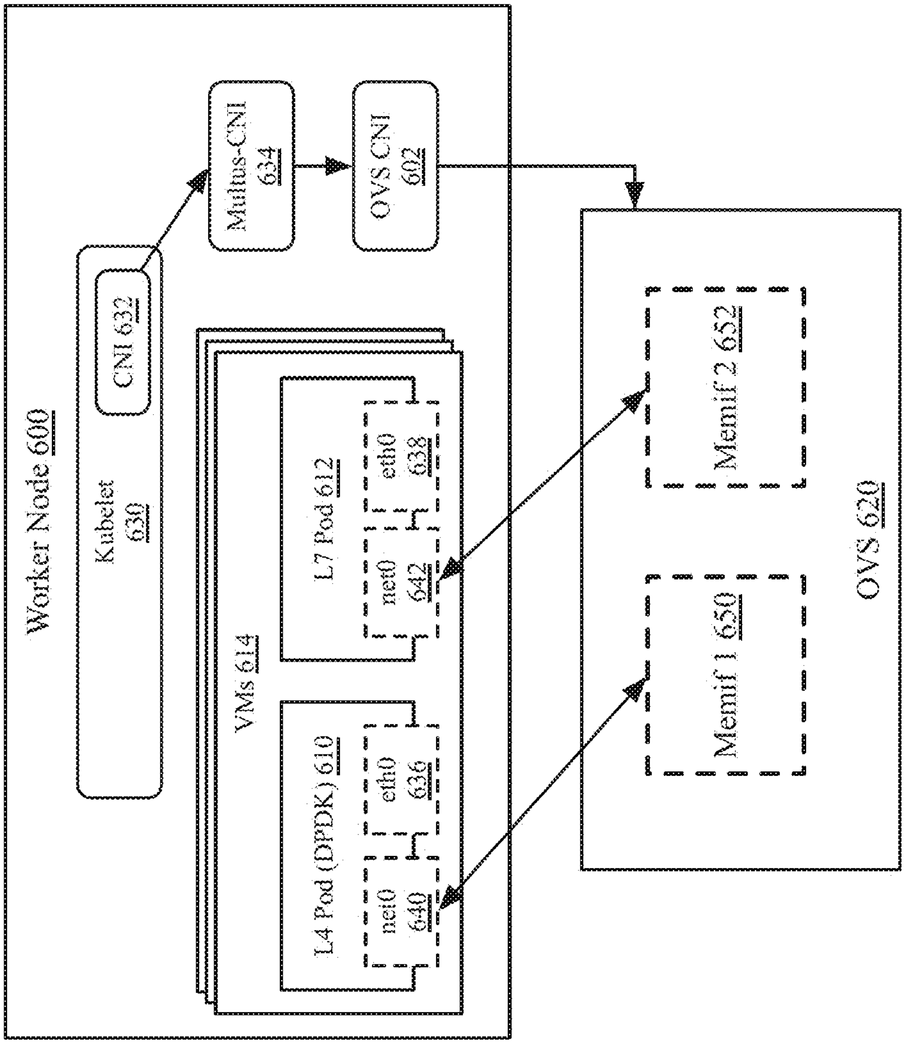
FIG. 6 illustrates an example worker node that deploys a Kubernetes OVS CNI to connect pods to an OVS.

In some embodiments, a virtual host user (vhost-user) protocol is used for high performance inter-pod networking. A Vhost-user uses a client-server model, where the server creates, manages, and destroys vhost user sockets and the client connects to the server. In some of these embodiments, the shared memory adopted by the vhost-user causes client-side corruption if the server experiences any issues. Alternatively, memif is used in some embodiments. FIG. 6 illustrates an example worker node 600 that deploys a Kubernetes OVS CNI 602 to connect pods 610-612 to an OVS 620. The worker node 600 executes a kubelet 630 that, e.g., registers the node 600 with an API server, receives pod specifications and containerspecs, and uses this information to create the pods 610-612 on the node 600. The kubelet 630 includes a CNI 632, which connects to the multus-CNI 634. The multus-CNI 634 enables multiple network interfaces to be deployed on the pods 610-612. The multus-CNI 634 connects to the OVS CNI 602, which connects to the OVS 620.

An L4 pod 610 includes a management NIC 636 (eth0) to connect to a control plane and a network interface 640 (net0) to connect to the OVS 620. An L7 pod 612 also includes a management NIC 638 and a network interface 642. The pods 610-612 in this example execute on a set of one or more VMs 614 of the worker node 600.

In some embodiments (as shown) each of the network interfaces 640-642 connects to its own memif device 650-652 of the OVS 620. In other embodiments, however, at least two pods (on the same worker node or on different worker nodes) are associated with a same memif device of an OVS. In some embodiments, for the OVS 620 to support memif devices 650-652, another network type called netdev-memif is implemented on top of OVS. Performance using memif devices 650-652 in some embodiments achieves higher than 10 million packets per second. In environments where a direct passthrough is not possible (e.g., in a cloud environment), memif devices are used over SR-IOV. In some embodiments, using memif devices requires rewriting the socket application to call into API provided by a device.

In some embodiments, an edge device deployed as a cluster of pods is monitored to determine when to automatically horizontally scale (i.e., add additional pods) and/or vertically scale (i.e., add additional services) different services performed by the edge device. Horizontal scaling is performed in some embodiments by a Kubernetes HPA, while vertical scaling is performed by a Kubernetes VPA. In some embodiments, a Cluster Autoscaler scales an edge cluster by adjusting the number of nodes spanned by an edge cluster.

Figure 7:
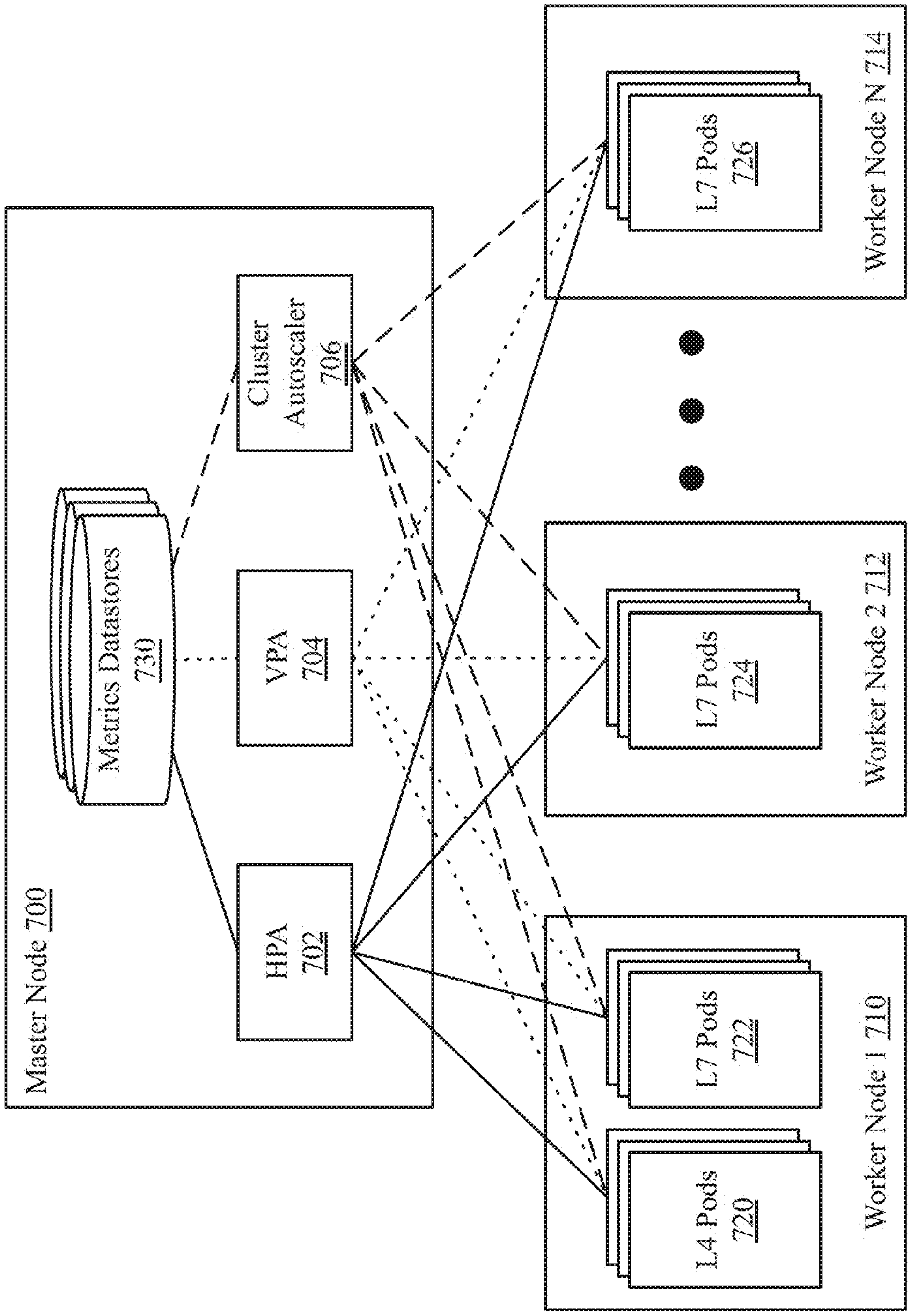
FIG. 7 illustrates an example master node that executes an HPA, a VPA, and a cluster autoscaler to monitor and automatically scale edge clusters.

FIG. 7 illustrates an example master node 700 that executes an HPA 702, a VPA 704, and a cluster autoscaler 706 to monitor and automatically scale edge clusters. In this example, the HPA 702, VPA 704, and cluster autoscaler 706 monitor an edge cluster deployed on a set of worker nodes 710-714.

The edge cluster includes a set of one or more L4 pods 720 and a first set of one or more L7 pods 722 executing on a first worker node 710, and other sets of one or more L7 pods 724-726 executing on one or more other worker nodes 712-714. As denoted by solid lines, the HPA 702 monitors the worker nodes 710-714 and the pods 720-726. As denoted by short dashed lines, the VPA 704 monitors the worker nodes 710-714 and the pods 720-726. In some embodiments, the L7 pods 722-726 benefit directly from the VPA 704 because one or more stateful services are enabled on the L7 pods 722-726, which require traffic from both directions to arrive on a same pod.

As denoted by long dashed lines, the cluster autoscaler 706 monitors the worker nodes 710-714 and the pods 720-726. In some embodiments, all of the autoscalers 702-706 collect metrics regarding the edge cluster and its pods and store them in one or more metrics datastores 730 of the master node 700. In some of these embodiments, each autoscaler 702-706 use different metrics datastores 730. In other embodiments, at least two autoscalers use a same datastore 730. Conjunctively or alternatively, a particular autoscaler collects the metrics, and the other autoscalers use the metrics collected by the particular autoscaler.

Examples of metrics collected for the edge cluster include (1) an amount of CPU allotted to each pod and each worker node, (2) CPU utilization of each pod and each worker node, (3) an amount of memory allotted to each pod and each worker node, (4) memory utilization of each pod and each worker node. Any suitable metrics that can be collected for an edge cluster can be collected by the HPA 702, VPA 704, and/or cluster autoscaler 706.

Figure 8A:
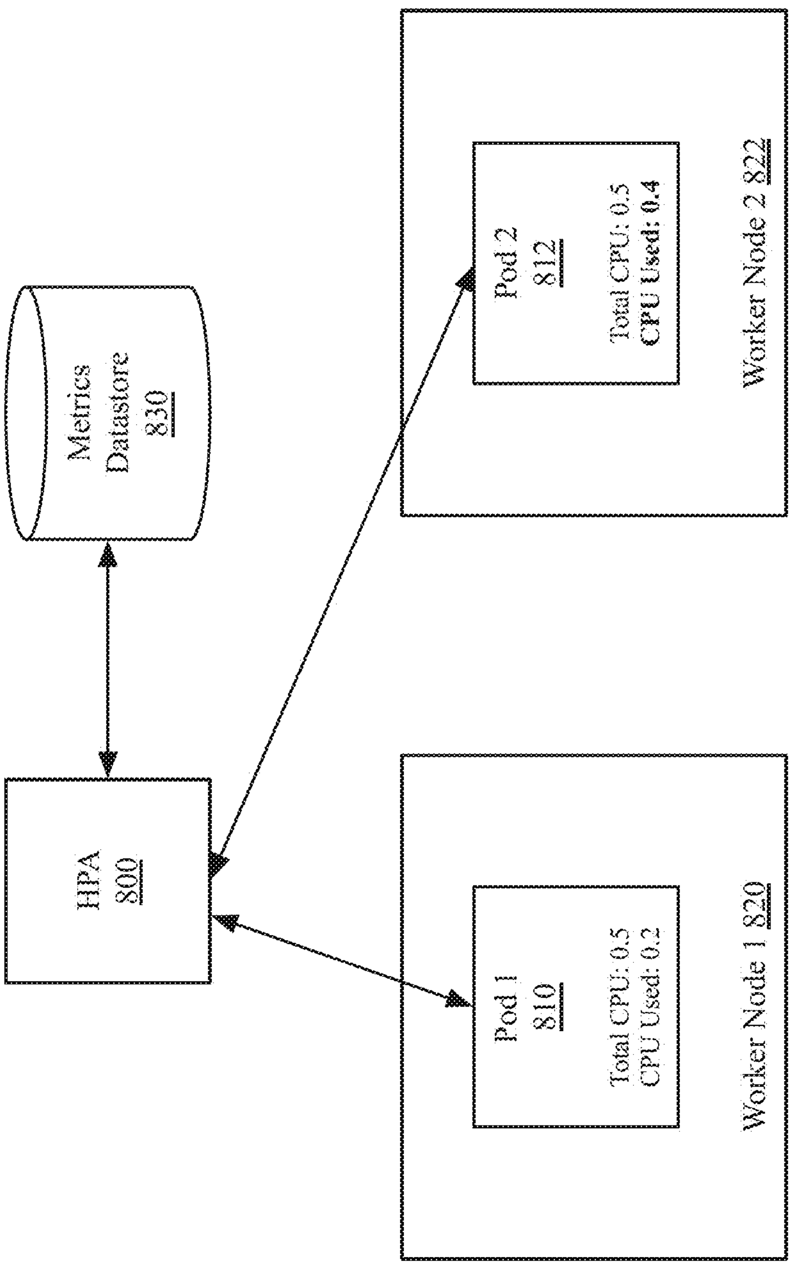
FIGS. 8A-B illustrate an HPA that monitors pods of an edge cluster to determine when to add and remove pods.
Figure 8B:
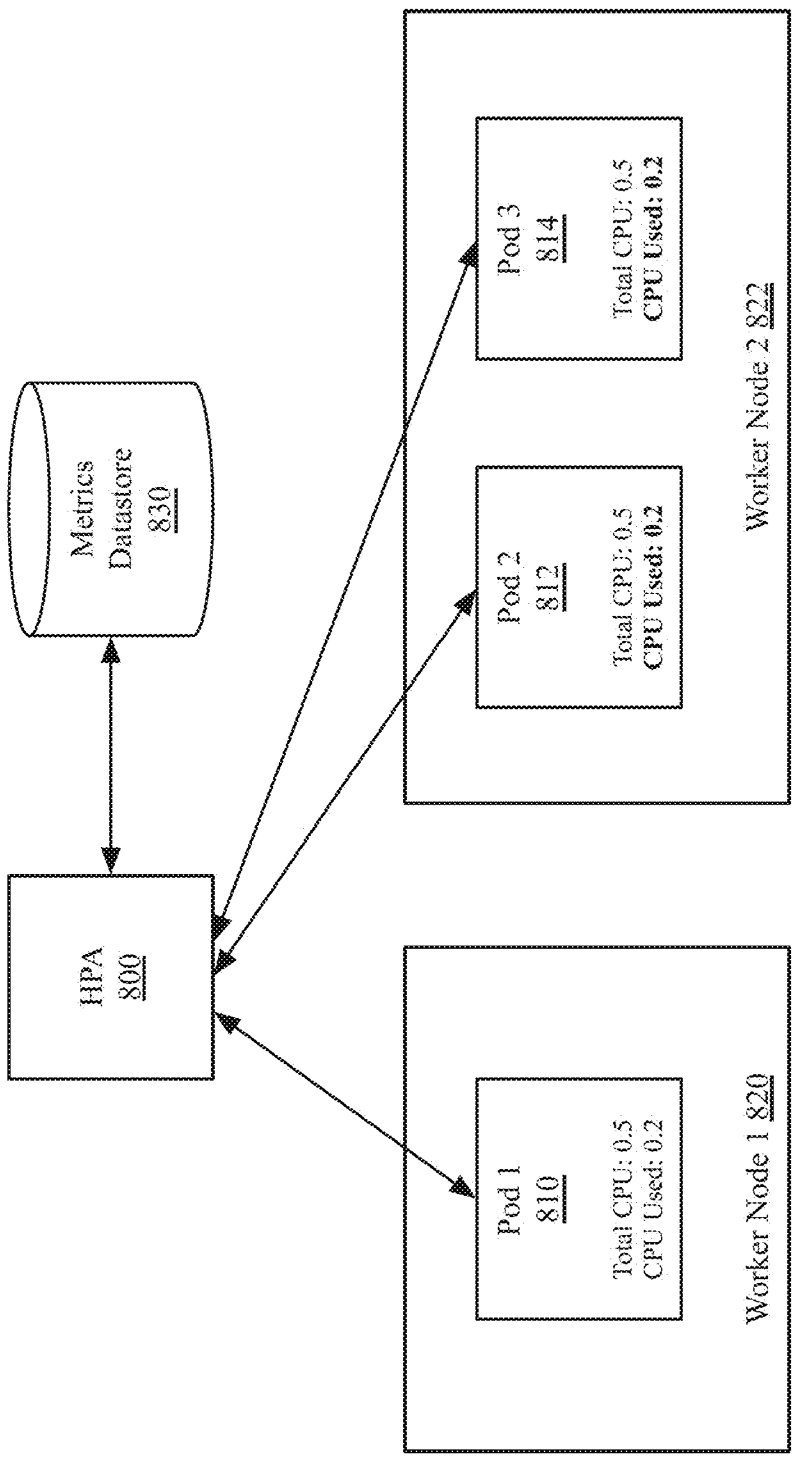

FIGS. 8A-B illustrate an example HPA 800 that monitors pods of edge clusters to determine when to add and remove pods. In FIG. 8A, the HPA 800 is collecting metrics for a first pod 810 of an edge cluster executing on a first worker node 820, and for a second pod 812 of the edge cluster executing on a second worker node 822. As the HPA 800 collects the metrics for the pods 810-812, it stores the metrics in a metrics datastore 830. In this example, the HPA 800 is collecting metrics related to CPU of the pods 810-812. However, any suitable metrics for pods of an edge cluster can be collected by an HPA and used for monitoring, such as memory.

In some embodiments, each pod 810-812 is an L7 pod and performs one or more L7 services (e.g., TLS proxy services, URL filtering, L7 firewall services, L7 load balancing services, et.) for data message flows traversing the edge cluster. In such embodiments, the first pod 810 may perform at least one same service as the second L7 pod 812, or may perform a different set of services than the second L7 pods 812.

In other embodiments, each pod 810-812 is an L4 pod and performs one or more L4 services (e.g., L4 firewall services, L4 load balancing services, NAT services, IDS/IPS services et.) for data message flows traversing the edge cluster. In such embodiments, both L4 pods 810-812 perform the same set of L4 services for the edge cluster. While this figure illustrates two pods 810-812, which may be L4 pods, executing on different worker nodes 820-822, other embodiments deploy all L4 pods for an edge cluster on a same worker node.

In some embodiments, at least one of the worker nodes 820-822 executes one or more other pods for the edge cluster. These other pods are in some embodiments other L7 pods and/or L4 pods.

As shown, the first pod 810 has a total allotted CPU of 0.5, and is currently using 0.2 CPU. The second pod 812 is also allotted a total CPU of 0.5, however, it is currently using 0.4 CPU, which is bolded. As the HPA 800 collects metrics for the pods 810-812 and monitors them, it determines that the load on the second pod 812 (i.e., the CPU utilization) has reached a threshold (e.g., defined by a network administrator). In this example, the particular threshold is 80%. After determining this, the HPA 800 in some embodiments deploys an additional pod for the edge cluster to alleviate the load on the second pod 812.

FIG. 8B illustrates the edge cluster after the HPA 800 has deployed a third pod 814 to alleviate the load on the second pod 812. In this example, the HPA 800 has deployed the third pod 814 on the second worker node 822 along with the second pod 812. However, in other embodiments, the HPA 800 deploys the third pod 814 on the first worker node 820 or another worker node (not shown). In some embodiments, the third pod 814 is identical to the second pod 812, i.e., it has the same configuration (e.g., total CPU, total memory, etc.) and performs the same set of services. In other embodiments, the third pod 814 has a different configuration and/or at least one different service to perform than the second pod 812.

After deploying the third pod 814, which has a total allotted CPU of 0.5, both the second pod 812 and the third pod 814 use 0.2 CPU, which are bolded. By deploying the additional pod 814 for the edge cluster, the third pod 814 processes a subset of data message flows that were previously processed by the second pod 812. The subset of data message flows now being processed by the third pod 814 is in some embodiments selected non-deterministically by the HPA 800. In other embodiments, the HPA 800 selects the subset of data message flows by identifying the highest CPU-using data message flows initially processed by the second pod 812. Still, in other embodiments, the HPA 800 selects the subset of data message flows by identifying the lowest-latency requiring and/or the highest-bandwidth requiring data message flows. Any suitable method for selecting flows to migrate from an one pod to another may be used.

In addition to adding additional pods to an edge cluster, an HPA in some embodiments deletes pods from an edge cluster based on its monitoring of the edge cluster. For example, the HPA in some embodiments monitors the pods of an edge cluster, and determines that the load on a particular pod falls below a particular minimum threshold (e.g., defined by a network administrator). After determining this, the HPA in some embodiments migrates the processing of flows currently processed by the particular pod to another pod that performs the services needed to process the flows, and deletes the particular pod from the edge cluster.

While these figures describe monitoring edge clusters and adding pods based on CPU utilization, any suitable metric or combination of metrics can be used to determine when to add pods to or remove pods from an edge cluster.

Figure 9A:
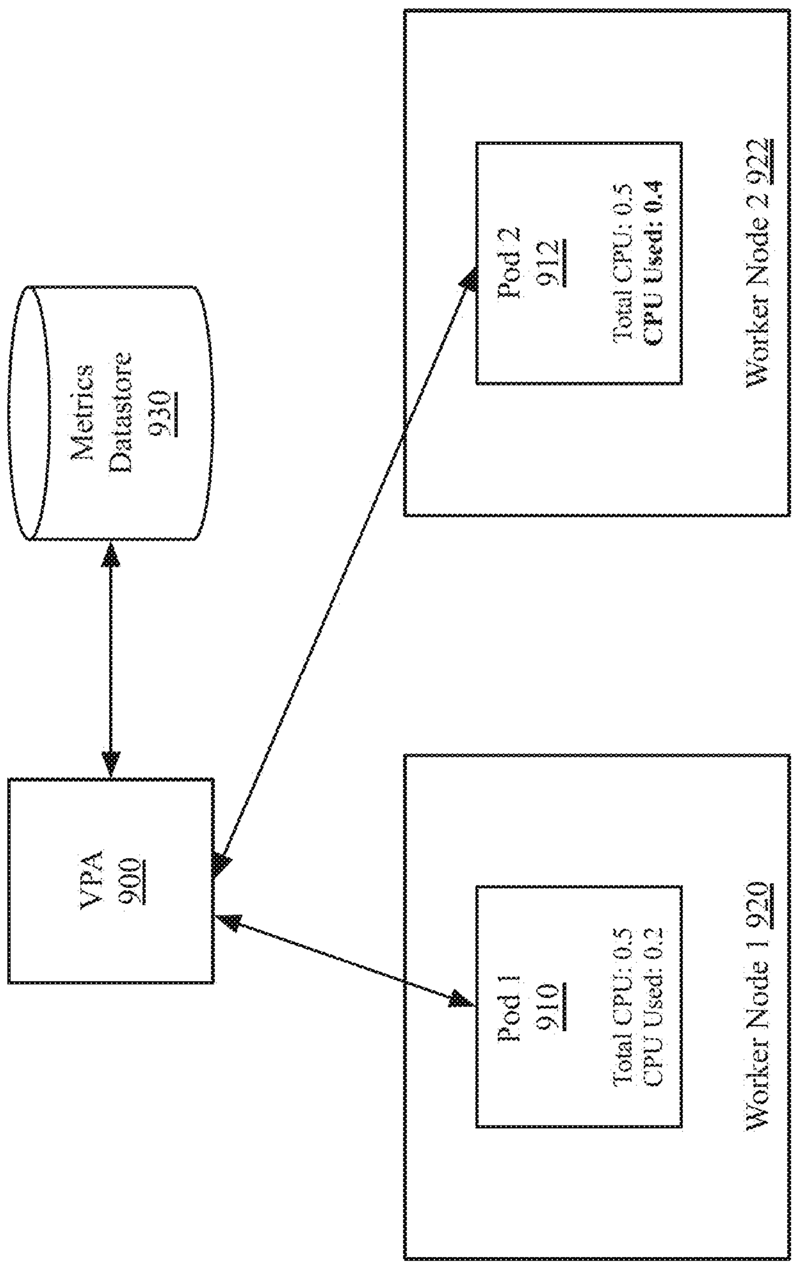
FIGS. 9A-B illustrate a VPA that monitors pods of an edge cluster to determine when to increase and decrease resources of the pods.
Figure 9B:
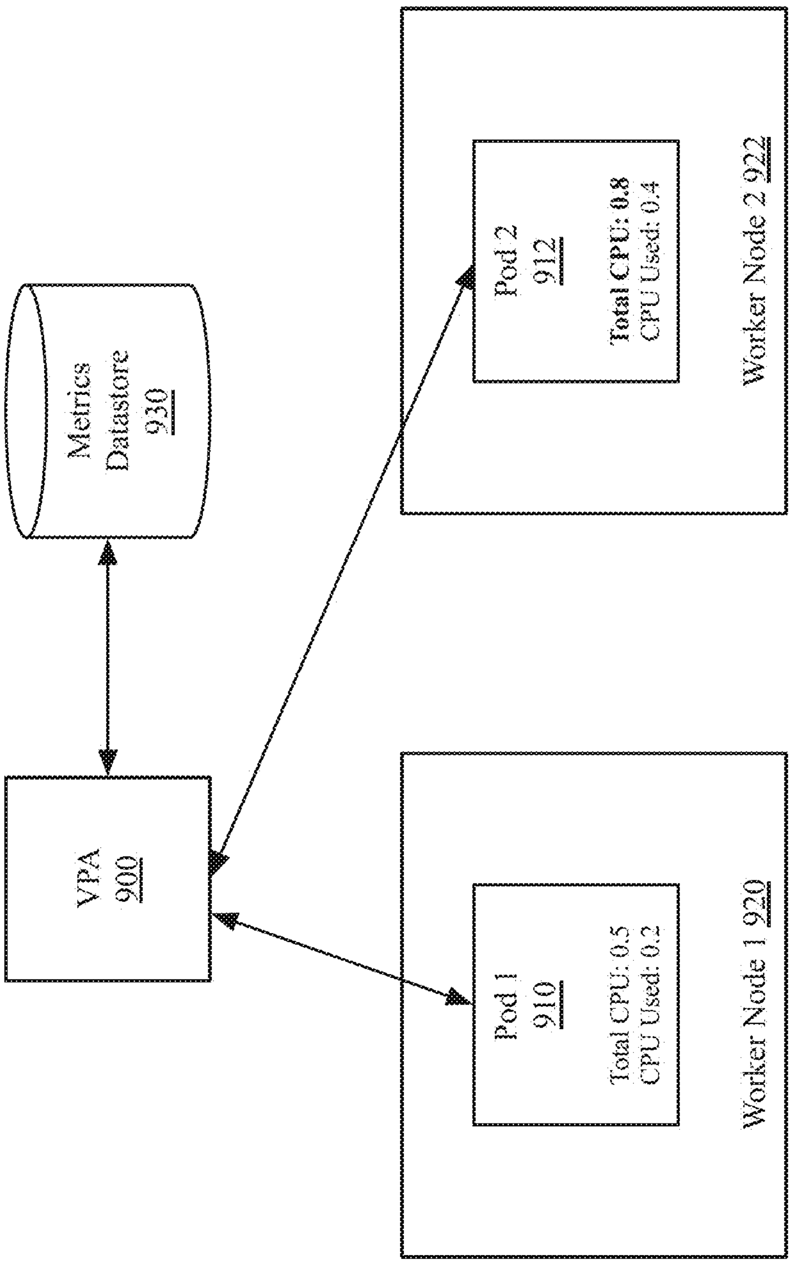

FIGS. 9A-B illustrate an example VPA 900 that monitors pods of edge clusters to determine when to increase and decrease resources of the pods. In FIG. 9A, the VPA 900 is collecting metrics for a first pod 910 of an edge cluster executing on a first worker node 920, and for a second pod 912 of the edge cluster executing on a second worker node 922. As the VPA 900 collects the metrics for the pods 910-912, it stores the metrics in a metrics datastore 930. In this example, the VPA 900 is collecting metrics related to CPU of the pods 910-912. However, any suitable metrics for pods of an edge cluster can be collected by an VPA and used for monitoring, such as memory.

In some embodiments, each pod 910-912 is an L7 pod and performs one or more L7 services for data message flows traversing the edge cluster. In such embodiments, the first pod 910 may perform at least one same service as the second pod 912, or may perform a different set of services than the second L7 pod 912.

In other embodiments, each pod 910-912 is an L4 pod and performs one or more L4 services for data message flows traversing the edge cluster. In such embodiments, both L4 pods 910-912 perform the same set of L4 services for the edge cluster. While this figure illustrates two pods 910-912, which may be L4 pods, executing on different worker nodes 920-922, other embodiments deploy all L4 pods for an edge cluster on a same worker node.

In some embodiments, at least one of the worker nodes 920-922 executes one or more other pods for the edge cluster. These other pods are in some embodiments other L7 pods and/or L4 pods.

Similar to the scenario described in FIG. 8, the first pod 910 has a total allotted CPU of 0.5, and is currently using 0.2 CPU. The second pod 912 is also allotted a total CPU of 0.5, however, it is currently using 0.4 CPU, which is bolded. As the VPA 900 collects metrics for the pods 910-912 and monitors them, it determines that the load on the second pod 912 (i.e., the CPU utilization) has reached a threshold (e.g., defined by a network administrator), which is 80% in this example. After determining this, the VPA 900 in some embodiments increases the total allotted CPU of the second pod 912.

FIG. 9B illustrates the edge cluster after the VPA 900 has increased the second pod's total allotted CPU from 0.5 to 0.8. After increasing the total CPU allotted for the second pod 912, the amount of CPU used (0.4), remains the same, however it no longer exceeds the particular threshold of 80% utilization. By increasing the CPU resource of the second pod 912, the VPA 900 avoids overloading the second pod 912 (which can lead to the second pod 912 dropping flows in some embodiments).

In addition to adding additional resources to pods of an edge cluster, a VPA in some embodiments decreases resources of pods of an edge cluster based on its monitoring of the edge cluster. For example, the VPA in some embodiments monitors the pods of an edge cluster, and determines that the load on a particular pod falls below a particular minimum threshold (e.g., defined by a network administrator), such as 10%. After determining this, the VPA in some embodiments decreases the total allotted CPU of the particular pod.

While these figures describe monitoring edge clusters and increasing and decreasing resources of pods based on CPU utilization, any suitable metric or combination of metrics can be used to determine when to increase or decrease resources of pods of an edge cluster.

Figure 10A:
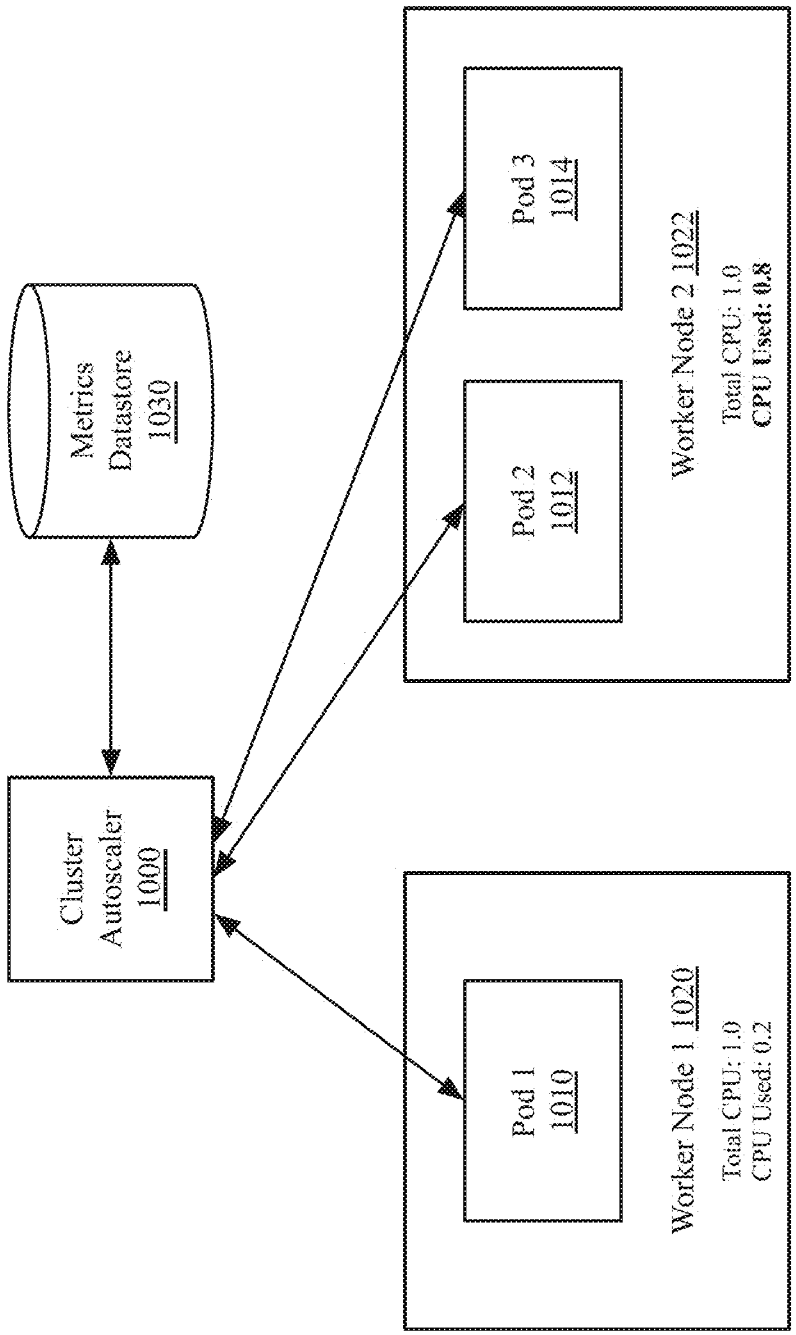
FIGS. 10A-B illustrate a cluster autoscaler that monitors a set of worker nodes executing pods of an edge cluster to determine when to add and remove worker nodes from the worker node set executing the edge cluster.
Figure 10B:
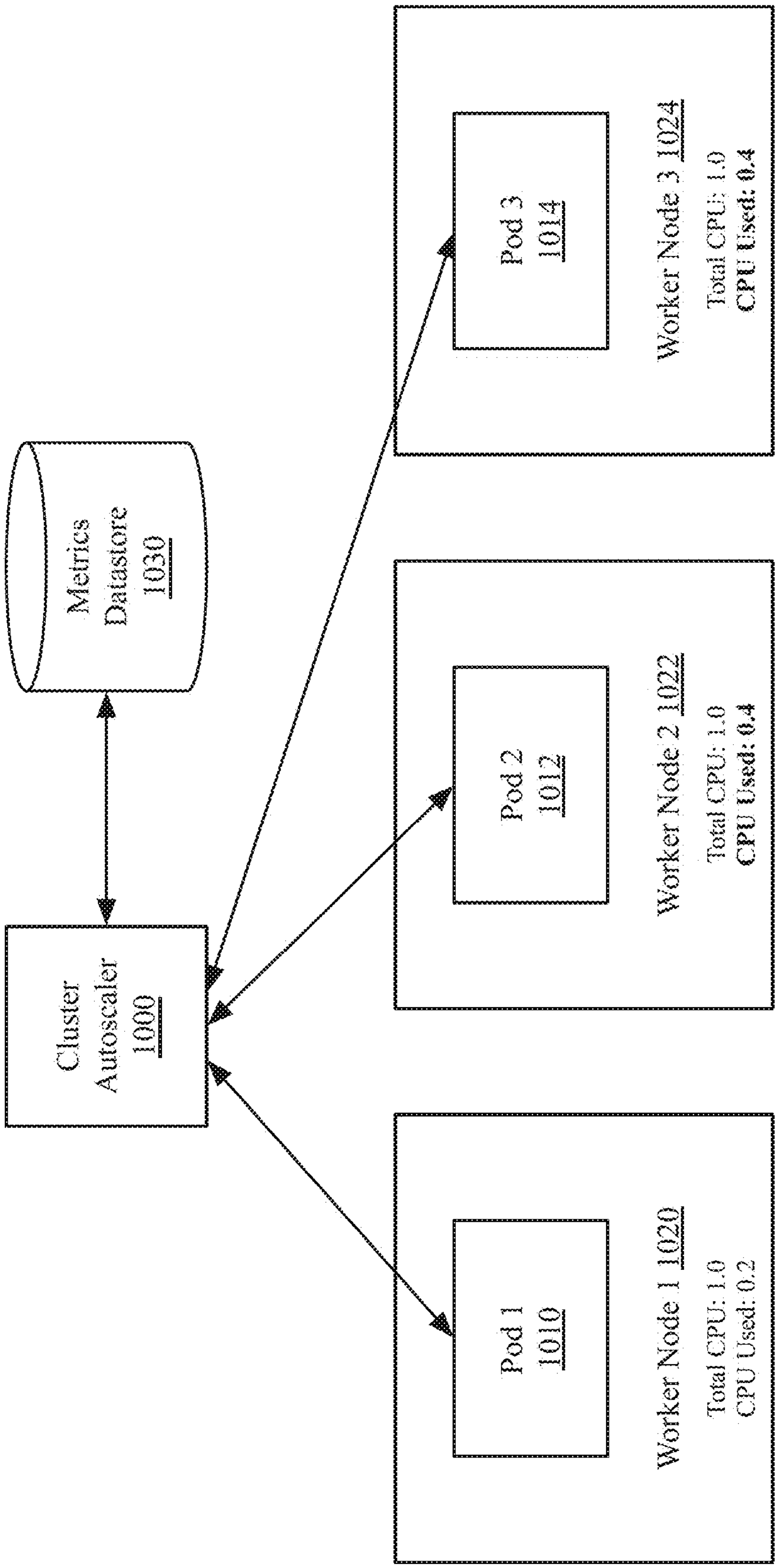

FIG. 10A-B illustrate an example cluster autoscaler 1000 that monitors a set of worker nodes that executes pods for edge clusters to determine when to add and remove worker nodes. In FIG. 10A, the cluster autoscaler 1000 is collecting metrics for a first worker node 1020 executing a first pod 1010, and for a second worker node 1022 executing second and third pods 1012 and 1014. As the cluster autoscaler 1000 collects the metrics for the worker nodes 1020-1022, it stores the metrics in a metrics datastore 1030. In this example, the cluster autoscaler 1000 is collecting metrics related to CPU of the worker nodes 1020-1022. However, any suitable metrics for pods of an edge cluster can be collected by an cluster autoscaler and used for monitoring, such as memory.

In some embodiments, each pod 1010-1014 is an L7 pod and performs one or more L7 services for data message flows traversing the edge cluster. In such embodiments, each L7 pod 1010-1014 may perform at least one same service, or may each perform a different set of services.

In other embodiments, each pod 1010-1014 is an L4 pod and performs one or more L4 services for data message flows traversing the edge cluster. In such embodiments, both L4 pods 1010-1014 perform the same set of L4 services for the edge cluster. While this figure illustrates three pods 1010-1014, which may be L4 pods, executing on different worker nodes 1020-1022, other embodiments deploy all L4 pods for an edge cluster on a same worker node.

In this example, the first worker node 1020 has a total allotted CPU of 1.0, and is currently using 0.2 CPU. The second worker node 1022 is also allotted a total CPU of 0.1, however, it is currently using 0.8 CPU, which is bolded. As the cluster autoscaler 1000 collects metrics for the worker nodes 1020-1022 and monitors them, it determines that the load on the second worker node 1022 (i.e., the CPU utilization) has reached a threshold (e.g., defined by a network administrator), which is 80% in this example. After determining this, the cluster autoscaler 1000 in some embodiments migrates one of the pods 1012-1014 to alleviate the load on the worker node 1022.

FIG. 10B illustrates the edge cluster after the cluster autoscaler 1000 has migrated the third pod 1014 to a third worker node 1024. After migrating the third pod 1014 from the second worker node 1022 to the third worker node 1014, the amount of CPU used (0.4) for the second worker node 1022 decreases. By using the additional worker node 1024 for the edge cluster, the third worker node 1024 alleviates the load on the second worker node 1022. The third worker node 1024 in this example does not execute any other pods for the edge cluster, so it is added to the set of worker nodes that implement the edge cluster when the third pod 1014 is migrated to it. In other embodiments, the third worker node 1024 also executes another pod (e.g., an L4 pod or an L7 pod) for the edge cluster, so it is already included in the set of worker nodes implementing the edge cluster before the third pod 1014 is migrated to it.

In some embodiments, the cluster autoscaler 1000 determines which pod or pods of the overloaded worker node (i.e., the second worker node 1022) to migrate by identifying the highest CPU-using pods initially executing on the second worker node 1022. In other embodiments, the cluster autoscaler 1000 determines which pod or pods to migrate by identifying the highest-latency consuming and/or the lowest-bandwidth consuming pod or pods. Any suitable method for selecting pods of an overloaded worker node to migrate to another worker node may be used.

In addition to adding additional worker nodes to execute pods of an edge cluster, a cluster autoscaler in some embodiments deletes worker nodes from executing pods of an edge cluster based on its monitoring of the worker nodes. For example, the cluster autoscaler in some embodiments monitors the worker nodes executing an edge cluster, and determines that the load on a particular worker node falls below a particular minimum threshold (e.g., defined by a network administrator). After determining this, the cluster autoscaler in some embodiments migrates the pod or pods currently executing on the underutilized worker node to one or more other worker nodes execute at least one pod of the edge cluster. After this, the underutilized worker node no longer executes any pods of the edge cluster, and the cluster autoscaler decreases the span of the edge cluster.

While these figures describe monitoring edge clusters and adding worker nodes based on CPU utilization, any suitable metric or combination of metrics can be used to determine when to add worker nodes to or remove pods from an edge cluster.

Figure 11:
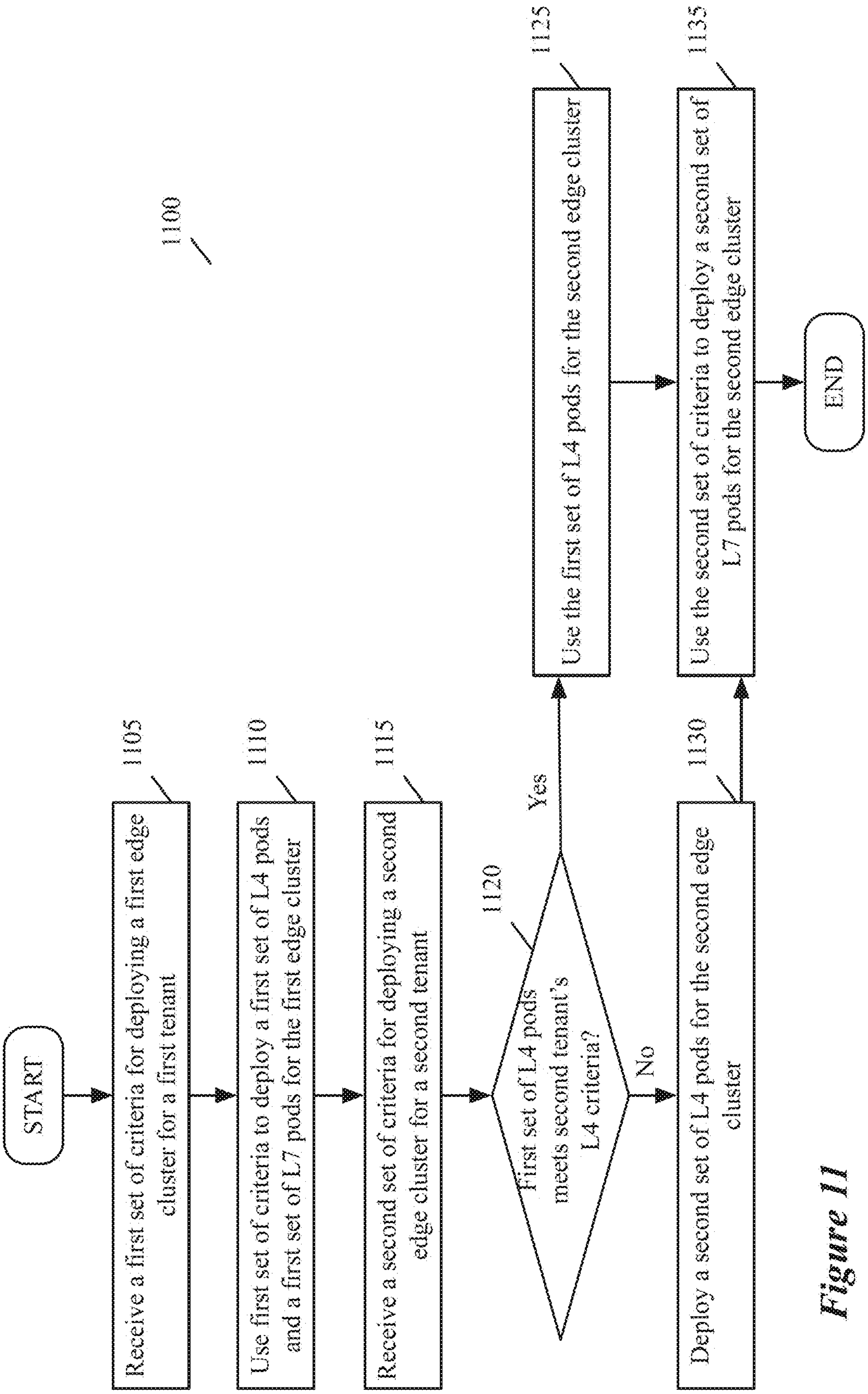
FIG. 11 conceptually illustrates a process of some embodiments for deploying edge clusters for different tenants.

In some embodiments, one set of worker nodes executes different sets of pods for different edge clusters of different tenants. FIG. 11 conceptually illustrates a process 1100 of some embodiments for deploying edge clusters for different tenants. The process 1100 is performed in some embodiments by an SDN manager and controller set that directs a master node of a Kubernetes cluster including worker nodes. In some embodiments, the process 1100 deploys a first edge cluster for a first tenant and a second edge cluster for a second tenant.

The process 1100 begins by receiving (at 1105) a first set of criteria for deploying the first edge cluster for the first tenant. In some embodiments, the SDN manager and controller set receives the first set of criteria in an API request (e.g., from an NCP of a master node that received it from the first tenant). In such embodiments, the SDN manager and controller set extracts the first set of criteria from the received API request in order to deploy the first edge cluster.

The first set of criteria in some embodiments specifies (1) a minimum or maximum number of pods to deploy for the first edge cluster, (2) a desired size of each pod of the first edge cluster, (3) a desired amount of CPU and/or memory of each pod of the first edge cluster, and/or (4) a specification of the services the first tenant wishes the first edge cluster to implement.

Next, the process 1100 uses (at 1110) the first set of criteria to deploy a first set of one or more L4 pods and a first set of one or more L7 pods for the first edge cluster. Using the first set of criteria, the SDN manager and controller set determines the configuration of the first edge cluster, such as (1) the number of pods to deploy for the first edge cluster, (2) the size needed for each pod of the first edge cluster, and/or (3) the amount of CPU and memory that needs to be allocated for each pod of the first edge cluster. After determining the configuration, the SDN manager and controller set deploys the first set of L4 pods on a particular worker node and the first set of L7 pods on a first set of worker nodes. In some embodiments, the first set of L4 pods is deployed separately from the first set of L7 pods such that the different service types (L4 vs. L5-L7) can be scaled independently from each other.

In some embodiments, each L7 pod in the first set of L7 pods performs a different L7 service for the first edge cluster (i.e., each L7 pod represents a different L7 service for the first edge cluster). In other embodiments, each L7 pod in the first set of L7 pods represents a different logical router.

In some embodiments, the first set of L7 pods for the first edge cluster is deployed in a first namespace, which provides logical isolation between different tenants and their different sets of L7 pods. The first namespace is referred to in some embodiments as a first Virtual Hybrid Cloud (VHC). Compute and networking elements in a VHC of a public cloud are isolated from other VHCs in the public cloud. A namespace in a Kubernetes cluster is referred to as a virtual cluster in a physical Kubernetes cluster in some embodiments. When different edge clusters for different tenants are deployed in different namespaces or VHCs, each tenant can (1) have one or more logical routers forming an organization unit and (2) be mapped to a single Kubernetes namespace. Isolating tenants' edge clusters into different namespaces provides capabilities to organize the edge clusters, enforce security policies, control accesses, and provide resource requests and limits. Conjunctively or alternatively, other methods of isolation for tenants are performed, which will be described further below.

At 1115, the process 1100 receives a second set of criteria for deploying a second edge cluster for a second tenant. In some embodiments, the SDN manager and controller set receives the second set of criteria also in an API request (e.g., from the set of managers and controllers). In such embodiments, the SDN manager and controller set extracts the second set of criteria from the received API request in order to deploy the second edge cluster. The second set of criteria in some embodiments specifies (1) a minimum or maximum number of pods to deploy for the second edge cluster, (2) a desired size of each pod of the second edge cluster, (3) a desired amount of CPU and/or memory of each pod of the second edge cluster, and/or (4) a specification of the services the second tenant wishes the first edge cluster to implement.

Next, the process 1100 determines (at 1120) whether the first set of L4 pods meets the second tenant's L4 criteria specified in the second set of criteria. The SDN manager and controller set compares the L4 criteria specified in the second set of criteria to the deployed first set of L4 pods to determine whether the first set of L4 pods meets the second tenant's L4 criteria. Conjunctively or alternatively, the SDN manager and controller set compares the L4 criteria specified in the second set of criteria to the L4 criteria specified in the first set of criteria to determine whether the first set of L4 pods meets the second tenant's L4 criteria.

In some embodiments, when different edge clusters of different tenants require the same criteria for their L4 pods, the SDN manager and controller set uses the same set of one or more L4 pods for the different edge clusters. Alternatively, when different edge clusters require at least one different criteria for their L4s pod (e.g., amount of allotted CPU, pod size, etc.), the SDN manager and controller set does not use a same set of L4 pods for the different edge clusters.

If the process 1100 determines that the first set of L4 pods meets the second tenant's L4 criteria, the process 1100 uses (at 1125) the first set of L4 pods for the second edge cluster. When the first and second tenants require the same L4 criteria for their edge cluster (e.g., the same configuration for an L4 pod), the SDN manager and controller set does not need to deploy an additional set of L4 pods for the second edge cluster, as the first set of L4 pods is already deployed and can properly perform the L4 services for the second edge cluster. As such, the SDN manager and controller set assigns the first set of L4 pods to both the first and second edge clusters.

In some embodiments, the SDN manager and controller set uses a same set of one or more L4 pods for two edge clusters of different tenants even when the different tenants require different L4 services. For example, the first tenant in some embodiments requires a particular set of L4 services, and the second tenant requires a subset of the particular set of L4 services. Because the subset of L4 services is already included in the particular set of L4 services performed by the first set of L4 pods deployed for the first tenant, the SDN manager and controller set can use the first set of L4 pods for both edge clusters. After using the first set of L4 pods for the second edge cluster, the process 1100 proceeds to step 1135, which will be described below.

If the process 1100 determines that the first set of L4 pods does not meet the second tenant's L4 criteria, the process 1100 deploys (at 1130) a second set of one or more L4 pods for the second edge cluster. When the SDN manager and controller set determines that the first set of L4 pods does not meet the L4 criteria required by the second tenant (e.g., has less memory than required by the second tenant, has less CPU than required by the second tenant, does not perform at least one L4 service required by the second tenant, etc.), the SDN manager and controller set deploys the second set of L4 pods for the second edge cluster. In some embodiments, the first and second sets of L4 pods are deployed on a same worker node. In other embodiments, they are deployed on different worker nodes.

Lastly, the process 1100 uses (at 1135) the second set of criteria to deploy a second set of L7 pods for the second edge cluster. Using the second set of criteria, the SDN manager and controller set determines the configuration of the second edge cluster. After determining the configuration, the SDN manager and controller set deploys the second set of L7 pods on a second set of worker nodes. In some embodiments, the second set of worker nodes and the first set of worker nodes deploying the first set of L7 pods for the first tenant include at least one same worker node. In other embodiments, the first and second sets of worker nodes are mutually exclusive (i.e., the sets of worker nodes do not include any same worker nodes).

In some embodiments, each L7 pod in the second set of L7 pods performs a different L7 service for the second edge cluster (i.e., each L7 pod represents a different L7 service for the second edge cluster). In other embodiments, each L7 pod in the second set of L7 pods represents a different logical router. In some embodiments, the second set of L7 pods for the second edge cluster is deployed in a second namespace (or second VHC, in some embodiments), which provides logical isolation from the first tenant's L7 pods deployed in the first namespace. After deploying the second set of L7 pods, the process 1100 ends.

The process 1100 describes deploying a second set of L4 pods for a second tenant when it is determined that the first set of L4 pods deployed for the first tenant does not meet the L4 criteria required by the second tenant. In other embodiments, rather than deploying the second set of L4 pods, the SDN manager and controller set modifies the first set of L4 pods to meet both the first and second tenant's L4 criteria. For example, when the first set of L4 pods does not initially perform one or more L4 services required by the second tenant, the SDN manager and controller set adds these one or more services to the first set of L4 pods so it can perform the services required by the second tenant. Conjunctively or alternatively, when the first set of L4 pods does not have a configuration required by the second tenant (e.g., when the first set of L4 pods does not have enough memory or CPU, when the first set of L4 pods is not a big enough size), the SDN manager and controller set changes the configuration of the first set of L4 pods to meet the configuration requirements of both tenants. By changing the first set of L4 pods instead of deploying a second set of L4 pods, the SDN manager and controller set saves compute time and power.

Figure 12:
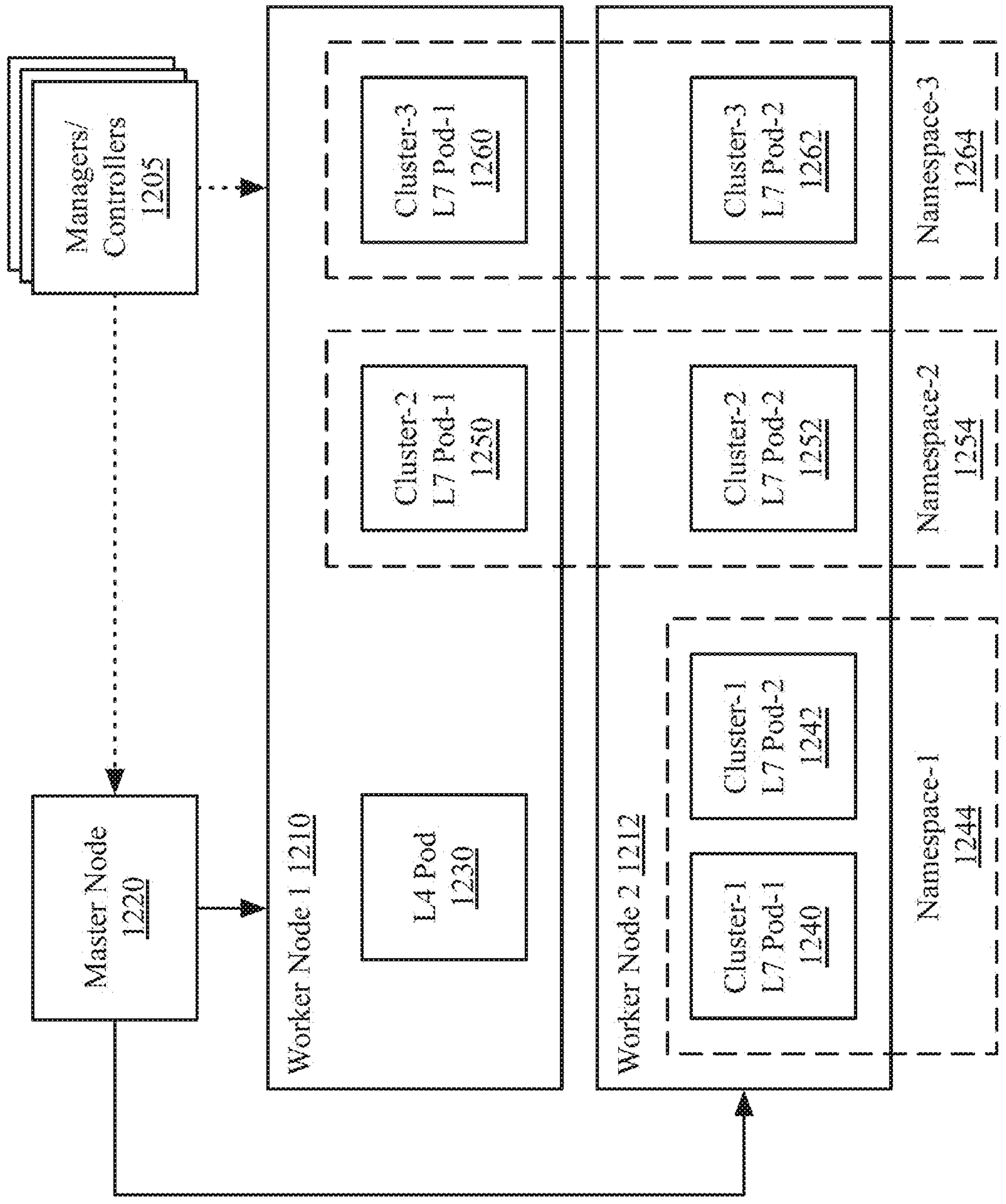
FIG. 12 illustrates an example SDN manager and controller set that directs deployment of edge clusters for different tenants on a set of worker nodes.

FIG. 12 illustrates an example SDN manager and controller set 1205 that directs deployment of different edge clusters for different tenants on a set of worker nodes 1210-1212. In this example, the SDN manager and controller set 1205 manages the worker nodes 1210-1212 and a master node 1220. The master node 1220 in some embodiments includes an API server, a Kubelet, and compute managers and controllers that deploy edge clusters on the worker nodes 1210-1212. The master node 1220 in some embodiments also includes an NCP for communicating with the SDN manager and controller set 1205.

The SDN manager and controller set 1205 directs the master node 1220 to deploy, on the first worker node 1210, an L4 pod 1230 that performs the L4 services for the different edge clusters. In this example, only one L4 pod 1230 is deployed for all edge clusters managed by the master node 1220 and the SDN manager and controller set 1205. Alternatively, two or more L4 pods are deployed for all edge clusters managed by the master node 1220 and the SDN manager and controller set 1205. These two L4 pods may be configured in an HA configuration, or may both be active L4 pods. In some embodiments, all L4 pods are deployed on one worker node (e.g., the first worker node 1210). Alternatively, at least two L4 pods are deployed on different worker nodes (e.g., worker nodes 1210-1212).

For a first edge cluster, the SDN manager and controller set 1205 directs the master node 1220 to deploy first and second L7 pods 1240-1242 on the second worker node 1212. These L7 pods 1240-1242 are part of a first namespace 1244. For a second edge cluster, the SDN manager and controller set 1205 directs the master node 1220 to deploy an L7 pod 1250 on the first worker node 1210 and another L7 pod 1252 on the second worker node 1212. These L7 pods 1250-1252 are part of a second namespace 1254. For a third edge cluster, the SDN manager and controller set 1205 directs the master node 1220 to deploy an L7 pod 1260 on the first worker node 1210 and another L7 pod 1262 on the second worker node 1212. These L7 pods 1260-1262 are part of a third namespace 1264. A namespace in some embodiments is a hierarchical storage structure that stores policies and parameters for resolving these policies for the related pods placed into that namespace.

Different L7 pods for a tenant in some embodiments implement a different logical router. In other embodiments, different L7 pods for a tenant perform a different L7 service.

In some embodiments, the different edge clusters are deployed in a particular public cloud. In such embodiments, the particular public cloud is managed by a particular public cloud provider, and the different edge clusters operate in a particular availability zone of the public cloud. Conjunctively or alternatively, the different edge clusters operate in a particular datacenter of the particular public cloud provider. In some embodiments, the different namespaces 1244, 1254, and 1264 are different VHCs such that the different edge clusters' L7 pods are deployed in different VHCs of the particular public cloud. By deploying the different sets of L7 pods for the different edge clusters in the different namespaces or VHCs, the SDN manager and controller set 1205 logically isolates the edge clusters' L7 pods from each other.

Figure 13:
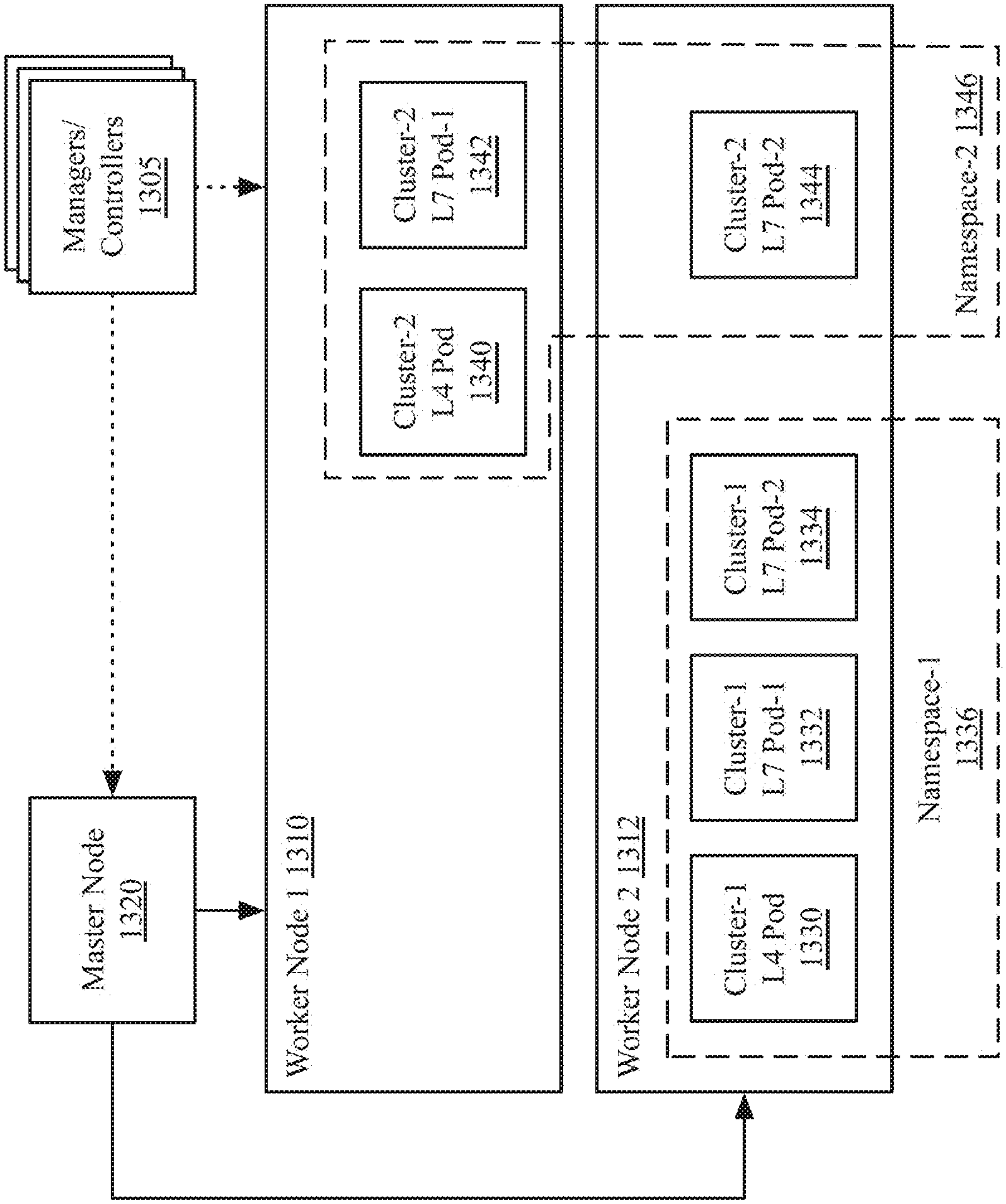
FIG. 13 illustrates another example SDN manager and controller set that directs deployment of edge clusters for different tenants on a set of worker nodes.

FIG. 13 illustrates another example SDN manager and controller set 1305 that uses a master node 1320 to deploy different edge clusters for different tenants on a set of worker nodes 1310-1312. In this example, the SDN manager and controller set 1305 manages the worker nodes 1310-1312 and the master node 1320. The master node 1320 in some embodiments includes an API server, a Kubelet, and compute managers and controllers that deploy edge clusters on the worker nodes 1310-1312. The master node 1320 in some embodiments also includes an NCP for communicating with the SDN manager and controller set 1305.

In this example, the SDN manager and controller set 1305 does not use one L4 pod for multiple edge clusters. Rather, the SDN manager and controller set 1305 directs the master node 1320 to deploy different L4 pods for each tenant. For a first edge cluster, the SDN manager and controller set 1305 deploys an L4 pod 1330 and L7 pods 1332-1334 on the second worker node 1312. These pods 1330-1334 are part of a first namespace 1336.

For a second edge cluster, the SDN manager and controller set 1305 deploys an L4 pod 1340 and an L7 pod 1342 on the first worker node 1310, and another L7 pod 1344 on the second worker node 1312. These pods 1340-1344 are part of a second namespace 1346. By deploying different L4 pods and different L7 pods for the different edge clusters in different namespaces, the SDN manager and controller set 1305 logically isolates the entire edge clusters from each other.

While the different edge clusters for the different tenants are implemented on at least one same worker node in the example of FIG. 13, in other embodiments, different edge cluster for different tenants are implemented on different sets of worker nodes (i.e., the sets of worker nodes are mutually exclusive). While the different L4 pods 1330 and 1340 are illustrated in this figure on different worker nodes 1310 and 1312, in other embodiments, L4 pods of two or more tenants are implemented on a same worker node.

In some embodiments, other methods are performed to enable multitenancy of edge clusters. For example, some embodiments utilize QoS profiles of different tenants to provide the different types and amounts of resources each tenant requires. In such embodiments, tenants can have shared and/or dedicated resources (e.g., shared pods or tenant-dedicated pods not used by other tenants).

As another example, a set of SDN managers and controllers in some embodiments maps tenancy in a hierarchical mode, which defines tenants and sub-tenants. In such embodiments, a placement engine (e.g., operating within the SDN manager and controller set, a master node, or a worker node) maintains concepts of shared namespaces (i.e., namespaces shared by multiple tenants) and dedicated namespaces (i.e., namespaces used by a single tenant). The placement engine also maintains concepts of shared pods and dedicated pods. Depending on service agreements, compliance requirements, service definitions, and resource utilization for certain tenants, the placement engine maps an edge cluster to at least one of a dedicated namespace and a shared namespace. Within a shared namespace, L4 pods can be dedicated or shared pods.

In some embodiments, a particular tenant's shared T0 and/or virtual routing and forwarding (VRF) gateway hosted in an edge cluster is placed within a particular namespace. After this, application level T1 gateways for the particular tenant are placed in the edge cluster within the particular namespace. In some embodiments, a T1 gateway for the particular tenant is deployed as two pods in an HA configuration. In other embodiments, the T1 gateway for the particular tenant is deployed as only one pod.

In addition to sharing L4 pods for multiple tenants, some embodiments conjunctively or alternatively share one or more L7 pods for different tenants. In such embodiments, dedicated L7 pods may be dedicated per gateway and shared L7 pods may be shared depending on the configured L7 services (e.g., as IDPS, sandboxing, etc.). When multiple tenants share a single service for their edge clusters, some embodiments utilize rate limiting to ensure that each tenant is receiving QoS and the amount of resources they are allotted.

Figure 14:
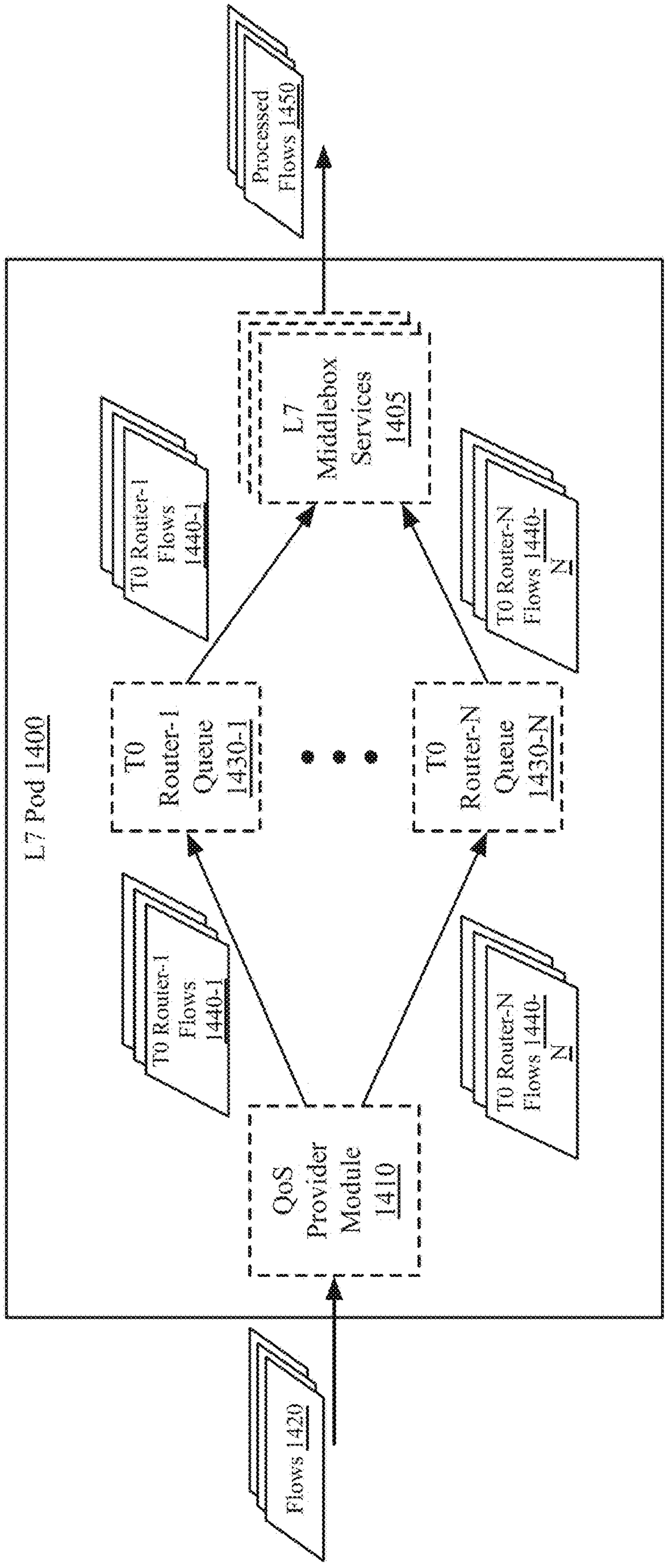
FIG. 14 illustrates an example L7 pod, that performs a set of L7 middlebox services, to represent different T0 routers of different gateways.

Rate limiting is enabled for pods of an edge cluster in some embodiments when a pod is shared by multiple components (e.g., by multiple gateways). In some of these embodiments, each pod of the edge cluster has a defined maximum resource limit, which can be scaled up or down depending on requirements of the pod, the edge cluster, and/or the components using the pod. FIG. 14 illustrates an example L7 pod 1400 that performs a set of L7 middlebox services 1405 to represent different T0 routers of different gateways. The L7 pod 1400 may perform any number of L7 services for data message flows to represent any number of T0 routers.

Because each T0 router shares the L7 pod 1400, the flows 1400 of all T0 routers must share the resources of the L7 pod 1400. To ensure that each T0 router represented by the L7 pod 1400 receives its fair share of resources, the L7 pod 1400 includes a QoS provider module 1410. The QoS provider module 1410 receives flows 1420 that are to be processed by each T0 router before forwarding to their destinations (e.g., destinations in one or more external networks, destinations in the logical network of which the L7 pod 1400 sits at the boundary, a next-hop such as another L7 pod or an L4 pod, etc.). Upon receiving the flows 1420, the QoS provider module 1410 forwards each T0 router's flows 1440 to a different queue 1430 of the L7 pod 1400. Each T0 router is associated with its own queue 1430 such that the flows 1420 are split into different sets of T0 router flows 1440 as they are put into the queues 1430 by the QoS provider module 1410.

Each queue 1430 is in some embodiments associated with its own rate limit, meaning that it will limit the packets per second (pps) rate of each flow it queues for the L7 middlebox services 1405. For example, the T0 Router-1 queue 1430-1 in some embodiments has a rate limit of 100 pps, meaning that it will only provide 100 data messages per second of the T0 Router-1's flows 1440-1 to the L7 middlebox services 1405 for processing. The queue 1430-1 will hold all other data messages of the flows 1440-1 received in each second. The data messages are provided in some embodiments in a first-in-first-out (FIFO) configuration, such that each data message is processed by the L7 middlebox services 1405 in the order in which they were received at the L7 pod 1400. While the queues 1430 are illustrated in this figure per T0 router represented by the L7 pod 1400, in other embodiments, a different queue is included in the L7 pod 1400 for each different flow processed by the L7 pod 1400.

The rate limits of the queues 1430 are determined in some embodiments by the master node that schedules the L7 pod on a worker node it manages. In other embodiments, the rate limits are determined by a set of SDN managers and controllers that direct the master node to deploy the L7 pod 1400. Any suitable method for determining and assigning rate limits may be used. By limiting how many data messages per second each flow will have processed by the L7 middlebox services 1405, the QoS provider module 1410 ensures that no flow consumes more resources than other flows.

After the L7 middlebox services 1405 process each flow 1440 1-N, the L7 middlebox services 1405 forward the processed flows 1450 to their destinations (e.g., to destinations in one or more external networks, to destinations in the logical network of which the L7 pod 1400 sits at the boundary, to another L7 pod, to an L4 pod, etc.). The L7 pod 1400 also includes outgoing queues (not shown) in some embodiments for placing the processed flows 1450 before forwarding them to their destinations.

While the above described example discusses using rate limits for processing at an L7 pod, such processes can also be performed for L4 pods and the L4 services it provides for multiple routers. While the above described example discusses rate limits, in other embodiments, other types of resource limits (e.g., maximum CPU usage limits, maximum memory usage limits, etc.) are placed on shared pods to ensure flows do not over-consume resources over other flows that are also allotted these resources.

Figure 15A:
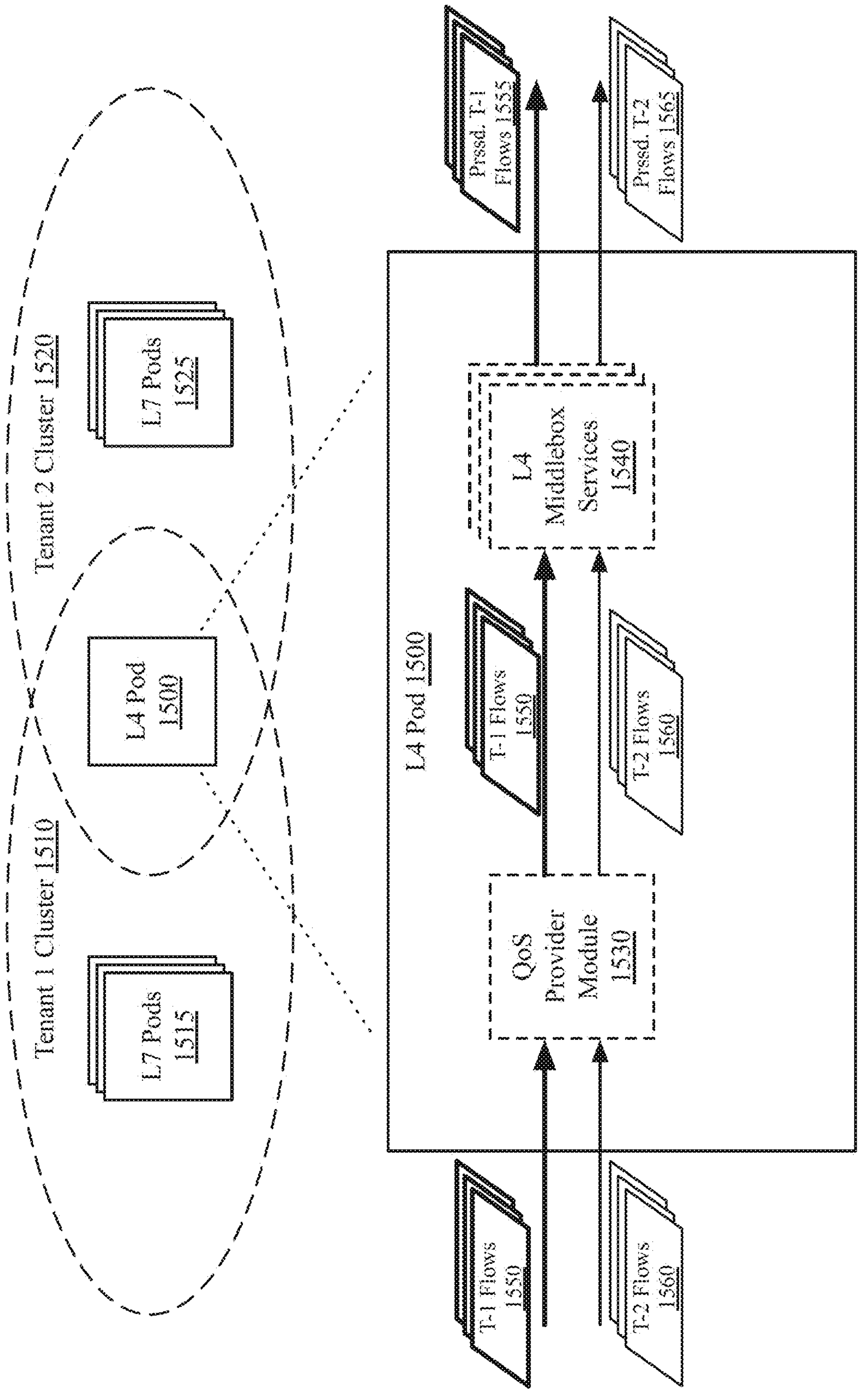
FIGS. 15A-B illustrate an example L4 pod shared by different edge clusters of different tenants.
Figure 15B:
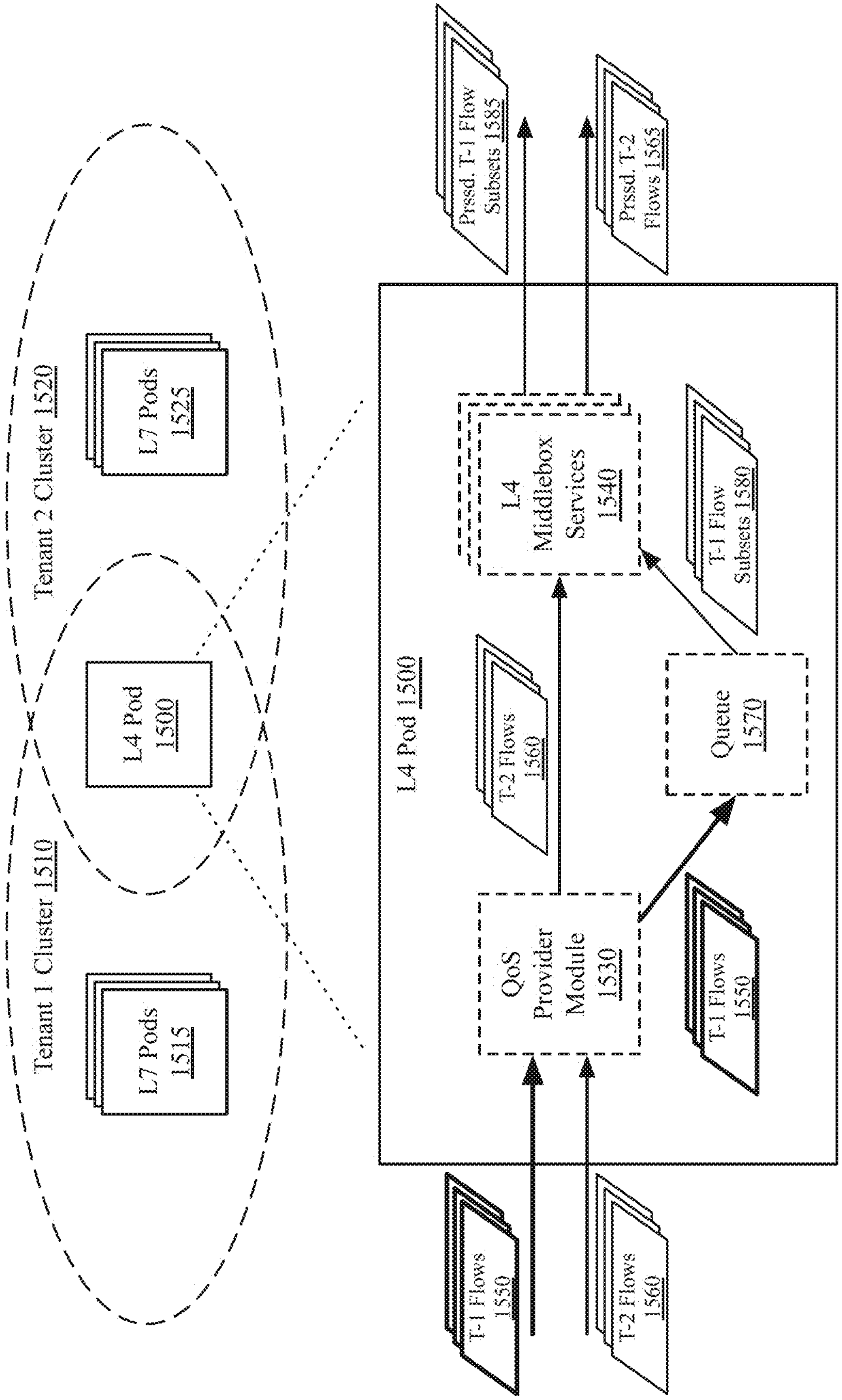

In some embodiments, rate limiting is used when multiple tenants share a pod for their different edge clusters to provide QoS for each tenant. FIGS. 15A-B illustrate an example L4 pod shared by different edge clusters 1510 and 1520 of two different tenants. The different edge clusters 1510 a 1520 represent different edge devices deployed for the first and second tenants to perform edge services at the boundary between at least one logical network and at least one external network. In this example, the L4 pod 1500 is part of the first tenant's cluster 1510 along with a first set of one or more L7 pods 1515, and is also part of the second tenant's cluster 1520 along with a second set of L7 pods 1525. The L4 pod 1500 is shared by the two tenants, meaning that the two tenants share this pod for the L4 services of their respective edge clusters 1510 and 1520. In some embodiments, the L4 pod 1500 is the only L4 pod performing L4 services for the first and second tenants. In other embodiments, one or more other L4 pods are deployed for the first and second tenants.

The edge clusters 1510-1520 are deployed in some embodiments in a particular public cloud managed by a particular public cloud provider. In some of these embodiments, the edge clusters 1510-1520 operate in a particular availability zone of the particular public cloud provider, or in a particular datacenter of the particular public cloud provider in other embodiments. The first tenant's L7 pods 1515 are in some embodiments deployed in a first VPC of the particular public cloud, while the second tenant's L7 pods 1525 are deployed in a second VPC of the particular public cloud.

The L4 pod 1500 includes a QoS provider module 1530 and a set of one or more L4 middlebox services 1540. The set of L4 middlebox services 1540 performs one or more L4 services, such as L4 firewall, L4 load balancing, NAT, IDS/IPS, etc. In some embodiments, the L4 middlebox services 1540 performs the same set of L4 services for each of the two tenants. In other embodiments, the L4 middlebox services 1540 performs at least one different service for each of the two tenants.

FIG. 15A illustrates the QoS provider module 1530 receiving tenant 1's flows 1550 and tenant 2's flows 1560 for L4 service processing and providing them to the L4 middlebox services 1540. The L4 middlebox services 1540 process the flows 1550 and 1560 and forward the processed flows 1555 and 1565 to their next hops and/or their destinations (e.g., one of the L7 pods 1515 or 1525, destinations within the logical network of the edge clusters 1510 and 1520, destinations in one or more external networks, etc.).

The QoS provider module 1530 monitors the volume of these flows 1550 and 1560 in order to limit the rate each tenant's flows are processed by the L4 middlebox services 1540. In some embodiments, the QoS provider module 1530 collects metrics related to the number of data messages of each flow it receives and uses the metrics to determine the number of data messages of each flow being processed by the L4 middlebox services 1540 (i.e., to determine the volume of each flow). The QoS provider module 1530 in some embodiments stores the metrics in a local data store (not shown). Once the QoS provider module 1530 determines the volume of each flow for each tenant, it determines whether the flows' volume exceeds a particular threshed amount of data messages allotted to be processed by the L4 middlebox services 1540 (i.e., exceeds the rate limit assigned to each tenant).

The rate limit for each tenant may be assigned by a network administrator, by the master node of the L4 pod 1500, or by a set of SDN managers and controllers managing the master node of the L4 pod 1500). Different tenants in some embodiments are assigned the same rate limit, while, in other embodiments, at least two tenants are assigned different rate limits. Any suitable method for determining and assigning rate limits to tenants may be used.

In this example, the first tenant's flows 1550 are at a higher volume than is allowed by its assigned rate limit (as denoted by bolded lines), which is causing the first tenant to use more resources of the L4 pod 1500 and the L4 middlebox services 1540 than they are allotted. To limit the resources the first tenant is using and ensuring the second tenant is receiving its allotted amount of resources of the L4 pod 1500, the QoS provider module 1530 queues the first tenant's flows 1550.

FIG. 15B illustrates the L4 pod 1500 after the QoS provider module 1530 has provided the first tenant's flows 1550 to a queue 1570 for the queue 1570 to limit the rate of the first tenant's flows 1550. The second tenant's flows 1560 are not forwarded to the queue 1570 of the L4 pod 1500, as it they are not exceeding their rate limit. The second tenant's flows 1560 continue to be provided by the QoS provider module 1530 to the L4 middlebox services 1540 for processing, and the processed flows 1565 are forwarded to their next hops and/or destinations.

Because the first tenant's flows 1550 are exceeding their rate limit (as denoted by dashed lines), the queue 1570 holds one or more data messages of the flows 1550 to provide subsets of the first tenant's flows 1580 at the first tenant's assigned rate limit. In some embodiments, the queue 1570 holds one or more data messages of each flow of the first tenant. In other embodiments, the queue 1570 holds one or more data messages of a subset of the flows of the first tenant.

The first tenant's flow subsets 1580 are provided from the queue 1570 to the L4 middlebox services 1540 for processing at a rate limit that does not affect the processing of the second tenant's flows 1560. After processing the first tenant's flow subsets 1580, the L4 middlebox services 1540 provide the processed flow subsets 1585 to their next hops and/or their destinations. By limiting the rate each tenant's flows consume of the L4 middlebox services 1540, the QoS provider module 1530 avoids the L4 middlebox services 1540 being overloaded and dropping data messages.

While the above described example discusses tenants sharing an L4 pod, conjunctively or alternatively, multiple tenants in some embodiments share at least one L7 pod. In such embodiments, the shared L7 pod or pods perform at least a subset of L7 services for both tenant's edge clusters. In some of these embodiments, each tenant also has their own set of one or more dedicated L7 pods that are exclusive to that tenant. The shared pod and dedicated pods execute in some embodiments on a single worker node. In other embodiments, the shared and dedicated pods execute on different worker nodes. Still, in other embodiments, at least two of the pods (two dedicated pods, one dedicated pod and one shared pod, etc.) execute on a same worker node. All shared and dedicated pods of tenants' edge clusters are deployed on worker nodes managed by a master node that schedules the pods on the worker nodes.

Shared and dedicated L7 pods can execute on same or different host computers. For example, a shared first L7 pod in some embodiments is deployed on a first worker node, a dedicated second L7 pod for a first tenant is deployed on a second worker node, and a dedicated third L7 pod for a second tenant is deployed on a third worker node. All of these worker nodes are managed by one master node. In other embodiments, at least one shared L7 pod and at least one dedicated L7 pod execute on a same worker node.

Rate limiting is enforced in some embodiments per port or per sets of ports. In such embodiments, on the data plane, each tenant has their own routing domain (e.g., their own separate VRF within a shared pod, their own separate single domain per dedicated pod). The uplink or inter-VRF port or ports that connect the tenant's routing domain or VRF to a provider router or an external router are configured with the rate limiting policy for that tenant. These ports are where all ingress and egress traffic for a tenant is seen and where rate limiting is enforced.

Token based rate limiting is utilized for tenants in some embodiments. For example, when a request is received (e.g., at a QoS provider module), a token has to be taken from a set of tokens so the request can be further processed. If there are no tokens available for the request, the request is rejected. The set of tokens is also refilled periodically. Methods and systems regarding rate limiting for tenants is further described in U.S. Patent Publication 2021/0218677, which is incorporated by reference in this application.

In some embodiments, stateful L4 services, such as firewall and NAT services, have a maximum data message rate of 1 million (M) packets per second (pps) per core. To handle 100 Gigabytes per second (Gbps) throughout with 64 billion (B) bytes, a worker node is required to handle 148 M pps. For pure routing, this requires in some embodiments 24 cores to allow for linear scalability. For a stateful firewall, some embodiments require 148 cores. Many servers do not have such capabilities, either for on-premises environments or public cloud environments. Additionally, it costs a large amount of CPU for a customer to receive 100 Gigabytes of networking with the needed networking services.

As such, in some embodiments, one or more service operations (e.g., L4 services) are offloaded from pods deployed for an edge cluster to a PNIC connected to a worker node deploying the pods. In such embodiments, the PNIC is a smart NIC that has the capability to perform network forwarding and service operations for the edge cluster. The smart NIC, in some embodiments, is a configurable network interface controller that includes a general-purpose CPU (typically low-power compared to the processor of the computer for which the smart NIC acts as the network interface) in addition to one or more application-specific circuits (e.g., data message processing circuits).

Figure 16:
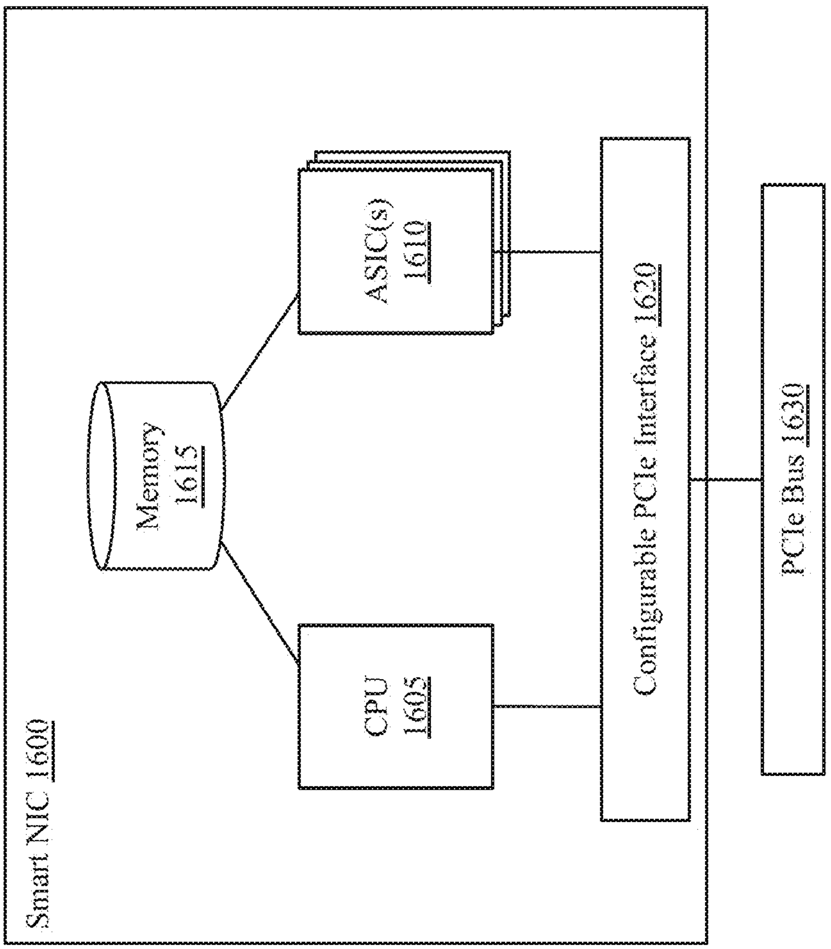
FIG. 16 illustrates the hardware of a smart NIC of some embodiments that can be configured to perform service operations for an edge cluster deployed as a cluster of pods.

FIG. 16 illustrates the hardware of a smart NIC 1600 of some embodiments that can be configured to perform middlebox service (e.g., firewall services, load balancing services, NAT services, IDS/IPS services, etc.) offload for a worker node executing one or more pods for an edge cluster at the edge of a logical network. As shown, the smart NIC 1600 includes its own general-purpose CPU 1605, a set of application-specific integrated circuit (ASICs) 1610, a memory 1615, and a configurable PCIe interface 1620. The ASICs 1610, in some embodiments, include at least one I/O ASIC that handles the processing of data messages forwarded to and from the worker node, and are at least partly controlled by the CPU 1605. In some embodiments, either in addition to or as an alternative to the ASICs, the smart NIC includes a set of configurable field-programmable gate arrays (FPGAs). Conjunctively or alternatively, the smart NIC includes other accelerators (e.g., cryptographic accelerators) and regular expression engines.

The configurable PCIe interface 1620 enables connection of the smart NIC 1600 to the other physical components of a computer system (e.g., the x86 CPU, memory, etc.) via the PCIe bus 1630 of the computer system. Via this configurable PCIe interface 1620, the smart NIC 1600 of some embodiments presents itself to the computer system as a multitude of devices, including a data message processing NIC, a hard disk (using non-volatile memory express (NVMe) over PCIe), a set of VFs and PFs, or other types of devices. The CPU 1605 executes a NIC operating system (OS) in some embodiments that controls the ASICs 1610 and can perform other operations as well. In some embodiments, a network forwarding and middlebox service offload ASIC 1610 performs the operations to offload middlebox services, such as firewall services, from a worker node executing edge cluster pods.

Figure 17:
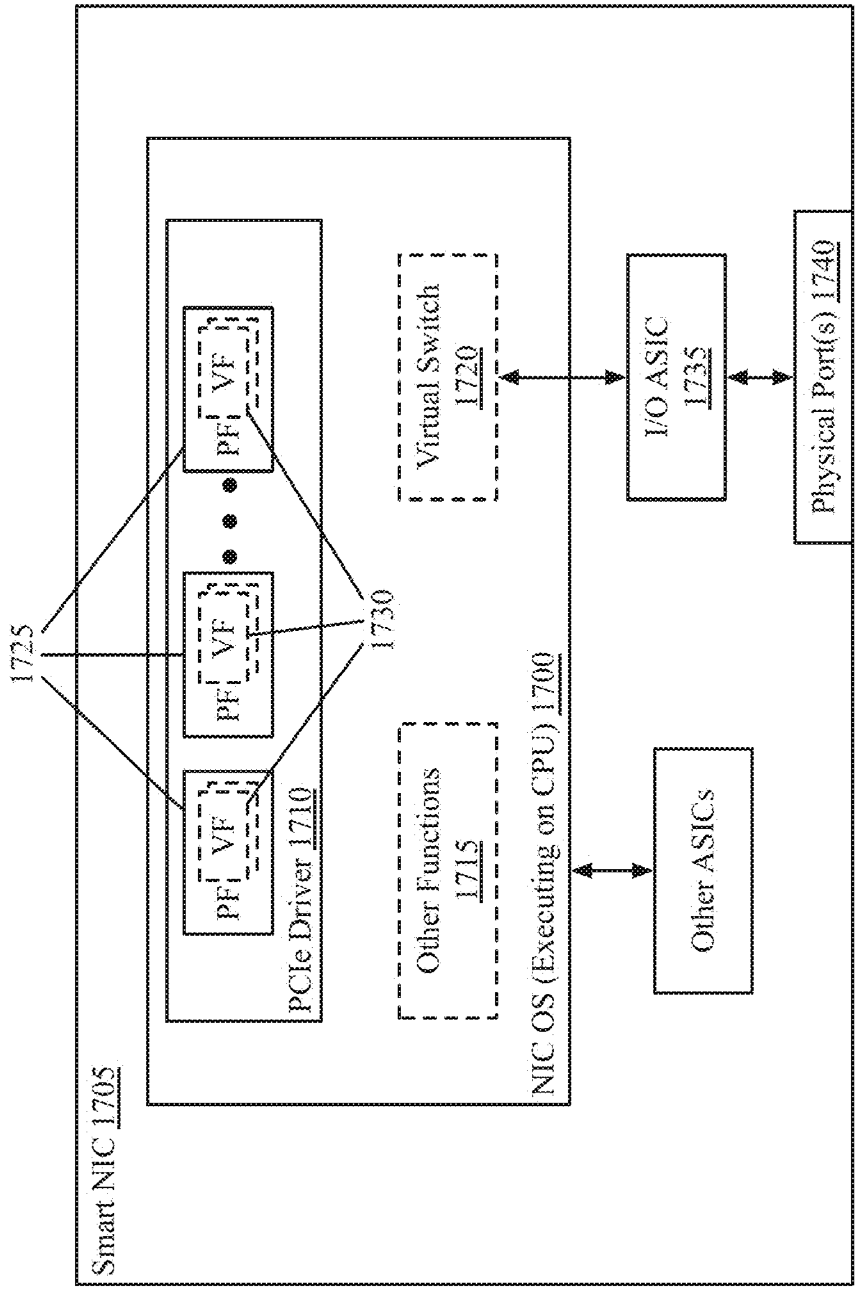
FIG. 17 illustrates the NIC OS of a smart NIC of some embodiments.

FIG. 17 illustrates an example NIC OS 1700 of a smart NIC 1705 of some embodiments. The NIC OS 1700 is executed, in some embodiments, by the CPU of the smart NIC (e.g., CPU 1605 of FIG. 16). This NIC OS 1700 includes a PCIe driver 1710, a virtual switch 1720, and other functions 1715.

The PCIe driver 1710 exposes multiple PFs 1725, each of which capable of instantiating multiple VFs 1730. These different VFs 1730 enable the smart NIC 1705 to present as multiple different types of devices to the computer system to which it attaches via its PCIe bus. For instance, the smart NIC 1705 can present itself as a network adapter (for processing data messages to and from the computer system) as well as an NVMe disk in some embodiments.

The NIC OS 1700 of some embodiments is capable of executing a virtualization program (similar to a hypervisor) that enables sharing resources (e.g., memory, CPU resources) of the smart NIC 1705 among multiple machines (e.g., VMs, pods, containers) if those machines execute on the computer. The virtualization program in some embodiments provides compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 1700 of some embodiments executes the virtual switch 1720. The virtual switch 1720 enables the smart NIC 1705 to perform software-defined networking and provide the I/O ASIC 1735 of the smart NIC 1705 with a set of flow entries (e.g., the cache entries described herein) so that the I/O ASIC 1735 can perform flow processing offload (FPO) for the computer system in some embodiments. The I/O ASIC 1735, in some embodiments, receives data messages from the network and transmits data messages to the network via one or more physical network ports 1740.

The other functions 1715 executed by the NIC operating system 1700 of some embodiments can include various other operations, including operations not directly related to data message processing (e.g., operations for a machine-learning system). In addition, the NIC operating system 1700 (either the virtual switch 1720 or other functions 1715 of the operating system) in some embodiments performs various cache entry validation and invalidation operations and maintain a rule update table used to perform the cache entry validation.

As noted, the smart NIC of some embodiments processes data messages using cache entries (e.g., cache entries installed by a software forwarding element (SFE) executing on a computer for which the smart NIC is the interface) such that at least a subset of the data messages received at the smart NIC can be processed without a need to provide the data messages to the SFE. Data message processing by the smart NIC ASIC tends to be faster than processing by the SFE, even before accounting for the savings realized by avoiding the need to pass the data messages to and from the computer (e.g., via the PCIe interface).

Figure 18:
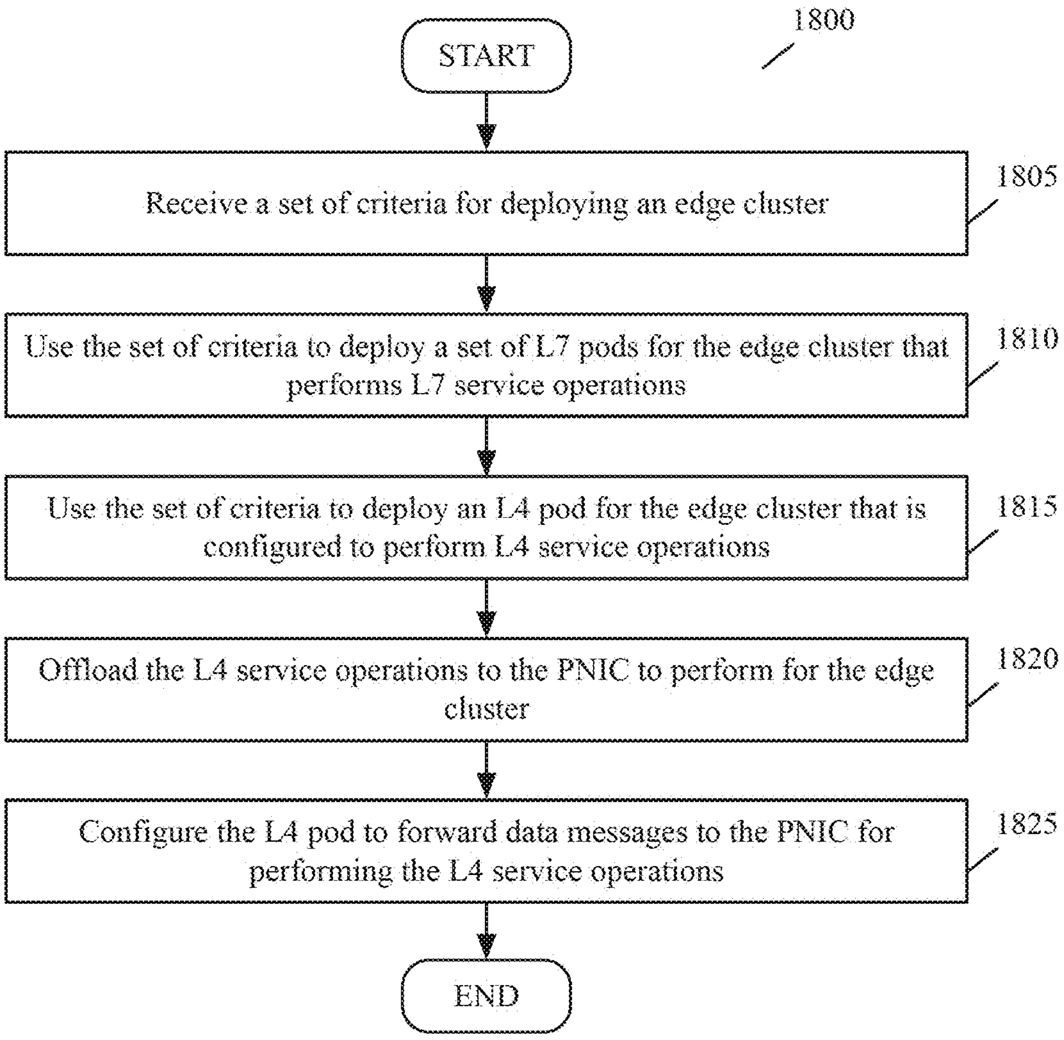
FIG. 18 conceptually illustrates a process of some embodiments for offloading middlebox service operations from an edge cluster executing as pods on a set of worker nodes to a PNIC connected to a particular worker node.

In some embodiments, a smart NIC connected to a worker node performs service operations for one or more pods executing on the worker node. For example, a split datapath allows for L2-L4 services to be offloaded to a smart NIC from an edge cluster. FIG. 18 conceptually illustrates a process 1800 of some embodiments for offloading middlebox service operations from an edge cluster executing as pods on a set of worker nodes to a PNIC connected to a particular worker node of the worker node set. The process 1800 is performed in some embodiments by an SDN manager and controller set to offload and accelerate a range of networking data path functions from the particular node's CPU. In some embodiments, because the process 1800 uses a PNIC that is a smart NIC, it also provides more programmable network processing features and intelligence compared to a traditional PNIC.

The process 1800 begins by receiving (at 1805) a set of criteria for deploying an edge cluster. In some embodiments, the set of criteria is received in an API request (e.g., from an NCP of a master node that received it from the first tenant) from a user. In such embodiments, the SDN manager and controller set extracts the user-defined criteria from the received API request. The set of criteria in some embodiments specifies (1) a minimum or maximum number of pods to deploy for the edge cluster, (2) a desired size of each pod of the edge cluster, (3) a desired amount of CPU and/or memory of each pod of the edge cluster, and/or (4) a specification of the services the edge cluster should to implement and perform for data message flows traversing the edge cluster.

Next, the process 1800 uses (at 1810) the set of criteria to deploy a set of one or more L7 pods for the edge cluster that performs L7 service operations on data message flows traversing the edge cluster. Using the set of criteria, the SDN manager and controller set determines the configuration of the edge cluster, such as (1) the number of pods to deploy for the edge cluster, (2) the size needed for each pod of the edge cluster, and/or (3) the amount of CPU and memory that needs to be allocated for each pod of the edge cluster. After determining the configuration, the SDN manager and controller set deploys the set of L7 pods on the set of worker nodes. In some embodiments, each L7 pod in the set of L7 pods performs a different L7 service for the edge cluster (i.e., each L7 pod represents a different L7 service for the edge cluster). In other embodiments, each L7 pod in the set of L7 pods represents a different logical router.

At 1815, the process 1800 uses the set of criteria to deploy an L4 pod for the edge cluster that is configured to perform L4 service operations on the data message flows traversing the edge cluster. The SDN manager and controller set deploys the L4 pod on the particular worker node. In some embodiments, the particular worker node also executes at least one L7 pod. Alternatively, the particular worker node does not execute any L7 pods. The L4 pod is the only pod deployed for the edge cluster that is configured to perform L4 services, and is deployed separately from the L7 pods such that the different service types (L4 vs. L7) can be scaled independently from each other.

Next, the process 1800 offloads (at 1820) the L4 service operations from the L4 pod to the PNIC to perform for the edge cluster. To alleviate the load on the particular worker node and to accelerate the operations of the edge cluster, the SDN manager and controller set offloads the L4 service operations from the edge cluster (i.e., from the L4 pod) to the PNIC. In some embodiments, the SDN manager and controller set offloads the L4 service operations to the PNIC by configuring a service operation module on the PNIC to perform the L4 service operations. The L4 service operations in some embodiments include stateful service operations, and the SDN manager and controller set configures the service operation module to perform these stateful L4 service operations.

In some embodiments, the PNIC (i.e., the service operation module of the PNIC) is configured to perform data path functions, such as match-action processing, tunnel termination and origination, etc. In such embodiments, the match-action table operates similarly to a flow cache. In some embodiments, a match-action table is used by the PNIC to parse a data message flow (e.g., using the flow's five-tuple) to determine an action to perform on the flow. Fast match-action hardware (e.g., content-addressable memory (CAM)) addresses actions more quickly than when they are processed by a software flow cache or other processes.

Lastly, the process 1800 configures (at 1825) the L4 pod to forward data messages to the PNIC for performing the L4 service operations on the data message flows. In some embodiments, because the L4 pod is the only L4 pod of the edge cluster, it receives the data message flows (e.g., from a master node) for performing L4 service operations. As such, the L4 pod is configured to forward the flows to the PNIC for processing. In such embodiments, the L4 pod receives the processed flows back from the PNIC and forwards them to their next-hop (e.g., one or more L7 pods) or to their destinations. After configuring the L4 pod, the process 1800 ends.

In other embodiments, the L4 pod does not receive the flows after the L4 service operations have been offloaded to the PNIC. In such embodiments, the PNIC directly receives the flows for processing (e.g., from the master node of the worker node set) and forwards them to their next-hop (e.g., one or more L7 pods) or to their destinations after processing.

Figure 19:
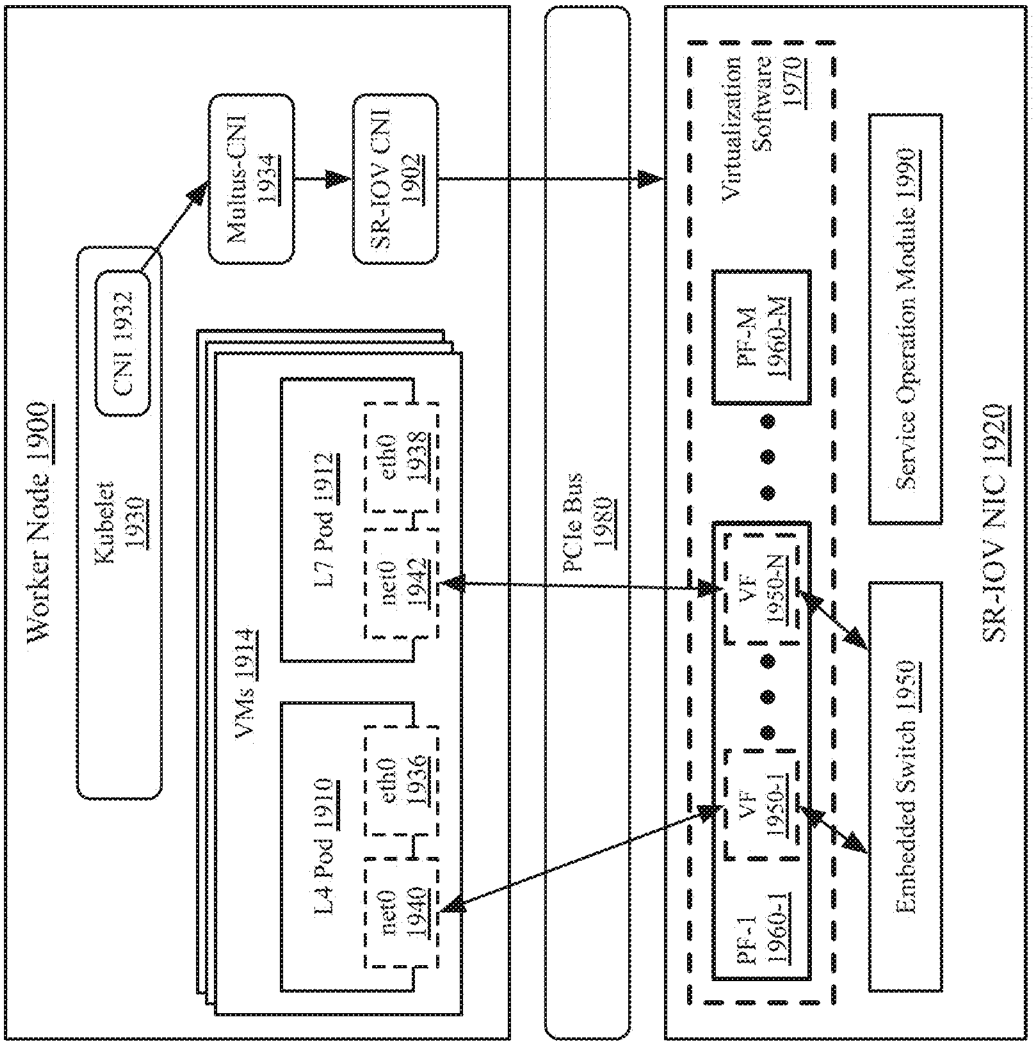
FIG. 19 illustrates an example worker node that offloads service operations to a PNIC.

FIG. 19 illustrates an example worker node 1900 that offloads service operations to a connected PNIC 1920. In this example, the PNIC 1920 is an SR-IOV NIC, and the worker node 1900 is a host computer that deploys a Kubernetes SR-IOV CNI 1902 to connect pods 1910-1912 to the PNIC 1920. At least a subset of pods 1910-1912 are deployed on the worker node 1900 for an edge cluster. In some embodiments, the pods 1910-1912 are the only pods deployed for the edge cluster. In other embodiments, at least one other pod is deployed on at least one other worker node for the edge cluster.

The worker node 1900 executes a kubelet 1930 that, e.g., registers the node 1900 with an API server, receives pod specifications and containerspecs, and uses this information to create the pods 1910-1912 on the node 1900. The kubelet 1930 includes a CNI 1932, which connects to the multus-CNI 1934. The multus-CNI 1934 enables multiple network interfaces to be deployed on the pods 1910-1912. The multus-CNI 1934 connects to the SR-IOV CNI 1902, which connects to the PNIC 1920.

An L4 pod 1910 includes a management NIC 1936 (eth0) and a network interface 1940 (net0). An L7 pod 1912 includes a management NIC 1938 and a network interface 1942. The worker node 1900 can execute any number of L7 pods other than the L7 pod 1912 illustrated. The network interfaces 1940-1942 connect to the VFs 1950 of the PNIC 1920 through the PCIe bus 1980. The pods 1910-1912 in this example execute on a set of one or more VMs 1914 of the worker node 1900.

In some embodiments, the VFs 1950 are virtualized PCIe functions exposed as an interface of the NIC 1920. The VFs 1950 are associated with the PF 1960 of the PNIC. In this example, each pod 1910-1912 is associated with its own VF of the virtualization software 1970. Alternatively, in other embodiments, the pods 1910-1912 are associated with a same VF.

In some embodiments, the VFs are virtual interfaces of the embedded switch 1950 of the PNIC 1920. In such embodiments, the embedded switch 1950 accelerates inter-pod networking. Through the VFs, the L4 pod 1910 and the L7 pod 1912 communicate with each other and exchange data message flows.

Also through the VFs, the pods 1910-1912 exchange data message flows with a service operation module 1990 of the PNIC 1920 that performs L4 service operations for the pods 1910-1912. In some embodiments, the L4 pod 1910 forwards flows requiring L4 service operations to the service operation module 1990 through one of the VFs and the PCIe bus 1980. After processing the flows, the service operation module 1990 provides the processed flows back to the L4 pod 1910 for forwarding to their next-hop or to their destinations. Conjunctively or alternatively, after processing the flows, the service operation module 1990 provides the processed flows to the L7 pod 1912 through its associated VF and the PCIe bus 1980 for additional processing and/or forwarding.

While this example illustrates an L4 pod 1910 deployed for the edge cluster, in other embodiments, no L4 pod is deployed for the edge cluster, as a PNIC 1920 performs the L4 service operations for the edge cluster. In such embodiments, only L7 pods 1912 are deployed for the edge cluster. In some of these embodiments, the PNIC 1920 is still connected to the worker node 1900. Alternatively, the PNIC 1900 is connected to the master node that manages the worker node 1900 and schedules the pods for the edge cluster.

Figure 20:
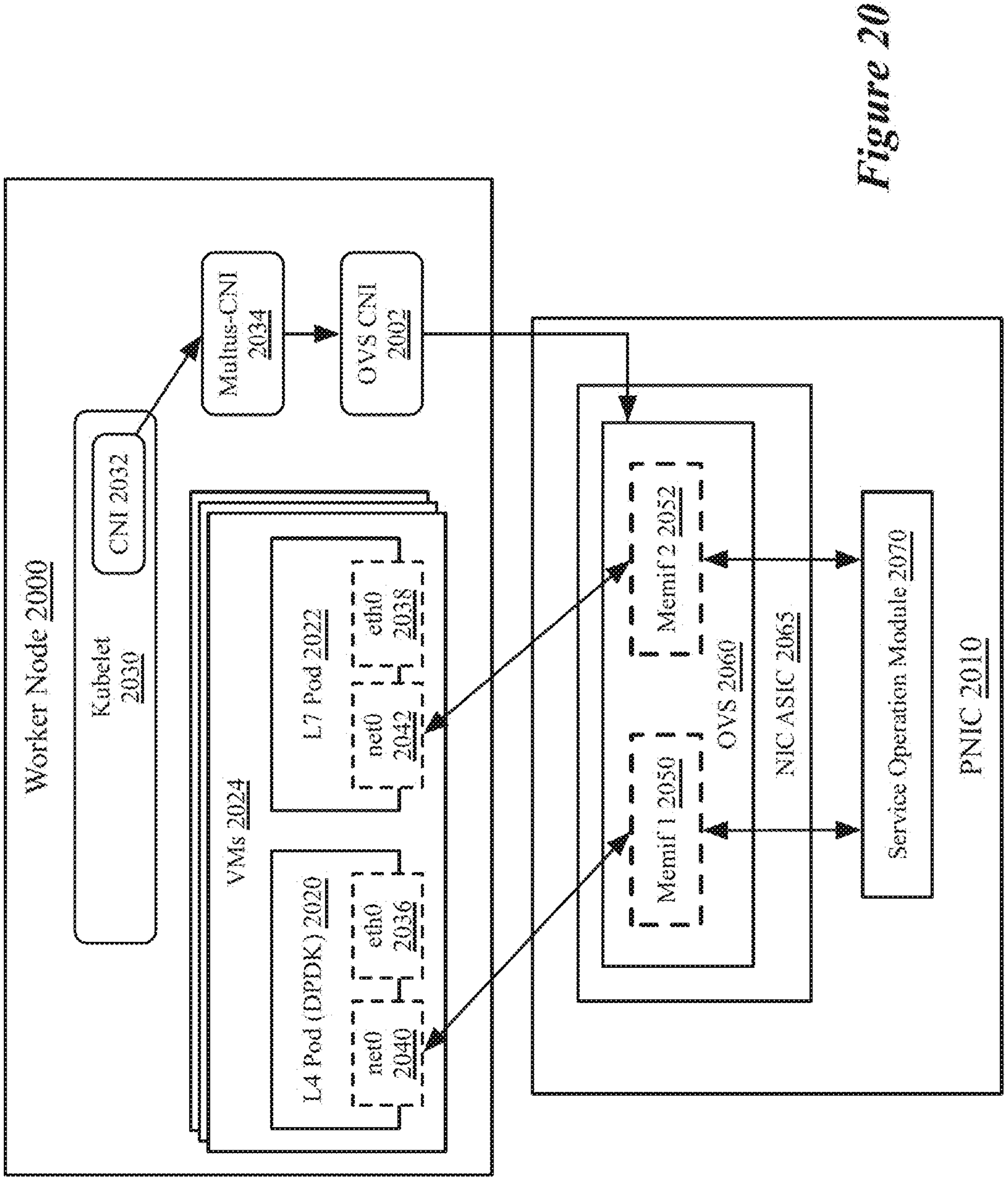
FIG. 20 illustrates another example worker node that offloads service operations to a PNIC.

FIG. 20 illustrates another example worker node 2000 that offloads service operations from an edge cluster to a connection PNIC 2010. In this example, the PNIC 2010 deploys an OVS 2060 on the PNIC's ASIC 2065, so the worker node 2000 deploys a Kubernetes OVS CNI 2002 to connect pods 2020-2022 to the PNIC 2010. In some embodiments, the pods 2020-2022 are the only pods deployed for the edge cluster. In other embodiments, at least one other pod is deployed on at least one other worker node for the edge cluster.

The worker node 2000 executes a kubelet 2030 that, e.g., registers the node 2000 with an API server, receives pod specifications and containerspecs, and uses this information to create the pods 2020-2022 on the node 2000. The kubelet 2030 includes a CNI 2032, which connects to the multus-CNI 2034. The multus-CNI 2034 enables multiple network interfaces to be deployed on the pods 2020-2022. The multus-CNI 2034 connects to the OVS CNI 2002, which connects to the PNIC 2010.

An L4 pod 2020 includes a management NIC 2036 (eth0) and a network interface 2040 (net0). An L7 pod 2022 includes a management NIC 2038 and a network interface 2042. The worker node 2000 can execute one or more L7 pods other than the L7 pod 2022. Each pod 2020-2022 connects to a different memif device 2050-2052. In other embodiments, the L4 pod 2020 and L7 pod 2022 connect to a same memif device of the OVS 2060. The pods 2020-2022 in this example execute on a set of one or more VMs 2024 of the worker node 2000.

Using the memif devices 2050-2052, the pods 2020-2022 exchange data message flows with a service operation module 2070 of the PNIC 2010 that performs L4 service operations for the pods 2020-2022. In some embodiments, the L4 pod 2020 forwards flows requiring L4 service operations to the service operation module 2070 through the memif device 2050. After processing the flows, the service operation module 2070 provides the processed flows back to the L4 pod 2020 for forwarding to their next-hop or to their destinations. Conjunctively or alternatively, after processing the flows, the service operation module 2070 provides the processed flows to the L7 pod 2022 for additional processing and/or forwarding.

While this example illustrates an L4 pod 2020 deployed for the edge cluster, in other embodiments, no L4 pod is deployed for the edge cluster, as the PNIC 2010 performs the L4 service operations for the edge cluster. In such embodiments, only L7 pods 2022 are deployed for the edge cluster. In some of these embodiments, the PNIC 2010 is connected to the worker node 2000. In other embodiments, the PNIC 2010 is connected to a master node that manages the worker node 2000 and schedules the pods for the edge cluster.

To offload services to a PNIC 2010 that uses memif devices 2050-2052, some embodiments offload the OVS 2060 to the NIC ASIC's match-action table (i.e., the NIC's ASIC implements the OVS 2260). In such embodiments, because the hardware of the PNIC 2010 does not understand memif devices, the last action of the match-action table specifies forwarding a data message to its destination memif, which will reach the correct pod of the worker node 2000. The CPU of the PNIC 2010 in some embodiments is involved to continue the remaining work to copy data message flows to the destination memif device. In embodiments where the PNIC 2010 supports virtio data path acceleration (vDPA), this work is further offloaded to the PNIC 2010. In such embodiments, vDPA offloads the virt-io datapath to the PNIC 2010 and offers line-speed networking performance.

In some embodiments, a network controller plugin (NCP) is used for receiving parsed API requests from an API server and generating API calls using one of the structures described above. Also, rather than including an NCP, some embodiments instead include an adapter to receive the parsed APIs from the API server and generate the API calls.

Figure 21:
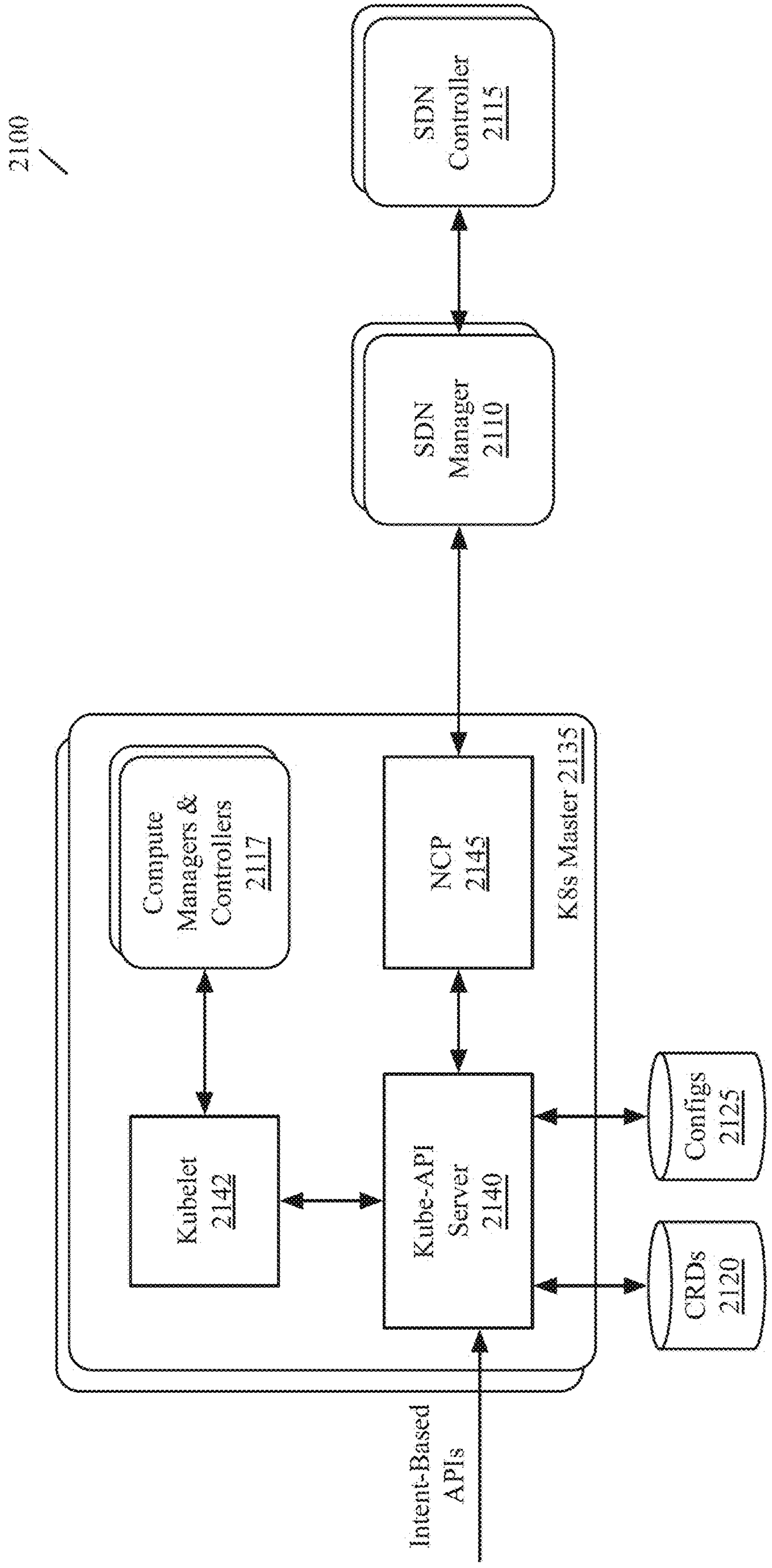
FIG. 21 illustrates an example of a control system of some embodiments of the invention that processes APIs.

FIG. 21 illustrates an example of a control system 2100 of some embodiments of the invention that processes APIs that use the Kubernetes-based declarative model to describe the desired state of (1) the endpoints to deploy, and (2) the connectivity, security and service operations that are to be performed for the deployed endpoints (e.g., private and public IP addresses connectivity, load balancing, security policies, etc.). To process the APIs, the control system 2100 uses one or more CRDs to define some of the resources referenced in the APIs. The system 2100 performs automated processes to deploy a logical network that connects the deployed endpoints and segregates these endpoints from other endpoints in the datacenter set. The endpoints are connected to the deployed logical network of a virtual private cloud (VPC) in some embodiments. In some embodiments, the control system 2100 instead processes APIs that reference the CRDs.

As shown, the control system 2100 includes two or more master nodes 2135 for API processing, an SDN manager cluster 2110, and an SDN controller cluster 2115. Each of the master nodes 2135 for API processing includes an API processing server 2140, a kubelet 2142 node agent, compute managers and controllers 2117, and an NCP 2145. The API processing server 2140 receives intent-based API calls and parses these calls. In some embodiments, the received API calls are in a declarative, hierarchical Kubernetes format, and may contain multiple different requests.

The API processing server 2140 parses each received intent-based API request into one or more individual requests. When the requests relate to the deployment of endpoints, the API server provides these requests directly to compute managers and controllers 2117, or indirectly provides these requests to the compute managers and controllers 2117 through the kubelet 2142 and/or the NCP 2145 running on the Kubernetes master node 2135. The compute managers and controllers 2117 then deploy VMs (not shown) and/or sets of containers on host computers (e.g., in the availability zone) (not shown).

The kubelet 2142 node agent on a node in some embodiments registers the node with the API server 2140 using one of: the hostname; a flag to override the hostname; or specific logic for a cloud provider. The kubelet 2142 receives sets of containerspecs, YAML (a data serialization language) or JavaScript Object Notation (JSON) formatted objects that each describe a pod. The kubelet 2142 uses sets of containerspecs to create (e.g., using the compute managers and controllers 2117) the sets of containers that are provided by various mechanism elements (e.g., from the API server 2140) and ensures that the containers described in those sets of containerspecs are running and healthy.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default.

In some embodiments, the API calls refer to extended resources that are not defined per se by the baseline Kubernetes system. For these references, the API processing server 2140 uses one or more CRDs 2120 to interpret the references in the API calls to the extended resources. The CRDs 2120 in some embodiments define extensions to the Kubernetes networking requirements. In some embodiments, the CRDs 2120 can include network-attachment-definition (NDs), VIF CRDs, Virtual Network CRDs, Endpoint Group CRDs, security CRDs, Virtual Service Object (VSO) CRDs, Load Balancer CRDs, and StatefulSet pod CRDs. In some embodiments, the CRDs 2120 are provided to the API processing server 2140 in one stream with the API calls.

NCP 2145 is the interface between the API server 2140 and the SDN manager cluster 2110 that manages the network elements that serve as the forwarding elements (e.g., switches, routers, bridges, etc.) and service elements (e.g., firewalls, load balancers, etc.) in an availability zone. The SDN manager cluster 2110 directs the SDN controller cluster 2115 to configure the network elements to implement the desired forwarding elements and/or service elements (e.g., logical forwarding elements and logical service elements) of one or more logical networks. The SDN controller cluster 2115 interacts with local controllers on host computers and edge gateways to configure the network elements in some embodiments.

In some embodiments, NCP 2145 registers for event notifications with the API server 2140, e.g., sets up a long-pull session with the API server 2140 to receive all CRUD (Create, Read, Update and Delete) events for various CRDs 2120 that are defined for networking. In some embodiments, the API server 2140 is a Kubernetes master VM, and the NCP 2145 runs in this VM as a Pod. NCP 2145 in some embodiments collects realization data from the SDN resources for the CRDs and provides this realization data as it relates to the CRD status. In some embodiments, the NCP 2145 communicates directly with the API server 2140 and/or through the kubelet 2142.

In some embodiments, NCP 2145 processes the parsed API requests relating to NDs, VIFs, virtual networks, load balancers, endpoint groups, security policies, VSOs, and edge clusters to direct the SDN manager cluster 2110 to implement (1) the NDs that designate network segments for use with secondary interfaces of sets of containers, (2) the VIFs needed to connect VMs and sets of containers to forwarding elements on host computers, (3) virtual networks to implement different segments of a logical network of the VPC, (4) load balancers to distribute the traffic load to endpoint machines, (5) firewalls to implement security and admin policies, (6) exposed ports to access services provided by a set of endpoints in the VPC to endpoints outside and inside of the VPC, and (7) edge clusters in the VPC. In some embodiments, rather than directing the manager cluster 2110 to implement the NDs, VIFs, virtual networks, load balancers, endpoint groups, security policies, and VSOs, the NCP 2145 in some embodiments communicates directly with the SDN controller cluster 2115 to direct the controller cluster 2115 to implement the NDs, VIFs, virtual networks, load balancers, endpoint groups, security policies, and VSOs.

The API server 2140 provides the CRDs 2120 that have been defined for these extended network constructs to the NCP 2145 for it to process the APIs that refer to the corresponding network constructs (e.g., network segments). The API server 2140 also provides configuration data from the configuration storage 2125 to the NCP 2145. The configuration data in some embodiments include parameters that adjust the pre-defined template rules that the NCP 2145 follows to perform its automated processes. In some embodiments, the configuration data includes a configuration map. The configuration map of some embodiments may be generated from one or more directories, files, or literal values. In some embodiments, the configuration map is generated from files in the configuration storage 2125, from data received by the API server 2140 from the NCP 2145 and/or from data generated by the SDN manager 2110. The configuration map in some embodiments includes identifiers of pre-created network segments of the logical network.

The NCP 2145 performs these automated processes to execute the received API requests in order to direct the SDN manager cluster 2110 to deploy the network elements for the VPC. For a received API, the control system 2100 performs one or more automated processes to identify and deploy one or more network elements that are used to implement the logical network for a VPC. The control system 2100 performs these automated processes without an administrator performing any action to direct the identification and deployment of the network elements after an API request is received.

The SDN managers 2110 and controllers 2115 can be any SDN managers and controllers available today. In some embodiments, these managers 2110 and controllers 2115 are the NSX-T managers and controllers licensed by VMware, Inc. In such embodiments, NCP 2145 detects network events by processing the data supplied by its corresponding API server 2140, and uses NSX-T APIs to direct the NSX-T manager 2110 to deploy and/or modify NSX-T network constructs needed to implement the network state expressed by the API calls. The communication between the NCP and NSX-T manager 2110 is asynchronous communication, in which the NCP provides the desired state to NSX-T managers 2110, which then relay the desired state to the NSX-T controllers 2115 to compute and disseminate the state asynchronously to the host computer, forwarding elements and service nodes in the availability zone (i.e., to the software defined datacenter (SDDC) set controlled by the controllers 2115).

After receiving the APIs from the NCPs 2145, the SDN managers 2110 in some embodiments direct the SDN controllers 2115 to configure the network elements to implement the network state expressed by the API calls. In some embodiments, the SDN controllers serve as the central control plane (CCP) of the control system 2100.

Figure 22:
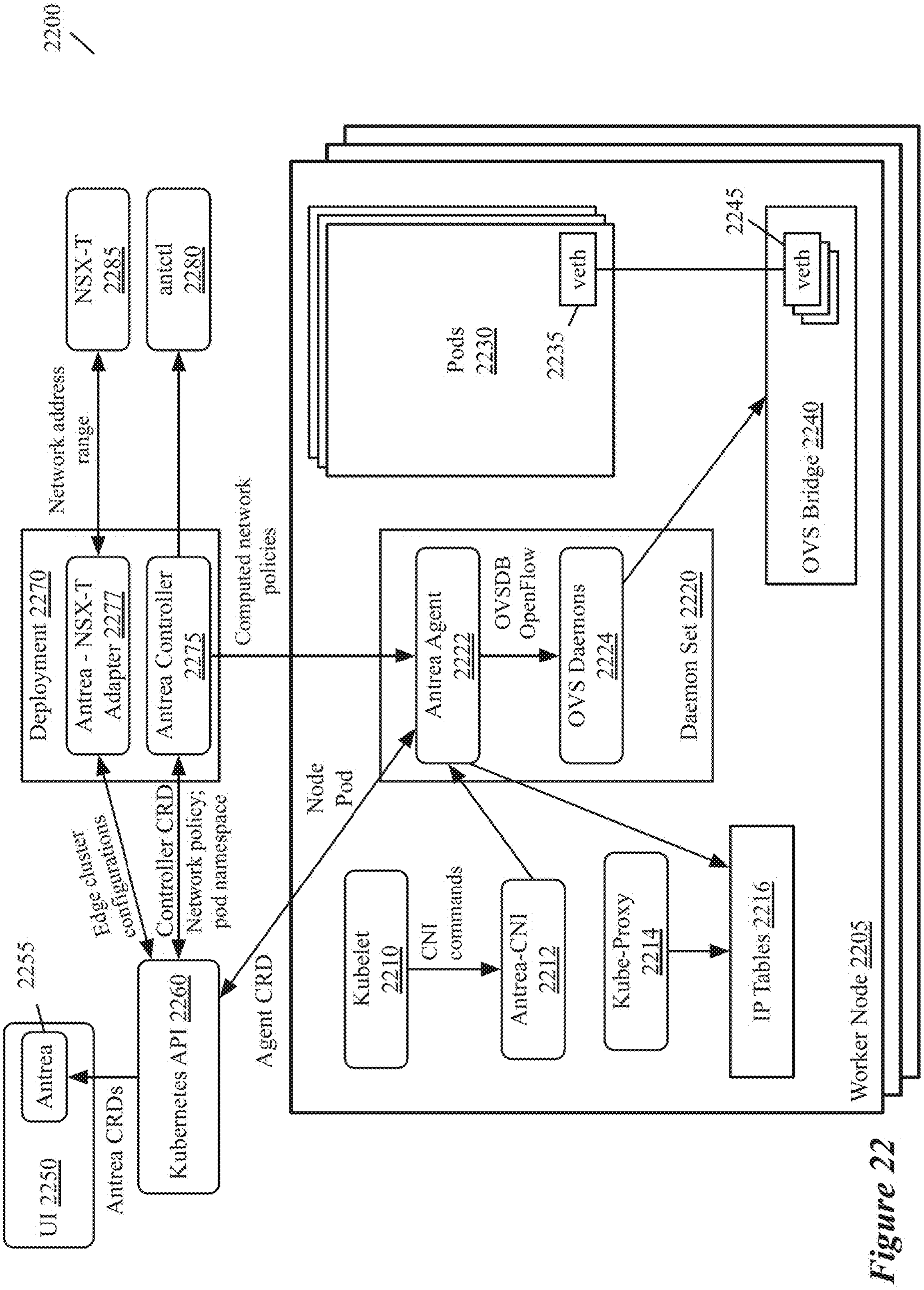
FIG. 22 illustrates an Antrea networking solution of some embodiments.

FIG. 22 illustrates an Antrea networking solution of some embodiments, which is a specific implementation for Kubernetes that works with NSX-T, a specific environment for a specific commercially available product of VMware, inc. As a Kubernetes networking solution, Antrea implements the Container Network Interface (CNI), while Kubernetes NetworkPolicy operates at L3/L4 to provide network connectivity and security services for a Kubernetes cluster (i.e., collection of nodes for running containerized applications), leveraging the benefit of programmable networks from Open vSwitch (OVS) to Kubernetes. OVS is a widely adopted high-performance programmable virtual switch, originating from VMware, Inc., that is designed to enable effective network automation through programmatic extensions. The Antrea network solution described herein leverages OVS in its architecture to efficiently implement pod networking and security features.

In some embodiments, because of the programmable OVS, forwarding functions are opened to programmatic extension and control. Based on this, a new flexible Antrea IPAM (host-local IP address management) plugin overrides and extends the existing flow tables, which are managed by a new centralized CRD instead of a local store IP management state from the original host-local IPAM plugin. This centralized controller helps to provide the ability of multiple networks on a pod and IPAM per-namespace, according to some embodiments. In some embodiments, in an L3 forwarding table, all traffic destined to a remote pod is forwarded through the appropriate tunnel, and for the return flow from a remote pod to local node, a distinction must be drawn between the remote gateway and the local gateway, according to some embodiments.

As shown, the Antrea networking solution 2200 includes Kubernetes nodes 2205, a user interface (UI) 2250 with an Antrea plugin 2255, a Kubernetes API server 2260, a deployment 2270 that runs the Antrea controller 2275 and an Antrea-NSX-T adapter 2277, NSX-T manager and controller cluster 2285, and Antrea command-line tool 2280 (i.e., antctl 2280). In some embodiments, the UI 2250, Kubernetes API server 2260, deployment 2270, and Antrea command-line tool 2280 execute together as part of the control plane on a single master node. Also, in some embodiments, the NSX-T manager and controller cluster 2285 includes separate manager and controller clusters, such as the SDN manager cluster 2110 and SDN controller cluster 2115 described above.

To provide a more flexible IPAM (host-local IP address management) that is based on namespace isolation, the deployment 2270 runs the Antrea controller 2275, which is used along with corresponding CRDs (custom resource definitions) to manage all of the IP addresses for pods executing on nodes in the network. As a result, each pod subnet is associated with a respective namespace such that the IP assigned to a pod is related to its business, in some embodiments. Additionally, pods located under the same namespace are in the same local area network (LAN), in some embodiments, while pods under different namespaces are isolated on different networks. In some embodiments, a static IP address assigned to a pod can be configured by the annotation filed for the corresponding configuration file. Users (e.g., administrators) could also monitor the IP usage from the Antrea command-line tool 2280 or the UI 2250 in order to expand the corresponding IP resource pool in a timely manner when IP resources are exhausted, according to some embodiments.

The deployment 2270 also runs the Antrea-NSX-T adapter 2277, as shown. The Antrea-NSX-T adapter 2277, in some embodiments, replaces the NCP 2145 on the master node 2135, as mentioned above. In some embodiments, the Antrea-NSX-T adapter 2277 receives parsed API requests regarding deploying pods for an edge cluster from the API server 2260, and generates API calls to direct the NSX-T manager and controller cluster 2285 to provide the configuration for the pods to deploy the edge cluster, according to some embodiments. Once an edge cluster configuration has been received, the Antrea-NSX-T adapter 2277 can the pods for the edge cluster. In other embodiments, the deployment 2270 communicates with NSX-T 2285 through the Antrea controller 2275 instead of the Antrea-NSX-T adapter 2277 to request and receive edge cluster configurations.

The UI 2250 is used to manage Kubernetes clusters by translating human-readable commands into API calls that can be understood by the Kubernetes API server 2260. In some embodiments, the UI 2250 is a VMware Octant UI, and presents its output in a graphical user interface (GUI) for viewing by a user (e.g., administrator). The UI 2250 runs locally on the user's workstation, according to some embodiments, and as a result, does not use up resources of the node or nodes that it manages. The UI 2250 includes Antrea plugin 2255 for receiving Antrea CRDs from the Kubernetes API server 2260 to use by the Antrea plugin 2255.

The Antrea controller 2275 in some embodiments additionally monitors network policy, pod, namespace, and network address resources with the Kubernetes API 2260. The Antrea controller 2275, in some embodiments, uses information associated with these resources to compute policy rules, which can be translated to OVS flows efficiently and disseminated to a targeted Antrea agent (e.g., Antrea agent 2222) that runs on a node along with one or more affected pods. The Kubernetes API server 2260 enables different components of the Kubernetes cluster (i.e., a master node and set of one or more worker nodes) to communicate with each other and with components external to the cluster, according to some embodiments. Additionally, in some embodiments, the API server 2260 enables users to query and alter the states of API objects, such as pods, namespaces, configuration maps, and events.

Each of the worker nodes 2205 includes a kubelet 2210 node agent, Antrea-CNI 2212, kube-proxy 2214, IP tables 2216, daemonset 2220, one or more pods 2230, and an OVS bridge 2240. The kubelet 2210, in some embodiments, is responsible for registering the node 2205 with the API server 2260. Additionally, the kubelet 2210 ensures that containers defined in pod specifications received from the API server 2260 are both running and healthy. In some embodiments, instead of receiving the pod specifications from the API server 2260, the kubelet 2210 receives the pod specifications from an HTTP endpoint (not shown) or an HTTP server (not shown).

The daemonset 2220 includes two containers to run the Antrea agent 2222 and the OVS daemons 2224, respectively, on every node, as well as an init-container (not shown) that installs the Antrea-CNI 2212 on the node. The Antrea-CNI 2212, in some embodiments, requests IP addresses for pods instantiated on the node 2205, and interacts with the Antrea agent 2222 to update the IP table 2216 with the assigned IP addresses. The kube-proxy 2214 runs on the node 2205 to maintain network rules on the node to allow network communications to the pods 2230 from sessions within the cluster, as well as sessions outside of the cluster. In some embodiments, the kube-proxy 2214 forwards data traffic for the pods itself using the IP addresses in the IP table 2216. In some embodiments, OVS realizes the data plane on each of the worker nodes 2205 at the same time, and in response, the Antrea controller 2275 implements the control plane of the SDN for which the Antrea networking solution 2200 is implemented.

The Antrea agent 2222 helps to bridge the Antrea controller 2275 and OVS between the master node (not shown) and each other node 2205 by creating the OVS bridge 2240 and a veth pair for each pod 2230, with one end 2235 of the veth pair being in the pod's network namespace, and the other end 2245 connected to the OVS bridge 2240. As shown, the Antrea agent 2222 interacts with the OVS bridge 2240 via the OVS daemons 2224. In some embodiments, on the OVS bridge 2240, the Antrea agent 2222 also creates an internal port antrea-gw0 (not shown) by default as the gateway of the node's subnet, and a tunnel port antrea-tun0 (not shown) for creating overlay tunnels to other nodes 2205.

The above embodiments describe deploying an edge as a set of pods on multiple worker nodes rather than deploying it as a single appliance. In existing single edge node architectures, data messages are processed inside the PMD thread in a run-to-completion fashion and are sent out of the NIC in the same core. Data messages are dispatched to an OS namespace (e.g., Linux namespace) for L7 services, a DNS forwarding, or Internet Key Exchange (iked).

By deploying an edge as a single node, the edge has a fixed CPU and memory, regardless of whether it is deployed as a VM or a bare metal server. The appliance is run as a fast path, a control path, services, and others. The fast path includes PMD threads pinned to specific cores and runs the service pipeline in a run-to-completion model. Services implemented in the fast path include switching, routing, NAT, firewall, Internet Protocol Security (IPsec), etc. The control path includes the datapath or the slow path (e.g., Address Resolution Protocol (ARP) learning, Media Access Control (MAC) learning, Bidirectional Forwarding Detection (BFD) Field Service Management (FSM), and firewall purging), dynamic routing daemon, an IPsec control plane (i.e., iked), an edge agent, an ops agent, an SDN proxy, a database, an exporter, etc. The services include L7 firewall services, TLS proxy, L7 load balancing, URL filtering, DNS forwarding, etc. The others include KNI threads, application mobility platforms (e.g., HCX offered by VMware, inc.), etc.

By default, half of the available cores of an edge appliance are allocated to the fast path threads, with each PMD thread pinned to one core. All other processes and threads are scheduled by the OS (e.g., Linux). By using an edge appliance, the maximum CPU that can be allocated to L5-L7 services is limited by the node form factor. As a result, it is difficult to support "limitless" scale out, as a public cloud environment does. Additionally, to dynamically allocate other resources (e.g., memory), the edge appliances needs to build more customer monitoring solutions.

For a single edge appliance, a data message is processed by performing L2/L3 lookups, tunnel termination and encapsulation, firewall processing, updating packet and byte counters, and possibly repeating each step multiple times. This implies that every data message translates a large number of memory accesses as various data structures (routing table, configuration, etc.) that are consulted to determine the forwarding decision of the data message. This results in two challenges on a software datapath. First, on a non-trivial configuration, the L2 switching tables, L3 routing tables, and firewall configuration result in a configuration of tens (or even hundreds) of megabytes. This exceeds the capacity of CPU L1-L3 caches and, with realistic traffic patterns, is likely to result in low CPU cache hit rates and low performance. Individual data structure accesses take, instead of a few cycles (if served from LI cache), up to a hundred or more cycles (if served from main memory). Second, as the service pipeline becomes more complicated, the number of processing steps involved per data message increases. This again leads to lower performance. To alleviate the above issues, the datapath implements a flow cache. The processing of a received packet in fast path is hence reduced to a match-action table lookup, plus packet modification based on the actions recorded.

A KNI allows DPDK applications to pass data messages between the userspace application and the kernel network stack. It is faster than TUN and TAP interfaces, by eliminating system calls and "copy_to_user" and "copy_from_user" operations (zero-copy). It is originally designed for control path communication. For an SDN edge, it is used to carry datapath data messages (e.g., L2 Ethernet frames). For that, optimizations such as multi-queue support, Virtual Local Area Network (VLAN), and checksum offload are added. TCP Segment Offload (TSO) and Large Receive Offload (LRO) support are also actively being worked on. Even with all such enhancements, performance over KNI is still limited.

In addition, it involves a lot of efforts to keep an out-of-tree kernel module such as KNI to keep up with ever-changing kernel API and Automated Broker Interface (ABI). To support various hardware offload (such as VLAN, checksum, and TLS offload), extra metadata tagged at PNIC need to be carried with the data messages for them to work.

Deploying an edge cluster as a container cluster provides many benefits. For instance, the above described embodiments support highly resilient and scalable multi-tenant networking functions and services. Additionally, deploying a cluster of Kubernetes edges can be formed to offer redundancy and scale out of the edges. By implementing leveraging Kubernetes architecture and by using a split-datapath architecture of an edge cluster, the edge cluster offers high performance, scalability, and flexibility. Moreover, it eliminates the need to use KNI.

Rather than deploying a single edge appliance, an edge is deployed using multiple containers. Because of this, the containers and the services implemented on those containers can be scaled independently. Since there is no appliance for the edge, any number of containers can be deployed for the edge. Because L4 services are more intense on resources than L7 services, independently deploying and scaling these service types provides for a better performance overall.

Additionally, by utilizing SDN managers and controllers, the user wishing to deploy the edge cluster does not have to manually monitor and scale the edge cluster. The SDN managers and controllers automatically scale the edge cluster for the user. Moreover, the above described embodiments can deploy an edge cluster in private cloud environments (e.g., vSphere offered by VMware, inc.) and public cloud environments (e.g., AWS, GCP, Azure, etc.).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
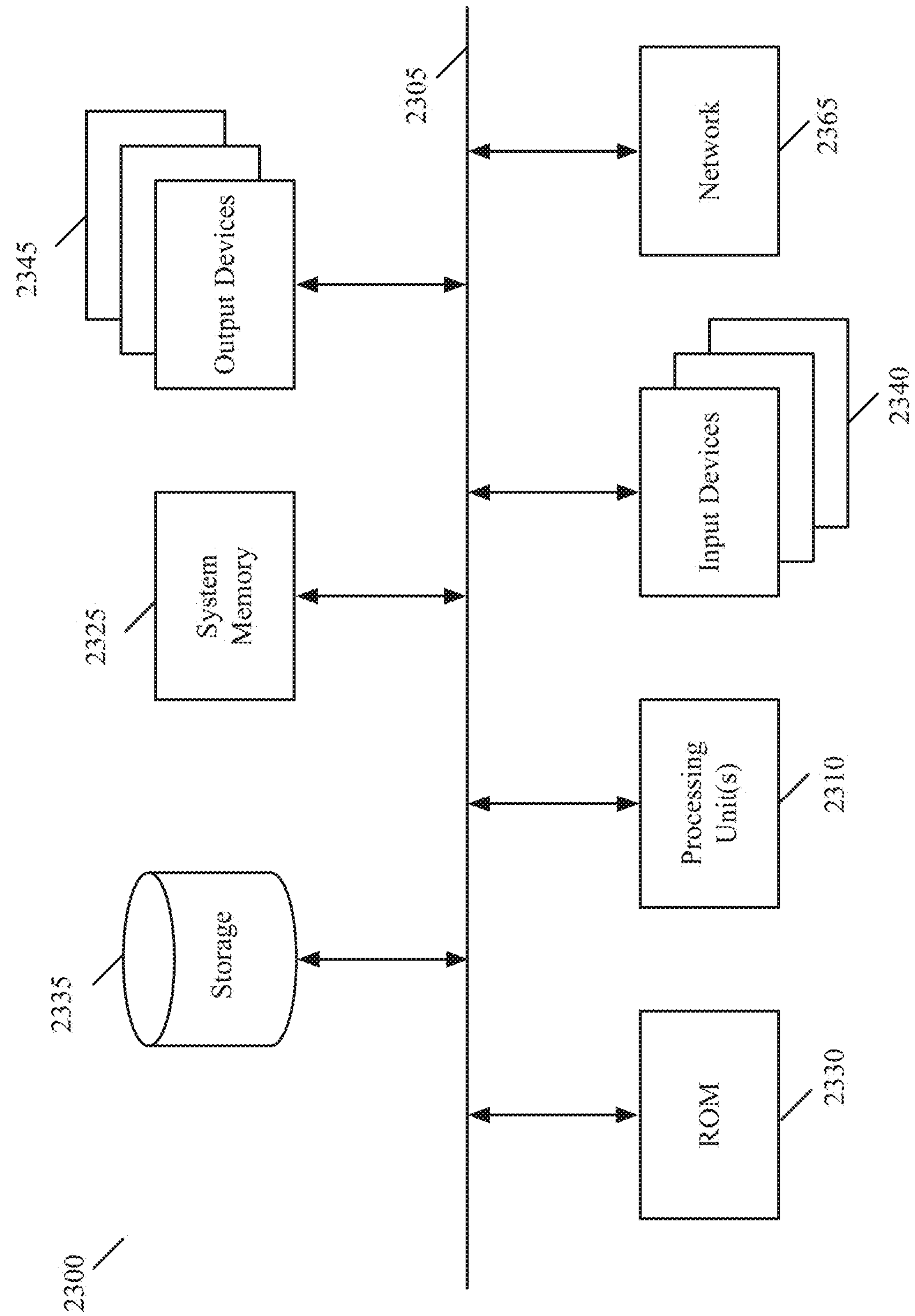
FIG. 23 conceptually illustrates an electronic system with which some embodiments of the invention are implemented.

FIG. 23 conceptually illustrates a computer system 2300 with which some embodiments of the invention are implemented. The computer system 2300 can be used to implement any of the above-described computers and servers. As such, it can be used to execute any of the above described processes. This computer system includes various types of non-transitory machine readable media and interfaces for various other types of machine readable media. Computer system 2300 includes a bus 2305, processing unit(s) 2310, a system memory 2325, a read-only memory 2330, a permanent storage device 2335, input devices 2340, and output devices 2345.

The bus 2305 collectively represents all system, peripheral, and chipset buses that communicatively connect the numerous internal devices of the computer system 2300. For instance, the bus 2305 communicatively connects the processing unit(s) 2310 with the read-only memory 2330, the system memory 2325, and the permanent storage device 2335.

From these various memory units, the processing unit(s) 2310 retrieve instructions to execute and data to process in order to execute the processes of the invention. The processing unit(s) may be a single processor or a multi-core processor in different embodiments. The read-only-memory (ROM) 2330 stores static data and instructions that are needed by the processing unit(s) 2310 and other modules of the computer system. The permanent storage device 2335, on the other hand, is a read-and-write memory device. This device is a non-volatile memory unit that stores instructions and data even when the computer system 2300 is off. Some embodiments of the invention use a mass-storage device (such as a magnetic or optical disk and its corresponding disk drive) as the permanent storage device 2335.

Other embodiments use a removable storage device (such as a flash drive, etc.) as the permanent storage device. Like the permanent storage device 2335, the system memory 2325 is a read-and-write memory device. However, unlike storage device 2335, the system memory is a volatile read-and-write memory, such a random access memory. The system memory stores some of the instructions and data that the processor needs at runtime. In some embodiments, the invention's processes are stored in the system memory 2325, the permanent storage device 2335, and/or the read-only memory 2330. From these various memory units, the processing unit(s) 2310 retrieve instructions to execute and data to process in order to execute the processes of some embodiments.

The bus 2305 also connects to the input and output devices 2340 and 2345. The input devices enable the user to communicate information and select commands to the computer system. The input devices 2340 include alphanumeric keyboards and pointing devices (also called "cursor control devices"). The output devices 2345 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 23, bus 2305 also couples computer system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of computer system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 11, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for deploying an edge device as a cluster of pods, the method comprising:

receiving a set of criteria for deploying the edge device;

using the set of criteria to deploy the edge device as a set of one or more pods executing on a set of one or more nodes; wherein the using the set of criteria comprises:

determining, by a software defined network (SDN) manager, a first configuration for a first service type at a first layer and a second configuration for a second service type at a second layer, wherein the first service type is allocated a different amount of compute resources than the second service type;

deploying, by the SDN manager, a first pod on a worker node, wherein the first pod is a first pod of a pair of pods deployed as a high availability (HA) pair; and deploying, by the SDN manager, a second pod separately from the first pod, wherein the second pod is associated with a logical router represented by the edge device; and implementing, on the set of pods, a set of one or more services to perform on data message flows, wherein the first pod performs the first service type and the second pod performs the second service type such that the different service types are able to be scaled independently.

2. The method of claim 1, wherein a particular node implements a particular Layer 4 (L4) pod that performs L4 service operations for the data message flows; and/or wherein each pod is associated with a set of one or more networking interfaces.

3. The method of claim 2, wherein the particular L4 pod is a first L4 pod of a pair of L4 pods deployed as a high availability (HA) pair for the edge device.

4. The method of claim 2, wherein the particular node also implements a set of one or more Layer 7 (L7) pods that performs L7 service operations for a particular set of the data message flows.

5. The method of claim 4, wherein:

the particular node is a first node, the set of L7 pods is a first set of L7 pods, the particular set of data message flows is a first set of data message flows, and a second node implements a second set of L7 pods that performs the L7 service operations for a second set of the data message flows.

6. The method of claim 5, wherein each L7 pod is associated with a different logical router represented by the edge device.

7. The method of claim 5, wherein each L7 pod performs a different L7 service for the edge device.

8. The method of claim 1, wherein receiving the set of criteria comprises receiving an Application Programming Interface (API) request specifying the set of criteria; and/or wherein using the set of criteria to deploy the edge device comprises parsing the API request to extract the set of criteria.

9. The method of claim 1, wherein:

the set of nodes is connected to a Single Route Input/Output Virtualization (SR-IOV) physical network interface card (PNIC), the SR-IOV PNIC comprising (i) an embedded switch that executes a physical function (PF) that represents a port of the PNIC and (ii) a set of one or more virtual functions (VFs) that represents a set of one or more virtual interfaces of the PNIC that connects to each pod, and each pod connects to a different VF through a particular networking interface of the pod.

10. The method of claim 1, wherein the set of nodes is connected to an open virtual switch (OVS).

11. The method of claim 10, wherein each pod connects to a different shared memory packet interface (memif) of the OVS to connect to the OVS.

12. The method of claim 1, wherein the edge cluster is deployed in a particular public cloud; and/or wherein the edge cluster is deployed in a particular private cloud.

13. The method of claim 12, wherein the particular public cloud is managed by a particular public cloud provider; and/or wherein the edge cluster operates in a particular availability zone of the particular public cloud provider.

14. The method of claim 1, wherein the set of nodes is a set of worker nodes managed by a master node; and/or wherein the edge device is deployed as the set of pods to perform edge services at a boundary between a logical network and an external network.

15. A non-transitory machine readable medium storing a program for execution by at least one processing unit for deploying an edge device as a cluster of pods, the program comprising sets of instructions for:

receiving a set of criteria for deploying the edge device;

using the set of criteria to deploy the edge device as a set of one or more pods executing on a set of one or more nodes; and determining, by a software defined network (SDN) manager, a first configuration for a first service type at a first layer and a second configuration for a second service type at a second layer, wherein the first service type is allocated a different amount of compute resources than the second service type;

deploying, by the SDN manager, a first pod on a worker node, wherein the first pod is a first pod of a pair of pods deployed as a high availability (HA) pair; and deploying, by the SDN manager, a second pod separately from the first pod, wherein the second pod is associated with a logical router represented by the edge device; and implementing, on the set of pods, a set of one or more services to perform on data message flows, wherein the first pod performs the first service type and the second pod performs the second service type such that the different service types are able to be scaled independently.

* * * * *